United States Patent
Kurahashi et al.

(10) Patent No.: US 8,040,535 B2
(45) Date of Patent: Oct. 18, 2011

(54) IMAGE FORMING APPARATUS, IMAGE FORMING SYSTEM, RECOVERY PROCESSING METHOD, PROGRAM, AND STORAGE MEDIUM

(75) Inventors: Masahiro Kurahashi, Tokyo (JP); Keizo Isemura, Tokyo (JP)

(73) Assignee: Canon Kabushiki Kaisha (JP)

( * ) Notice: Subject to any disclaimer, the term of this patent is extended or adjusted under 35 U.S.C. 154(b) by 145 days.

(21) Appl. No.: 12/399,593

(22) Filed: Mar. 6, 2009

(65) Prior Publication Data

US 2009/0180143 A1 Jul. 16, 2009

Related U.S. Application Data

(62) Division of application No. 10/603,589, filed on Jun. 25, 2003, now abandoned.

(30) Foreign Application Priority Data

Jun. 25, 2002 (JP) .................... 2002-184782
Jul. 26, 2002 (JP) .................... 2002-217742

(51) Int. Cl.
*G06K 15/00* (2006.01)
*B65H 39/01* (2006.01)
*G06F 3/012* (2006.01)

(52) U.S. Cl. ....... 358/1.12; 358/1.1; 358/1.15; 399/361; 399/403; 271/176; 271/278; 271/298

(58) Field of Classification Search ............ 271/176, 271/207, 298; 399/382, 403–407; 358/1.9, 358/501, 1.13–1.15, 540; 270/52.02–52.04, 58.04, 58.01

See application file for complete search history.

(56) References Cited

U.S. PATENT DOCUMENTS

| | | | |
|---|---|---|---|
| 5,435,544 A * | 7/1995 | Mandel | 271/298 |
| 5,898,592 A * | 4/1999 | Salgado et al. | 700/214 |
| 5,903,284 A * | 5/1999 | Sato | 346/134 |
| 6,317,581 B1 * | 11/2001 | Boehmer et al. | 399/401 |
| 6,862,375 B1 | 3/2005 | Keithley et al. | |
| 7,040,820 B2 * | 5/2006 | Perdu et al. | 400/76 |
| 7,296,791 B2 | 11/2007 | Kurahashi et al. | |
| 2003/0095722 A1 | 5/2003 | Regimbal | |

FOREIGN PATENT DOCUMENTS

EP 1052844 A2 * 11/2000

* cited by examiner

*Primary Examiner* — Twyler Haskins
*Assistant Examiner* — Chad Dickerson
(74) *Attorney, Agent, or Firm* — Rossi, Kimms & McDowell LLP

(57) ABSTRACT

There is provided an image forming apparatus that can reduce the burden placed on the user by avoiding input errors and a complicated input operation when making settings for a color/black-and-white mixing operation and can perform a proper recovery even when a sheet determined to be abnormal is included in other sheets. Images are formed on sheets by an MFP 104 in accordance with an image forming job. The sheets on which the images have been formed are conveyed to a stacker tray 1207 detachably attached to the MFP 104. Information relating to the image forming job for the sheets conveyed to the stacker tray 1207 is written into a storage device 1202 provided in the stacker tray 1207.

1 Claim, 39 Drawing Sheets

IMAGE FORMING APPARATUS, IMAGE FORMING SYSTEM, RECOVERY PROCESSING METHOD, PROGRAM, AND STORAGE MEDIUM

CROSS-REFERENCE TO RELATED APPLICATION

This is a divisional of U.S. patent application Ser. No. 10/603,589 filed Jun. 25, 2003 which is based on and claims priority from Japanese Application No. 2002-184782 filed on Jun. 25, 2002, and Japanese Application No. 2002-217742 filed Jul. 26, 2002, the contents of each of which are incorporated herein in their entirety by reference.

BACKGROUND OF THE INVENTION

1. Field of the Invention

The present invention relates to an image forming apparatus, an image forming system, a recovery processing method, a program for implementing the method, and a storage medium storing the program, and in particular to an image forming apparatus that performs image formation on a sheet, an image forming system in which a plurality of image forming apparatuses are connected on a network, a recovery processing method that is executed by an image forming apparatus, a program for implementing the method, and a storage medium storing the program.

2. Description of the Related Art

Conventionally, in a system where a color image forming apparatus (color copy apparatus) and a black-and-white image forming apparatus (black and white copy apparatus) are connected to a network, when the images of a plurality of originals that contain both color originals and black-and-white originals are copied and printed out, users have been able to obtain a print result in which both color image pages and black-and-white image pages are mixed by having the images of all of the plurality of originals printed out by the color copy apparatus.

On the other hand, image formation processing by a color copy apparatus takes longer and is more costly than image formation processing by a black-and-white copy apparatus, so that there are demands for having the black-and-white originals in a plurality of originals in which both color originals and black-and-white originals are mixed printed out by a black-and-white copy apparatus. To meet such demands, when the images of a plurality of originals in which both color originals and black-and-white originals are mixed are copied and printed out, it is conceivable to have the black-and-white originals printed out by the black-and-white copy apparatus and the color originals printed out by the color copy apparatus.

In this case, in order to combine the recording sheets that have been printed by the black-and-white copy apparatus and the recording sheets that have been printed by the color copy apparatus into a single bundle like the original plurality of originals, the user has had to insert the recording sheets outputted by one of the copy apparatuses into the recording sheets outputted by the other copy apparatus by hand in order to arrange the originals in the page order.

This means that when the user wishes to collect a plurality of printed sheets together into a single document, part of the task cannot be performed by computer and the user has had to spread out the printed sheets on a desk and perform the task by hand, which has been very inefficient.

To improve this, the following conventional method has been proposed. A stacker tray (storage means) for temporarily storing color output sheets that have been outputted from a color MFP (Multi Function Peripheral) and an insert tray (refeeding means) for inserting color output sheets into black-and-white output sheets outputted from a black-and-white MFP when performing a color/black-and-white mixing are formed of a single common construction (hereinafter such common construction will be referred to as "the stacker tray"). Color output sheets that have been printed by the color MFP, whose output speed is lower than that of the black-and-white MFP, are stacked and stored in the stacker tray, and the stacker tray is attached to an insert apparatus (inserter) of the black-and-white MFP, so that the color output sheets are refed to perform mixing control.

However, there is the following problem with the above conventional method. When a color/black-and-white mixing is performed by an image forming apparatus, it has been necessary to set various kinds of information for the color/black-and-white mixing, that is, information such as a job number, a printer used for mixing the color and black-and-white originals, a paper size, a number of output copies, a stacked state of recording sheets, and a material (type of recording sheet), using an operating part or the like. Based on these settings, it has been necessary to then download information for the color originals from a server that is connected to a network and/or read data out from a storage means inside the image forming apparatus, to form color images, and to then perform a color/black-and-white mixing operation for the color images and the black-and-white images. This can cause occurrence of copying errors due to incorrect settings inputted by the user and a troublesome operation due to complex settings so that a large burden is placed upon the user. In particular, when a plurality of black-and-white/color image forming apparatuses are connected via a network, if the stacker tray is not connected to the inserter (i.e., if the stacker tray is incorrectly attached), this can lead to a large number of miscopied originals and significant downtime.

Also, in recent years an image forming system has been desired, which can perform not only color/black and white mixing jobs of large quantity lots but also color/black and white mixing jobs of small quantity lots using a large capacity stacker tray. However, to perform color/black and white mixing processing using a single stacker tray in a short time period, it is necessary to carry out color print processing for a plurality of jobs until the stack tray becomes full. In this case, a job for which color print processing has been already completed has to wait for further processing until color print processing becomes completed for all the other jobs and the stacker tray becomes full, thus making it impossible to efficiently perform color/black and white mixing jobs of small quantity lots. For this reason, there are demands for a construction that a plurality of compact size stacker trays are attached to an inserter, so that after completion of one job using one stacker tray, the next job can be quickly carried out using another stacker tray, whereby jobs of small quantity lots can be performed with improved productivity.

In this case, it is necessary to manage and make selective use of a plurality of stacker trays so as to properly set the stacker trays onto a desired refeeding cassette of an inserter of a desired image forming apparatus. As a result, there is an increase in the frequency of miscopied originals due to the erroneous input settings and improper attachment of the stacker trays mentioned above, which further increases the burden placed on users. In the case where a plurality of users share the same image forming apparatuses and inserters, the frequency of miscopied originals due to erroneous input settings and improper attachment of the stacker trays increases yet further, which makes the copying operation much more troublesome and leads to yet more downtime.

SUMMARY OF THE INVENTION

It is an object of the present invention to provide an image forming apparatus, an image forming system, and a recovery processing method that can reduce the burden placed on the user by avoiding input errors and a complicated input operation when making settings for a color/black-and-white mixing operation and can perform a proper recovery even when a sheet determined to be abnormal is included in other sheets, as well as, a program for implementing the recovery processing method, and a storage medium storing the program.

To attain the above object, in a first aspect of the present invention, there is provided an image forming apparatus comprising an image forming device that forms images on sheets in accordance with an image forming job, a conveying device that conveys the sheets on which the images have been formed by the image forming device to a container detachably attached to the image forming apparatus, and a writing device that writes information relating to the image forming job for the sheets conveyed by the conveying device into a memory provided in the container.

Preferably, the writing device writes identification information relating to the image forming job.

Preferably, the writing device writes page information relating to the images formed on the sheets.

Preferably, the writing device writes information relating to at least one selected from the group consisting of sheet size, print number, number of sheets, number of copies, sheet stacking method, material, page order, and image forming apparatus identity.

Preferably, the writing device writes at least one selected from the group consisting of information for distinguishing a sheet with an abnormality and information for distinguishing a set of sheets that include a sheet with an abnormality.

More preferably, the abnormality is at least one abnormality selected from the group consisting out of multiply feeding or skewing of sheets, registration misalignment, and color abnormality after image formation.

Preferably, the container is detachably attached to another image forming apparatus and contains sheets.

To attain the above object, in a second aspect of the present invention, there is provided an image forming apparatus comprising an image forming device that forms images on sheets in accordance with an image forming job, a feeding device that feeds sheets stored in a container detachably attached to the image forming apparatus, and a reading device that reads information written into a memory provided in the container and relating to the image forming job for the sheets stored in the container.

Preferably, the image forming apparatus according to the second aspect comprises a control device that performs processing of at least one sheet with an abnormality contained in the container, based on the information read by the reading device.

To attain the above object, in a third aspect of the present invention, there is provided an image forming apparatus comprising an image forming device that performs image formation on sheets, a container device that is attached to the image forming apparatus and contains the sheets on which image formation has been performed by the image forming device, a storage device that is provided in the storage device and stores storage information relating to the sheets, a detecting device that detects whether there is an abnormality in the sheets, and a control device that generates recovery information for recovering at least one sheet for which an abnormality has been detected by the detecting device, and stores the recovery information in the storage device.

To attain the above object, in a fourth aspect of the present invention, there is provided an image forming apparatus comprising an image forming device that performs image formation on sheets, a container device that is detachably attached to the image forming apparatus and contains sheets on which image formation has been performed by another image forming apparatus, a storage section that is provided in the container device and stores storage information relating to the sheets contained in the container device, an insertion device that inserts the sheets contained in the container device into the sheets on which image formation has been performed by the image forming device, and a control device operable when the container device is attached to the image forming apparatus while recovery information including information capable of determining whether there is an abnormality in the sheets is stored in the storage device as the storage information, for causing the insertion device to insert the sheets contained in the container device into the sheets on which information formation has been performed by the image forming device, based on the recovery information.

To attain the above object, in a fifth aspect of the present invention, there is provided an image forming apparatus comprising an image forming device that performs image formation on sheets, an insertion device that is attached to the image forming apparatus and performs a sheet insertion of sheets on which image formation has been performed by another image forming apparatus into the sheets on which image formation has been performed by the image forming device, a container device that is attached to the insertion device and contains the sheets on which image formation has been performed by the other image forming apparatus, a storage device that is provided in the container device and stores storage information relating to the sheets, an insertion control device operable when the container device is attached to the insertion device, for causing the insertion device to perform the sheet insertion based on the storage information stored in the storage device, a detection device that detects whether there is an abnormality in the sheets, a first recovery device that performs a first recovery process when an abnormality in any of the sheets is detected by the detection device, and a writing device that writes information that is necessary for recovery into the storage device provided in the container device.

Preferably, the image forming apparatus according to the fifth aspect further comprises a second recovery device operable when the information that is necessary for a recovery has been written into the storage device and the storage device has been attached to the insertion device, for performing a second recovery process based on the information that is necessary for a recovery in the storage device.

To attain the above object, in a sixth aspect of the present invention, there is provided an image forming system having a plurality of image forming apparatuses, and a network via which the image forming apparatuses are connected, at least one of the image forming apparatuses comprising an image forming device that forms images on sheets in accordance with an image forming job, a conveying device that conveys the sheets on which the images have been formed by the image forming device to a container detachably attached to the image forming apparatus, and a writing device that writes information relating to the image forming job for the sheets conveyed by the conveying device into a memory provided in the container.

To attain the above object, in a seventh aspect of the present invention, there is provided an image forming system having a plurality of image forming apparatuses, and a network via which the image forming apparatuses are connected, at least one of the image forming apparatuses comprising an image forming device that forms images on sheets in accordance with an image forming job, a feeding device that feeds sheets stored in a container detachably attached to the image forming apparatus, and a reading device that reads information written into a memory provided in the container and relating to the image forming job for the sheets stored in the container.

To attain the above object, in an eighth aspect of the present invention, there is provided an image forming system having a plurality of image forming apparatuses, and a network via which the image forming apparatuses are connected, at least one of the image forming apparatuses comprising an image forming device that performs image formation on sheets, a container device that is attached to the image forming apparatus and contains the sheets on which image formation has been performed by the image forming device, a storage device that is provided in the storage device and stores storage information relating to the sheets, a detecting device that detects whether there is an abnormality in the sheets, and a control device that generates recovery information for recovering at least one sheet for which an abnormality has been detected by the detecting device, and stores the recovery information in the storage device.

To attain the above object, in a ninth aspect of the present invention, there is provided an image forming system having first and second image forming apparatuses, and a network via which the first and second image forming apparatuses are connected, the first image forming apparatus comprising an image forming device that performs image formation on sheets, a container device that is detachably attached to the first image forming apparatus and contains sheets on which image formation has been performed by the second image forming apparatus, a storage section that is provided in the storage device and stores storage information relating to the sheets contained in the container device, an insertion device that inserts the sheets stored in the container device into the sheets on which image formation has been performed by the image forming device, and a control device operable when the container device is attached to the first image forming apparatus while recovery information including information capable of determining whether there is an abnormality in the sheets is stored in the storage device as the storage information, for causing the insertion device to insert the sheets contained in the container device into the sheets on which information formation has been performed by the image forming device, based on the recovery information.

To attain the above object, in a tenth aspect of the present invention, there is provided an image forming system having first and second image forming apparatuses, and a network via which the first and second image forming apparatuses are connected, the first image forming apparatus comprising an image forming device that performs image formation on sheets, an insertion device that is attached to the first image forming apparatus and performs a sheet insertion of sheets on which image formation has been performed by the second image forming apparatus into the sheets on which image formation has been performed by the image forming device, a container device that is attached to the insertion device and contains the sheets on which image formation has been performed by the second image forming apparatus, a storage device that is provided in the container device and stores storage information relating to the sheets, an insertion control device operable when the container device is attached to the insertion device, for causing the insertion device to perform the sheet insertion based on the storage information stored in the storage device, a detection device that detects whether there is an abnormality in the sheets, a first recovery device that performs a first recovery process when the detection device has detected an abnormality in any of the sheets, and a writing device that writes information that is necessary for recovery into the storage device provided in the storage device.

To attain the above object, in an eleventh aspect of the present invention, there is provided a recovery processing method of an image forming apparatus, the method comprising the step of an image forming step that forms images on sheets in accordance with an image forming job, a conveying step that conveys the sheets on which the images have been formed in the image forming step to a container detachably attached to the image forming apparatus, and a writing step that writes information relating to the image forming job for the sheets conveyed in the conveying step into a memory provided in the container.

To attain the above object, in a twelfth aspect of the present invention, there is provided a recovery processing method for an image forming apparatus, comprising the steps of an image forming step of forming images on sheets in accordance with an image forming job, a feeding step of feeding sheets stored in a container detachably attached to the image forming apparatus, and a reading step of reading information written into a memory provided in the container and relating to the image forming job for the sheets stored in the container.

To attain the above object, in a thirteenth aspect of the present invention, there is provided a recovery processing method for an image forming apparatus, comprising the steps of an image forming step of performing image formation on sheets, a containing step of containing the sheets on which image formation has been performed in the image forming step into a container device that is attached to the image forming apparatus, a storing step of storing storage information relating to the sheets in a storage device that is provided in the storage device, a detecting step of detecting whether there is an abnormality in the sheets, and a control step of generating recovery information for recovering at least one sheet for which an abnormality has been detected in the detecting step, and storing the recovery information in the storage device.

To attain the above object, in a fourteenth aspect of the present invention, there is provided a recovery processing method for an image forming apparatus, comprising the steps of an image forming step of performing image formation on sheets, a containing step of containing the sheets on which image formation has been performed in the image forming step into a container device that is attached to the image forming apparatus and contains, a storing step of storing storage information relating to the sheets in a storage device that is provided in the container device, an insertion step of inserting the sheets contained in the containing step into the sheets on which image formation has been performed in the image forming step, and a control step of causing the insertion step to insert the sheets contained in the container device into the sheets on which information formation has been performed in the image forming step, based on recovery information including information capable of determining whether there is an abnormality in the sheets is stored in the storage device as the storage information, when the container device is attached to the image forming apparatus while the recovery information is stored in the storage device as the storage information.

To attain the above object, in a fifteenth aspect of the present invention, there is provided a recovery processing method for an image forming apparatus, comprising the step of an image forming step of performing image formation on sheets, an insertion step of causing an insertion device that is attached to the image forming apparatus to perform a sheet insertion of sheets on which image formation has been performed by another image forming apparatus into the sheets on which image formation has been performed in the image forming step, a containing step of containing the sheets on which image formation has been performed by the other image forming apparatus into a container device that is attached to the insertion device, a storing step of storing storage information relating to the sheets in a storage device that is provided in the container device, an insertion control step of causing the insertion step to perform the sheet insertion based on the storage information stored in the storage device when the container device is attached to the insertion device, a detection step of detecting whether there is an abnormality in the sheets, a first recovery step of performing a first recovery process when an abnormality in any of the sheets is detected in the detection step, and a writing step of writing information that is necessary for recovery into the storage device provided in the container device To attain the above object, in a sixteenth aspect of the present invention, there is provided a computer-readable program for implementing a recovery processing method according to any of the eleventh to fifteenth aspects.

To attain the above object, in a seventeenth aspect of the present invention, there is provided a storage medium that stores a computer-readable program according to the sixteenth aspect.

According to the present invention, input errors and a complicated input operation can be avoided when making settings for a color/black-and-white mixing operation by an image forming apparatus, and hence the burden placed on the user can be reduced. When a sheet that has been determined to be abnormal is mixed in other sheets in a container device, the normal sheets and the abnormal sheet can be reliably discriminated from each other, and a mixing operation can be performed on the normal sheets with the abnormal sheet removed, and hence the burden placed on the user to remove the abnormal sheet can be reduced, and a proper recovery can be performed.

Further, according to the present invention, it is possible to eliminate the burden with the conventional image forming apparatus, that is placed as in the case where a color/black-and-white mixing of color output sheets and black-and-white output sheets is performed by the image forming apparatus, that is, the burden of setting various kinds of information for color/black-and-white mixing and, based on such settings, downloading information on the color originals from an external apparatus or reading the information from within the image forming apparatus, forming color images, and then performing the color/black-and-white mixing of the color output sheets and the black-and-white output sheets. This makes it possible to avoid input errors and a complex input operation when making settings for a color/black-and-white mixing operation by an image forming apparatus, which has the effect of reducing the burden placed on the user.

The above and other objects, features, and advantages of the present invention will become more apparent from the following detailed description taken in conjunction with the accompanying drawings.

BRIEF DESCRIPTION OF THE DRAWINGS

FIGS. 8A and 8B show the constructions and various signals of a PWM section 207 and a printer section 208 appearing in FIG. 2, in which:

FIG. 8A is a block diagram showing the constructions of the PWM section 207 and the printer section 208; and FIG. 8B showing the various signals;

DETAILED DESCRIPTION OF THE PREFERRED EMBODIMENTS

The present invention will now be described in detail with reference to the accompanying drawings showing preferred embodiments thereof.

Figure 1:
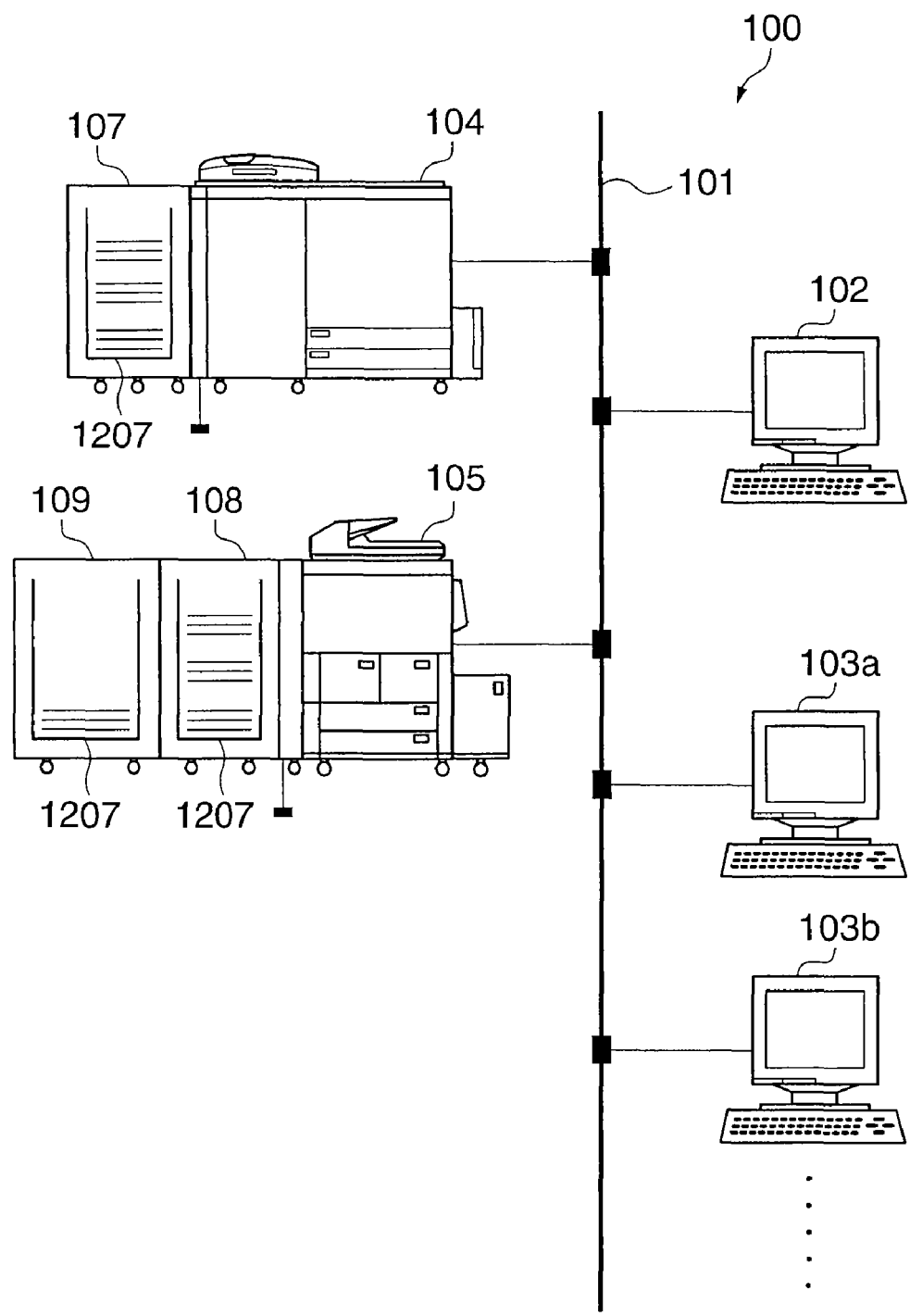
FIG. 1 is a schematic diagram showing the overall construction of an image forming network system as an image forming system according to a first embodiment of the present invention.

FIG. 1 is a schematic diagram showing the entire construction of an image forming network system as an image forming system according to a first embodiment of the present invention. In FIG. 1, an image forming network system 100 is constructed, for example, such that a color image forming apparatus (color MFP) 104 as an MFP to which a stacker 107 is attached on an output sheet discharge side thereof, a black-and-white image forming apparatus 105 as an MFP to which an inserter 108 and a large-capacity stacker 109 are attached on an output sheet discharge side thereof, a server computer 102, and client computers 103a and 103b are connected to each other via a network 101. Although not illustrated in FIG. 1, other image forming apparatuses aside from those mentioned above and appliances such as scanners, printers, facsimile machines are also connected on the network 101. Also, though not illustrated in FIG. 1, a plurality of clients aside from the client mentioned above are connected on the network 101, and these clients will be referred to as hereinafter by the client computer 103.

The color MFP 104 can scan and print, etc., in full color and sheets outputted by the color MFP 104 are successively stacked and stored in a stacker tray 1207 inside the stacker 107 that is attached to the color MFP 104. The inserter 108 that will be described later can also be optionally attached to the color MFP 104. The black-and-white MFP 105 can scan and print, etc., in monochrome and sheets outputted by the black-and-white MFP 105 are successively stacked and stored in the stacker tray 1207 inside the inserter 108 and the large-capacity stacker 109 that are attached to the black-and-white MFP 105.

Here, the stacker trays 1207 can be attached to and detached from the stacker 107, the inserter 108, and the large-capacity stacker 109. By attaching the stacker tray 1207, in which color output sheets on which images have been formed by the color MFP 104 have been stacked, to the inserter 108, the black-and-white MFP 105 can be made into a system capable of mixing color output sheets and black-and-white output sheets, with the mixed output sheets being discharged to buckets for offline post-handling and binding, etc., being performed by a post-handling apparatus, not illustrated.

By causing application software that performs so-called "DTP" (Desk Top Publishing) to run on the client computer 103, it is possible to create and edit a variety of originals and graphics. The client computer 103 converts the created originals and/or graphics to a PDL (Page Description Language), and the resulting PDL originals and/or graphics are sent to the color MFP 104 and/or black-and-white MFP 105 via the network 101, to be printed out by the color MFP 104 and/or the black-and-white MFP 105. The color MFP 104 and black-and-white MFP 105 each have a communication means that can exchange information with the server computer 102 and the client computer 103 via the network 101, whereby the server computer 102 and the client computer 103 are sequentially notified of information on and the statuses of the color MFP 104 and/or the black-and-white MFP 105. The server computer 102 and the client computer 103 have utility software that receives such information and operates, so that the color MFP 104 and the black-and-white MFP 105 can be managed by the server computer 102 and the client computer 103.

The respective constructions of the color MFP 104 and the black-and-white MFP 105 will be described next with reference to FIGS. 2 to 12. The difference between the color MFP 104 and the black-and-white MFP 105 lies in the difference between color and monochrome. Aside from the parts related to color processing, many parts of full-color apparatuses contain the same constructions as those of monochrome apparatuses, so that the following description will focus on the full-color apparatuses, with further explanation of monochrome apparatuses being added as necessary.

Figure 2:
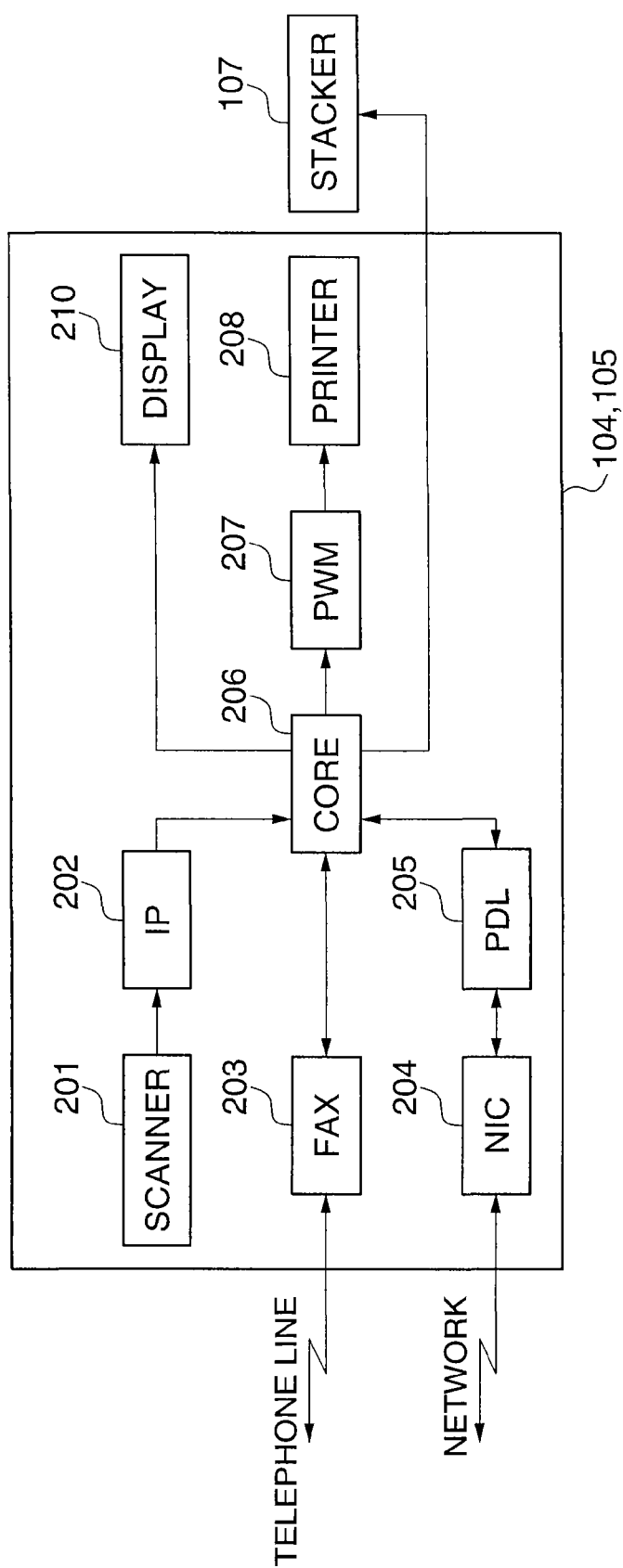
FIG. 2 is a block diagram showing the overall constructions of a color MFP 104 and a black-and-white MFP 105 appearing in FIG. 1.

As shown in FIG. 2, the color MFP 104 and the black-and-white MFP 105 each have a scanner section 201 that reads an image, an image processing section (hereinafter, "IP section") 202 that performs image processing on the read image data, a FAX section 203 that transmits and receives images using a telephone line, like a facsimile machine, a NIC (Network Interface Card) section 204 that exchanges image data and apparatus information using a network, a PDL section 205 that converts the PDL sent from the client computer 103 into an image signal, a core section 206 that switches between paths and compresses and decompresses image data, a PWM (Pulse Width Modulation) section 207 that converts image data outputted from the core section 206 into a laser beam, a printer section 208 that performs image formation on a sheet, and a display section 210 that converts and displays the image data outputted from the core section 206.

Depending on the way in which the color MFP 104 and the black-and-white MFP 105 are used, image signals are temporarily stored and have a path decided by the core section 206. Next, the image data outputted from the core section 206 is sent to the printer section 208 that performs image formation. Sheets that have been printed by the printer section 208 are fed into the stacker 107 and are successively stacked. The display section 210 is used to confirm the contents of images without the images being printed and to preview images before printing.

Figure 3:
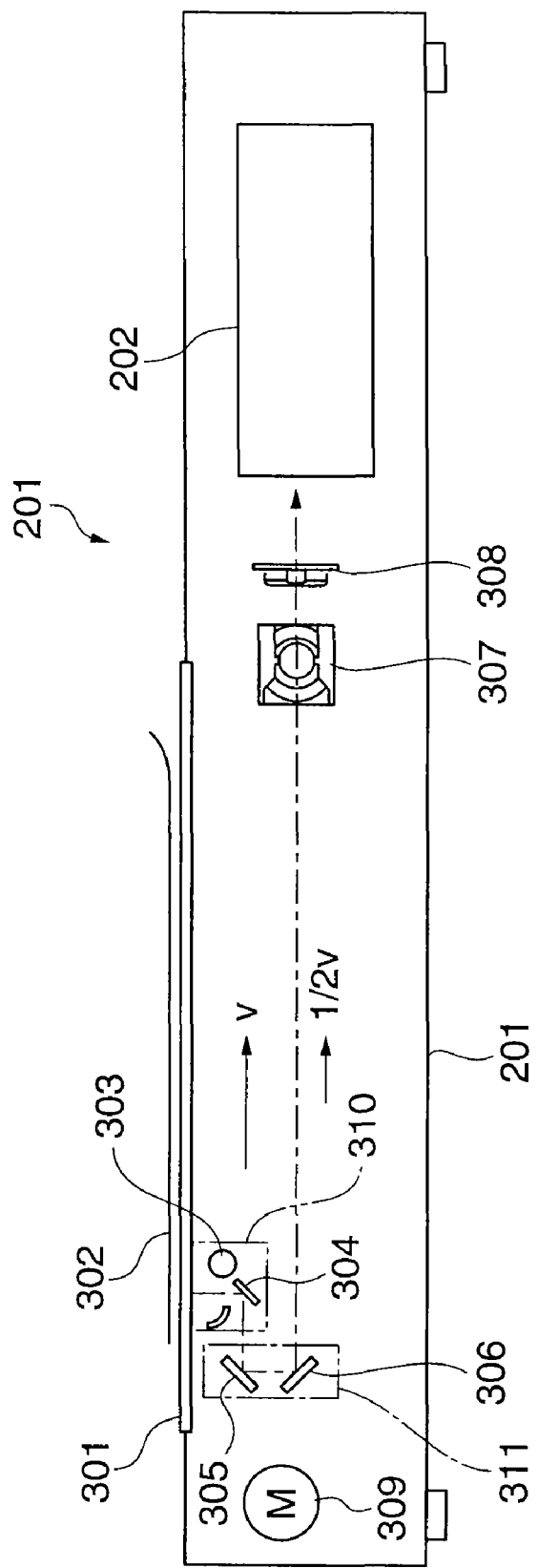
FIG. 3 is a block diagram showing the internal construction of a scanner section 201 appearing in FIG. 2.

Next, the construction of the scanner section 201 will be described with reference to FIG. 3. An original 302 to be read is placed on a platen glass 301. The original 302 is illuminated by an illuminating lamp 303, and the reflected light passes a mirror 304 of a first mirror section 310 and mirrors 305, 306 of a second mirror section 311 to form an image on a CCD sensor 308 by a lens 307. The first mirror section 310 that includes the illuminating lamp 303 and the mirror 304 is moved at a velocity V by a moving mechanism, and the second mirror section 311 that includes the mirrors 305, 306 is moved at a velocity (½)V by a moving mechanism so that the entire surface of the original 302 is scanned. The first mirror section 310 and the second mirror section 311 are driven by a motor 309.

Figure 4:
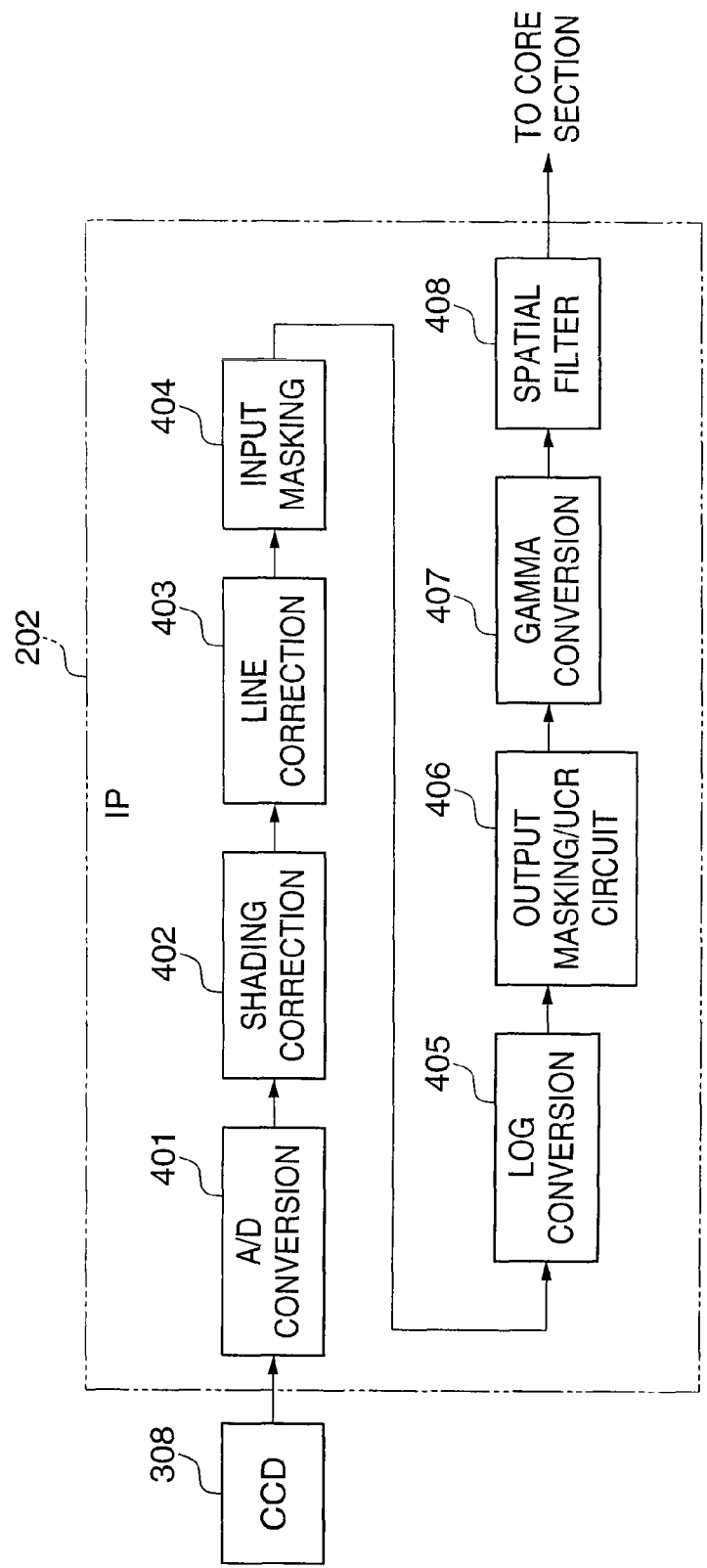
FIG. 4 is a block diagram showing the construction of an IP section 202 appearing in FIG. 2.

Next, the construction of the IP section 202 will be described with reference to FIG. 4. An optical signal inputted via the scanner section 201 is converted into an electric signal by the CCD sensor 308. This CCD sensor 308 is a 3-line color sensor for R (Red), G (green), and B (blue), and separate image signals for R, G, and B from the CCD sensor 308 are inputted into an A/D conversion section 401 of the IP section 202. After gain adjustment and offset adjustment have been performed by the A/D conversion section 401, the signals for the respective colors are converted into 8-bit digital image signals R0, G0, and B0. Thereafter, each color is subjected to a well-known shading correction by a shading correction section 402 using a read signal from a reference white plate. In addition, the line sensors for the respective colors in the CCD sensor 308 are arranged at intervals of a predetermined distance from one another, so that spatial misalignments in the sub-scanning direction are adjusted by a line delay adjusting circuit (line correction section) 403.

An input masking section 404 converts a read color space that is determined by the spectral characteristics of R, G, B filters of the CCD sensor 308 to a standard color space according to NTSC (National Television System Committee) Standards, and performs a 3×3 matrix calculation using constants that are unique to the apparatus and have been determined with various characteristics taken into account, such as the sensitivity characteristics of the CCD sensor 308 and the spectral characteristics of the illuminating lamp, thereby converting the inputted (R0, G0, B0) signals into standard (R, G, B) signals. In addition, a luminance/density conversion section (LOG conversion section) 405 is composed of a look-up table (LUT) RAM and converts luminance signals for R, G, and B into density signals C1, M1, and Y1.

An output masking/UCR circuit section 406 converts, using a matrix calculation, the C1, M1, and Y1 signals into signals for Y (yellow), M (magenta), C (cyan), and K (black) that are the toner colors of the color MFP 104. The output masking/UCR circuit section 406 converts the C1, M1, Y1, and K1 signals that are based on the R, G, and B signals read by the CCD sensor 308 to a CMYK signal that is based on the spectral distribution characteristics of the toners and outputs the resulting signal. Next, a gamma conversion section 407 converts the CMYK signal into CMYK data for image output using an LUT RAM that takes various color characteristics of the toners into account, a spatial filter 408 carries out sharpening or smoothing processing on the CMYK data, and the resulting image signal is sent to the core section 206.

When monochromatic image processing is performed by the black-and-white MFP 105, A/D conversion and shading may be performed for one color using a monochromatic one-line CCD sensor, and input/output masking processing, gamma conversion processing, and spatial filter processing may then be performed in that order.

Figure 5:
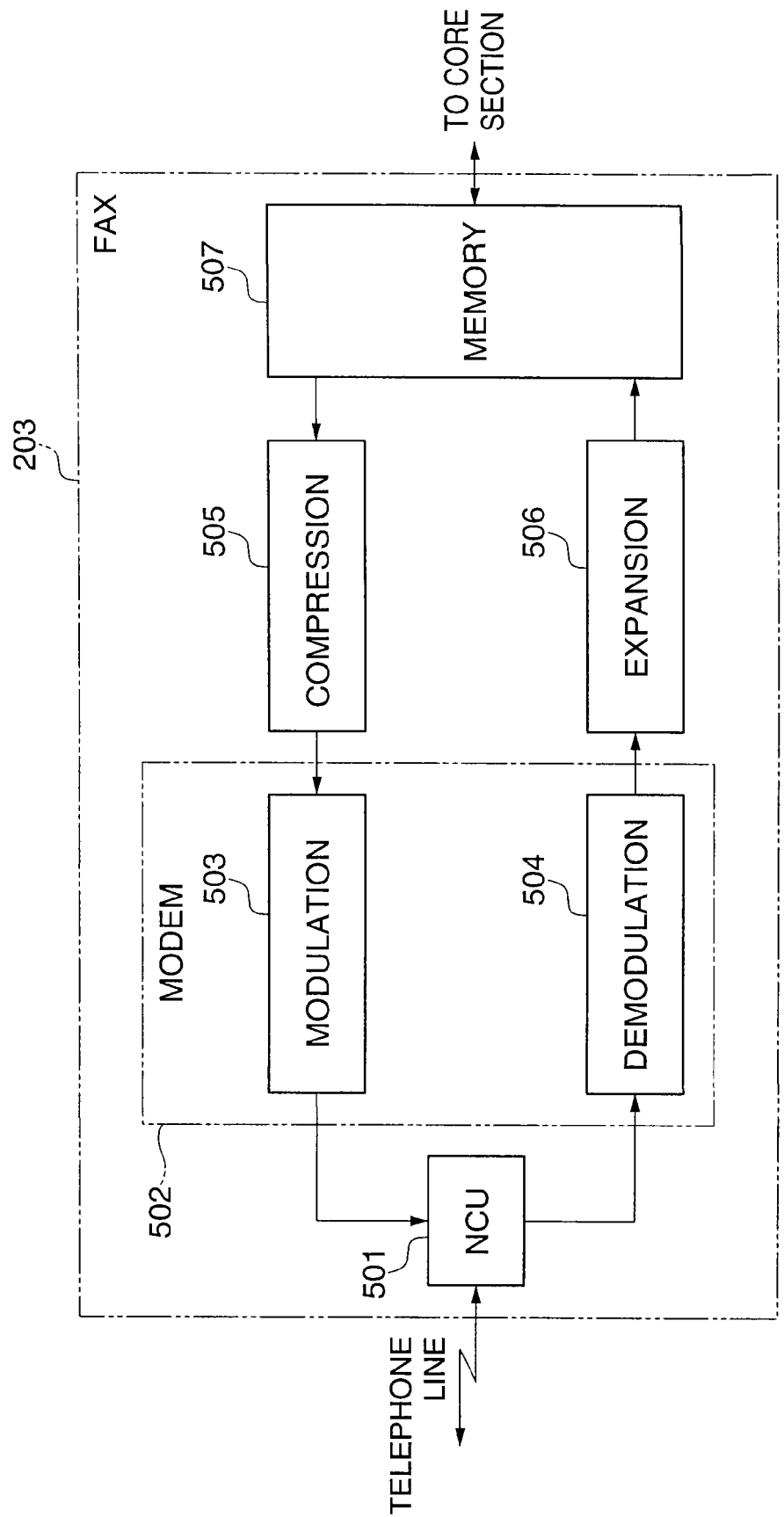
FIG. 5 is a block diagram showing the construction of a FAX section 203 appearing in FIG. 2.

Next, the FAX section 203 will be described with reference to FIG. 5. First, during reception, the reception voltage of data that arrives via a telephone line is converted by an NCU section 501 and then A/D conversion and demodulation operation are performed by a demodulation section 504 inside a modem section 502, before the data is expanded into raster data by an expansion section 506. The run-length method or the like is usually used for compression and expansion by facsimile machines. The image that has been converted into raster data is temporarily stored in a memory 507 and after it has been confirmed that there are no transfer errors in the image data, the image data is sent to the core section 206. During transmission, an image signal for a raster image that is sent from the core section 206 is subjected to compression by the run-length method or the like, by a compression section 505 and, after D/A conversion and modulation operation have been performed by a modulation section 03 in the modem section 502, the image signal is sent to the telephone line via the NCU section 501.

Figure 6:
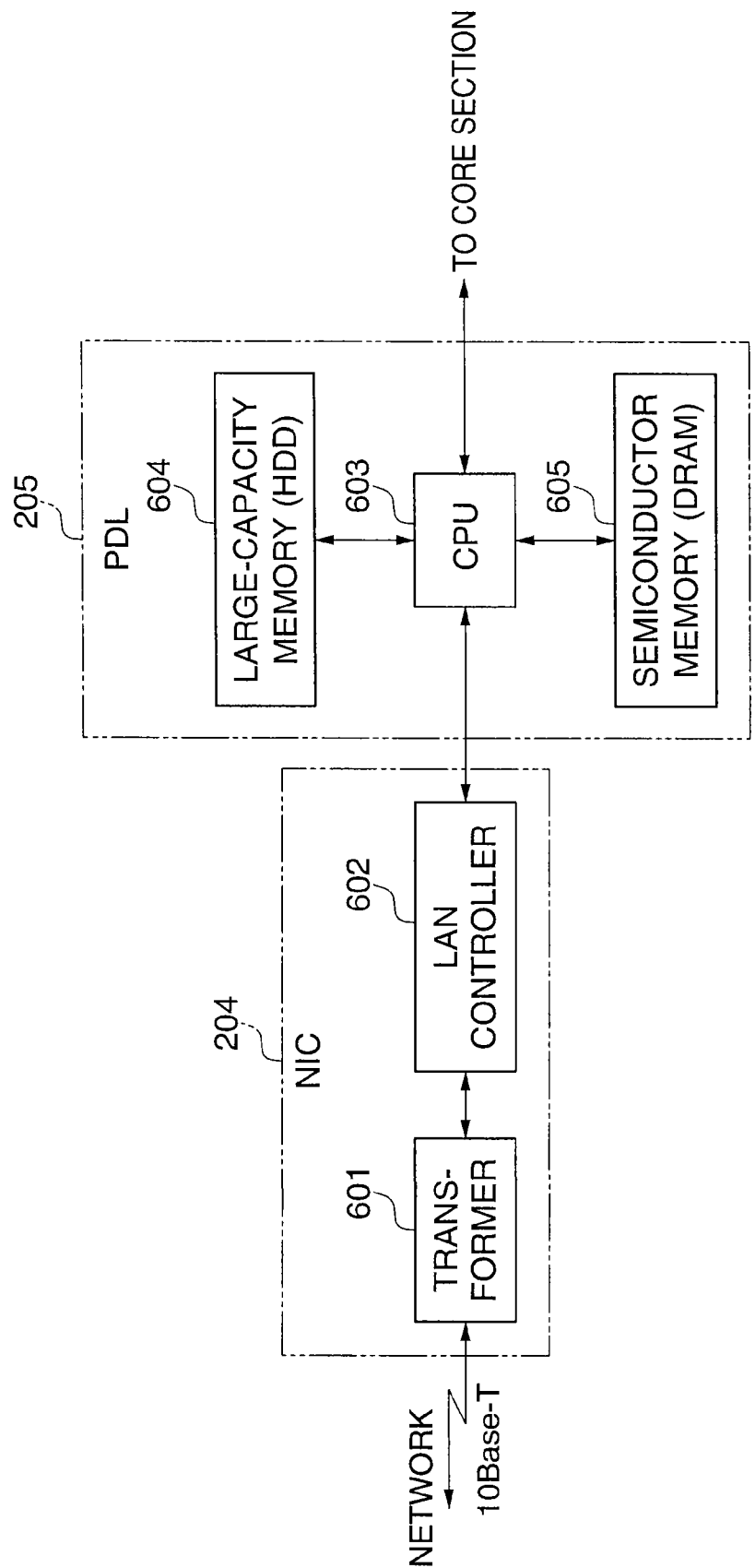
FIG. 6 is a block diagram showing the construction of a NIC section 204 and a PDL section 205 appearing in FIG. 2.

Next, the construction of the NIC section 204 will be described with reference to FIG. 6. The NIC section 204 functions as an interface for the network 101, to obtain information from outside and to supply information to the outside, using an ETHERNET (registered trademark) cable, such as a 10 Base-T/100 Base-TX cable.

When information is obtained from outside, first, a voltage conversion is performed on the information by a transformer section 601 and then the information is sent to a LAN controller section 602. The LAN controller section 602 is internally equipped with a first buffer memory (not shown in the figure) and after it is determined that the information is necessary information, the information is sent to a second buffer memory (not shown in the figure), and then the information signal is sent to the PDL section 205. To supply information to the outside, required information is added by the LAN controller section 602 to data sent from the PDL section 205 and the data is supplied to the network 101 via the transformer section 601.

Next, the construction of the PDL section 205 will be described with reference to FIG. 6. Image data that has been generated by application software that runs on the client computer 103 is composed of text, graphics, photographs, or the like, each of which is composed of a combination of image descriptive elements, such as character codes, graphics codes, and raster image data. This is so-called PDL (Page Description Language), a representative example of which is the POSTSCRIPT (registered trademark) language developed by ADOBE SYSTEMS INCORPORATED.

The PDL section 205 performs a conversion process that converts the above PDL data into raster image data. First, PDL data sent from the NIC section 204 is stored, via a CPU 603, in a large-capacity memory 604, such as a hard-disk drive (HDD), where data is managed and stored for jobs. Next, as necessary the CPU 603 performs RIP (Raster Image Processing) to expand the PDL data into a raster image. The expanded raster image data is stored in page units for each color component of CMYK for each job in a semiconductor memory 605, such as a DRAM, that can be accessed at high speed, and depending on the status of the printer section 208, the data is sent back to the core section 206 via the CPU 603.

Figure 7:
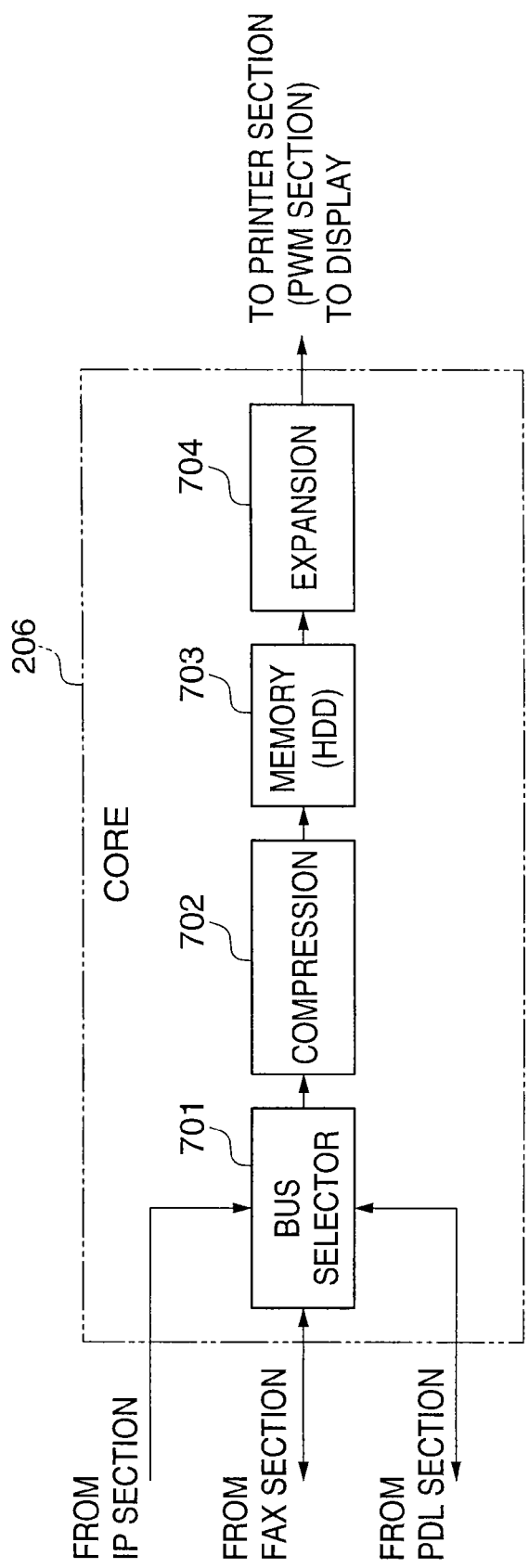
FIG. 7 is a block diagram showing the construction of a core section 206 appearing in FIG. 2.

Next, the construction of the core section 206 will be described with reference to FIG. 7. A bus selector section 701 of the core section 206 performs "traffic control" regarding the use of the color MFP 104 and the black-and-white MFP 105. Specifically, the bus selector section 701 switches the bus in accordance with various functions of the color MFP 104 and the black-and-white MFP 105, such as a copying function, a network scanner function, a network printer function, a facsimile transmission/reception function and a display function.

Patterns of bus switching for performing the various functions are given below.

Copying function: scanner section 201→core section 206→printer section 208

Network scanner function: scanner section 201→core section 206→NIC section 204

Network printer function: NIC section 204→core section 206→printer section 208

Facsimile transmission function: scanner section 201→core section 206→FAX section 203

Facsimile reception function: FAX section 203→core section 206→printer section 208

Display function: scanner section 201 or FAX section 203 or NIC section 204→core section 206→display section 210.

Next, the image data outputted from the bus selection section 701 is sent to the printer section 208 (the PWM section 207) or the display section 210 via a compression section 702, a memory 703, which is composed of a large-capacity memory such as a hard disk drive (HDD), and an expansion section 704. The compression method used by the compression section 702 may be a common method such as JPEG (Joint Photographic Experts Group), JBIG (Joint Bi-Level Image Experts Group), and ZIP. The compressed image data is managed for each job and is stored together with additional data such as a filename, a creator name, created time and date, and a file size.

Additionally, if a job number and password are provided and stored together with the above information, it is possible to support a personal box function. This is for temporarily storing data and only allowing a specified person to print out (read from the HDD) the data. When an instruction to print out a stored job has been given, authentication is performed using the password, the image data is then called from the memory 703, and image expansion is performed to restore the image data to a raster image, which is sent to the printer section 208.

Figures 8A, 8B:
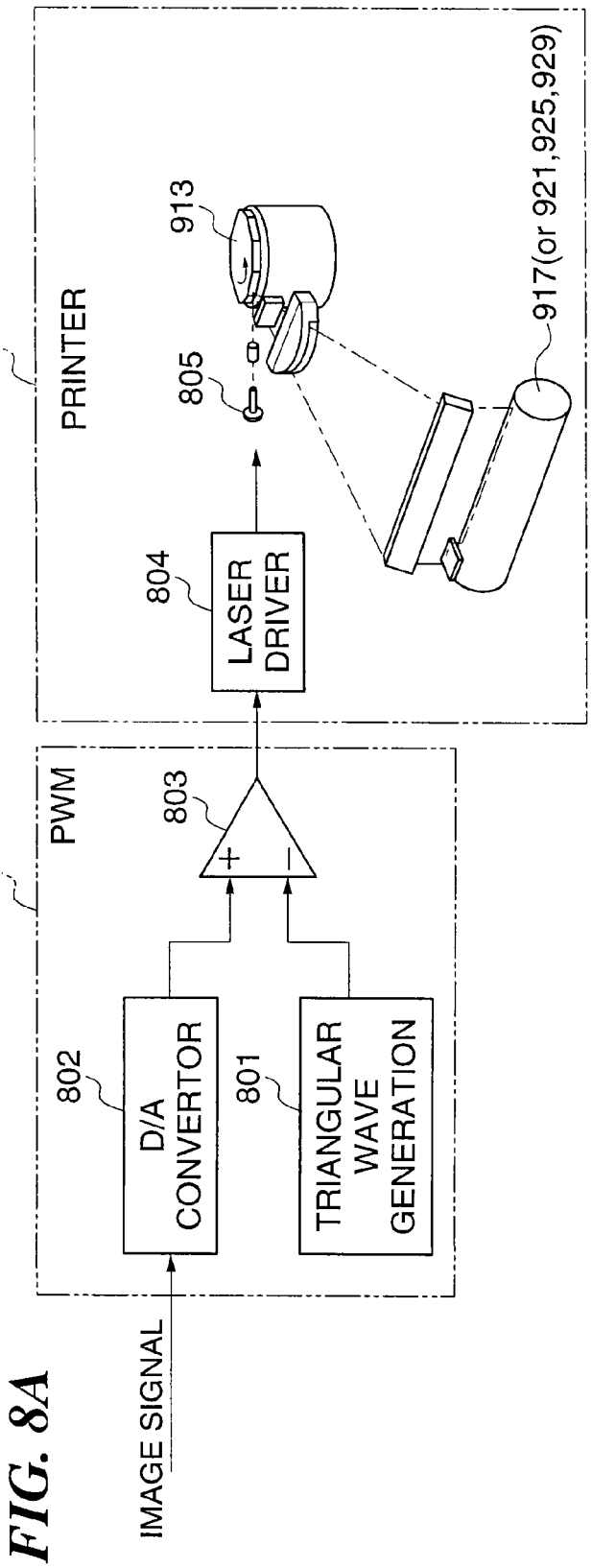

Next, the construction of the PWM section 207 will be described with reference to FIGS. 8A and 8B. A set of image data which have been decomposed into four colors, yellow (Y), magenta (M), cyan (C), and black (K), that have been outputted from the core section 206 (in the case of the black-and-white MFP 105, this is monochrome data) pass the respective PWM sections 207 where image formation is performed for each color. Reference numeral 801 denotes a triangular wave generator, and reference numeral 802 denotes a D/A converter (D/A conversion section) that converts an inputted digital image signal into an analog signal. The sizes of a signal ("a" in FIG. 8B) from the triangular wave generator 801 and a signal ("b" in FIG. 8B) from the D/A converter 802 are compared by a comparator 803, resulting in a signal such as one shown by "c" in FIG. 8B which is sent to a laser driving section 804, where each of the CMYK data is converted into a laser beam by a corresponding one of respective lasers 805 for C, M, Y, and K. A polygon scanner 913 scans the respective laser beams to irradiate respective photosensitive drums 917, 921, 925, and 929.

Figure 9:
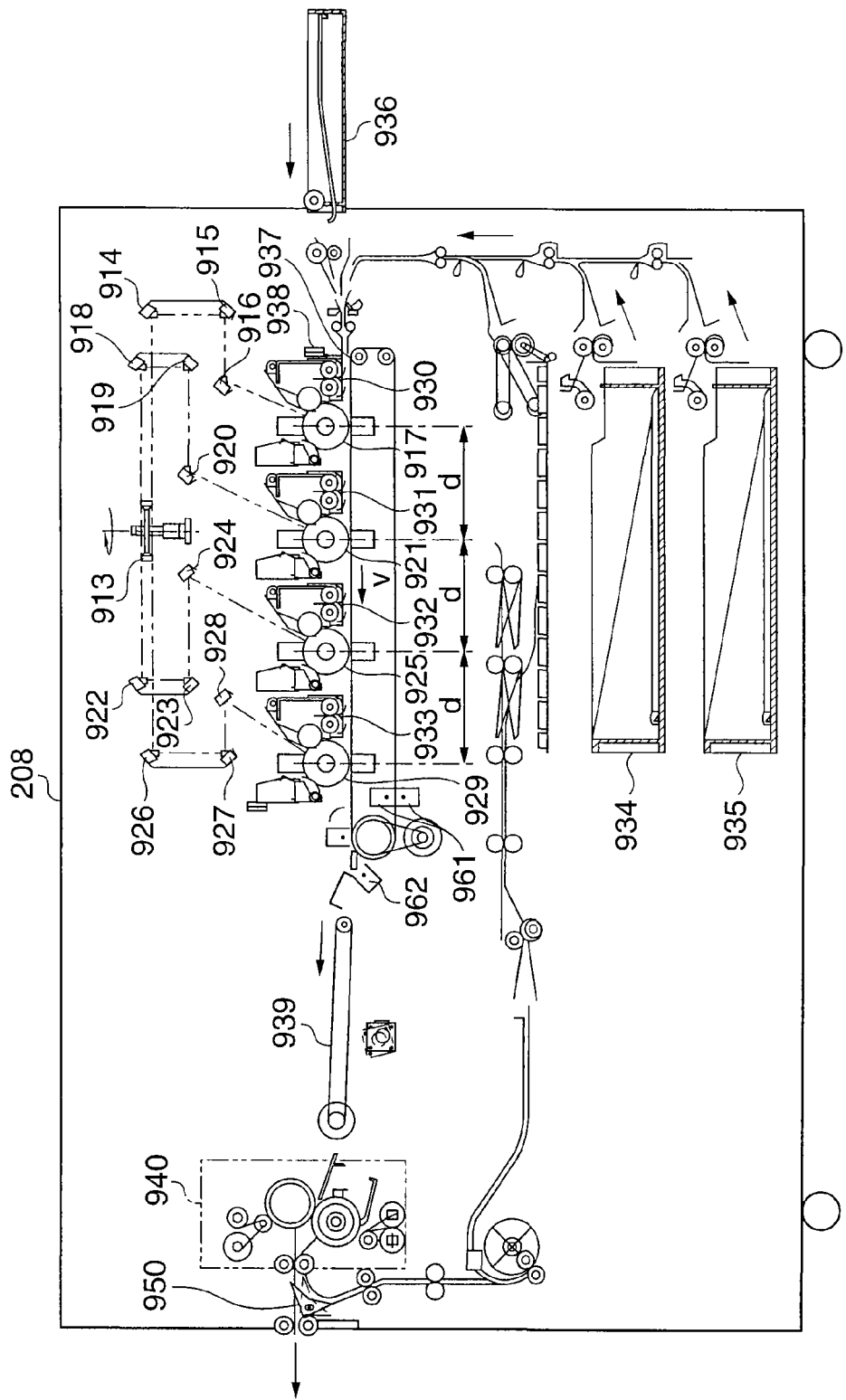
FIG. 9 is a block diagram showing the internal construction of the printer section 208 of the color MFP 104.

Next, the construction of the printer section 208 of the color MFP 104 will be schematically described with reference to FIG. 9. Reference numeral 913 denotes a polygon mirror on which the four laser beams generated by the four semiconductor lasers 805 (see FIG. 8) are incident. Of these, one laser beam passes via mirrors 914, 915, and 916 and scans a photosensitive drum 917, the next laser beam passes via mirrors 918, 919, and 920 and scans a photosensitive drum 921, the next laser beam passes via mirrors 922, 923, and 924 and scans a photosensitive drum 925, and the next laser beam passes via mirrors 926, 927, and 928 and scans a photosensitive drum 929.

On the other hand, reference numeral 930 denotes a developer that supplies yellow (Y) toner, so that a yellow toner image is formed on the photosensitive drum 917 in accordance with the laser light. Reference numeral 931 denotes a developer that supplies magenta (M) toner, so that a magenta toner image is formed on the photosensitive drum 921 in accordance with the laser light. Reference numeral 932 denotes a developer that supplies cyan (C) toner, so that a cyan toner image is formed on the photosensitive drum 925 in accordance with the laser light. Reference numeral 933 denotes a developer that supplies black (K) toner, so that a black toner image is formed on the photosensitive drum 929 in accordance with the laser light. By transferring the toner images of the above four colors (Y, M, C, K) onto a sheet, a full-color output image can be obtained.

A sheet that has been fed from one of sheet cassettes 934 and 935 and a manual feeding tray 936 passes via a resist roller 937, is attached to a transfer belt 938 by attraction, and is conveyed by the belt 938. In synchronization with the sheet feeding, toners of respective colors are used to develop images on the photosensitive drums 917, 921, 925, and 929 in advance and the toners are transferred onto the sheet as the sheet is conveyed. The sheets on which the various color toners have been transferred are separated and are conveyed by a conveying belt 939, and the toner is fixed onto each sheet by a fixer 940. The sheet that comes out of the fixer 940 is discharged. Since each sheet is discharged face up, printing operations are performed in order starting with the last page.

The four photosensitive drums 917, 921, 925, and 929 are arranged at equal intervals of a distance "d", a sheet is conveyed by the conveying belt 939 at a constant velocity V, and the four semiconductor lasers 805 (see FIG. 8A) are driven in synchronization with the conveying timing of the sheet.

Figure 10:
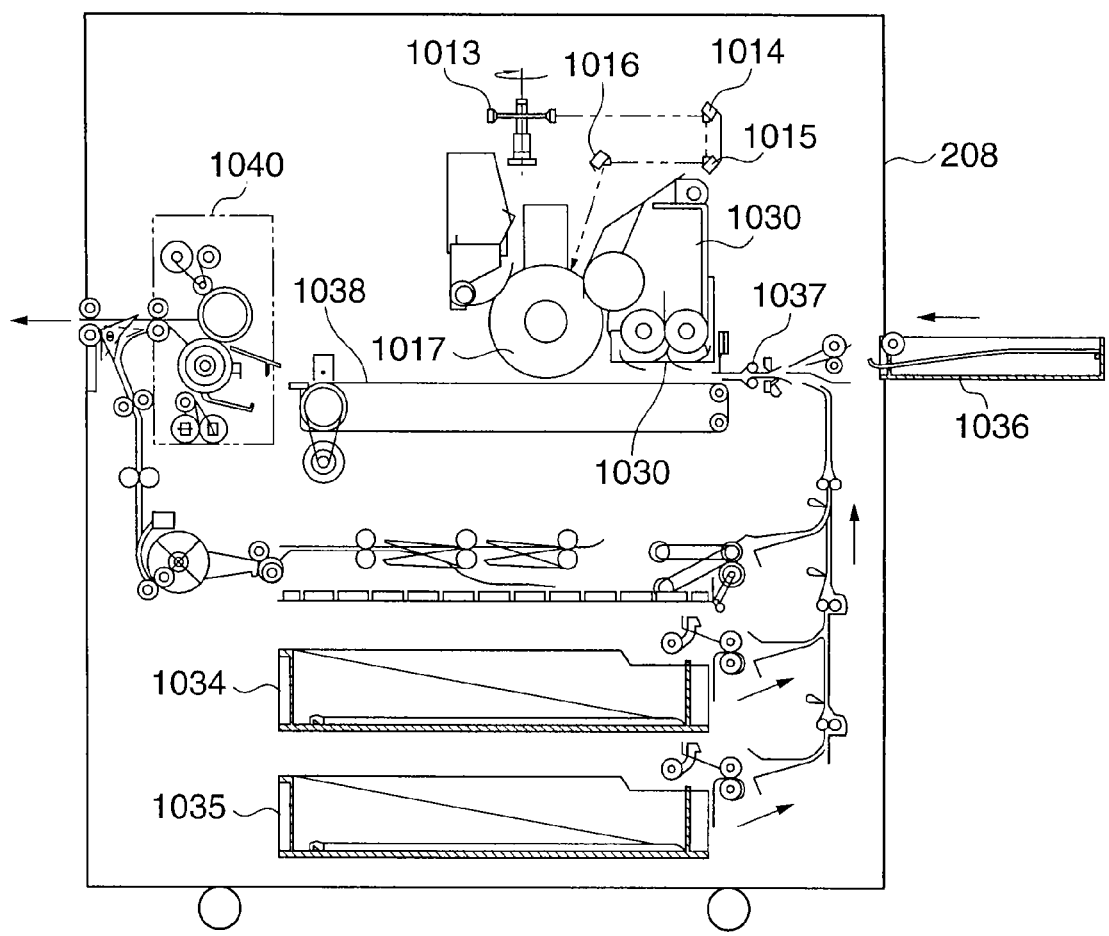
FIG. 10 is a block diagram showing the internal construction of the printer section 208 of the black-and-white MFP 105.

Next, the construction of the printer section 208 of the black-and-white MFP 105 will be schematically described with reference to FIG. 10. Reference numeral 1013 denotes a polygon mirror on which laser beams generated by the four semiconductor lasers 805 (see FIG. 8) are incident. The laser beams pass via the mirrors 1014, 1015, and 1016 and scan a photosensitive drum 1017. On the other hand, reference numeral 1030 denotes a developer that supplies black (K) toner, so that a black toner image is formed on the photosensitive drum 1017 in accordance with the laser light. By transferring the toner image onto a sheet, an output image can be obtained.

A sheet that has been fed from one of sheet cassettes 1034 and 1035 and a manual feeding tray 1036 passes via a resist roller 1037, is attached to a transfer belt 1038 by attraction, and is conveyed by the belt 1038. In synchronization with the timing of the sheet feeding, toner is used to develop an image on the photosensitive drums 1017 in advance and the toner is transferred onto the sheet as the sheet is conveyed. The sheets on which the toner has been transferred are separated and the toner is fixed onto each sheet by a fixer 1040. The sheet that comes out of the fixer 1040 is discharged. Since each sheet is discharged facing upwards, printing operations are performed in order starting with the last page. Also, by using an inverting section 1041, it is possible to perform processing in order starting with the first page with the sheets being discharged facing downwards.

Figure 11:
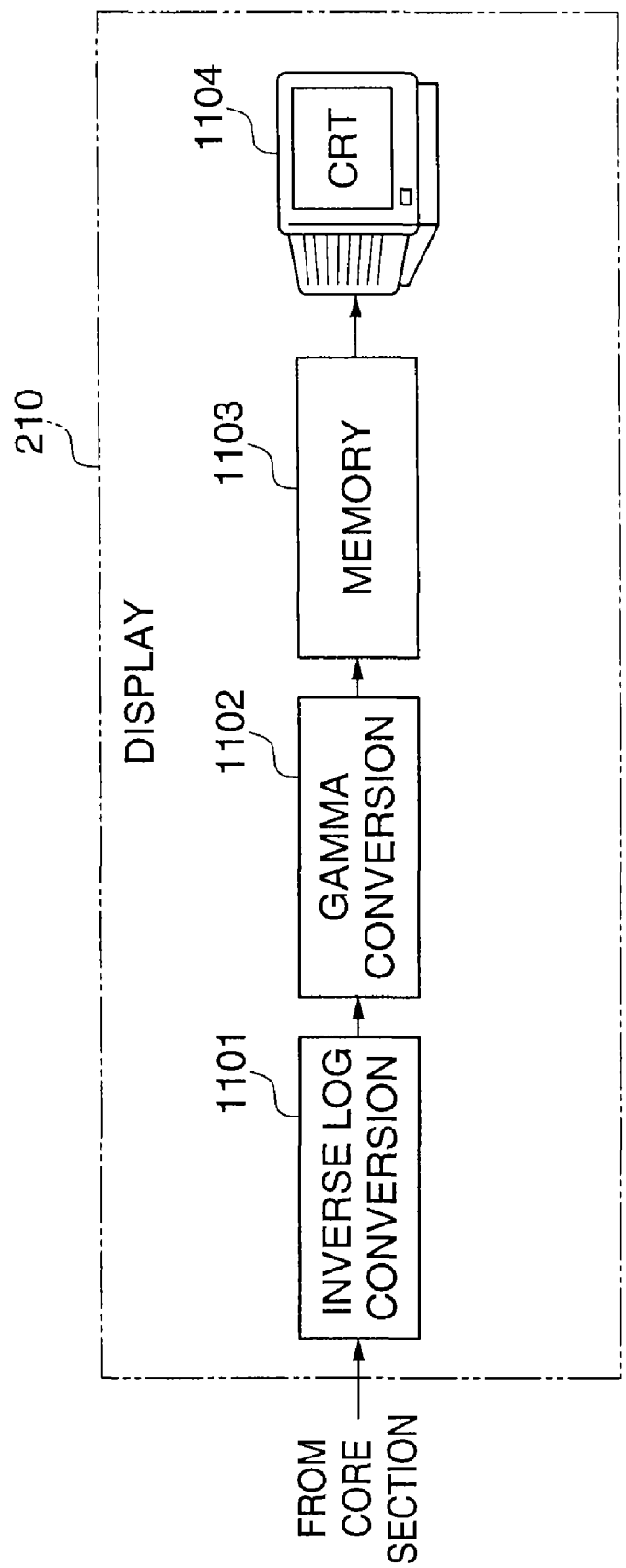
FIG. 11 is a block diagram showing the construction of a display section 210 appearing in FIG. 2.

Next, the construction of the display section 210 will be described with reference to FIG. 11. The image data outputted from the core section 206 is CMYK data, so that it is necessary to convert the data into R, G, and B data in an inverse LOG conversion section 1101. Next, an output conversion is performed by a gamma conversion section 1102 using a look up table so that the data matches the color characteristics of a display device 1104, such as a CRT, on which the data is displayed. The converted image data is temporarily stored in a memory section 1103 and is displayed by the display device 1104.

Here, the display section 210 is used in cases where a preview function for confirming the output image in advance or a proofing function for confirming that the outputted image is definitely the intended image is executed, or when the user wishes to confirm an image to determine whether it requires printing, so that the wasteful usage of print sheets can be avoided.

Next, the utility software that runs on the client computer 103 and the server computer 102 will be described. Standardized databases called MIB (Management Information Bases) are constructed in the network interface parts (the NIC section 204 and the PDL section 205) inside the color MFP 104 and the black-and-white MFP 105. Using a network management protocol called SNMP (Simple Network Management Protocol), communication is performed on the network with the server computer 102 and the client computer 103, so that the color MFP 104, the black-and-white MFP 105, and scanners, printers, facsimile machines, etc., connected on the network can be managed.

On the other hand, software programs called utilities run on the client computer 103 and the server computer 102, so that information can be exchanged as necessary using the MIBs through the use of the above-mentioned SNMP on the network. For example, by using the MIBs when detecting whether the stacker 107 and the stacker trays 1207 have been set as equipment information of the color MFP 104 and the black-and-white MFP 105, when detecting whether printing can presently be performed as status information, or when writing, changing and confirming the names and installing positions of the color MFP 104 and the black-and-white MFP 105, the user can confirm information on the color MFP 104 and the black-and-white MFP 105 that are connected to the network, on the client computer 103 and the server computer 102. These information may be used to distinguish between the server computer 102 and the client computer 103 so that restrictions may be imposed on the reading and writing of each computer.

Therefore, by using these functions, a user can obtain all kinds of information for management and control of the equipment information of the color MFP 104 and the black-and-white MFP 105, the status of apparatuses, the network settings, the progress of processing of jobs, and the usage status of the color MFP 104 and the black-and-white MFP 105.

Figure 13:
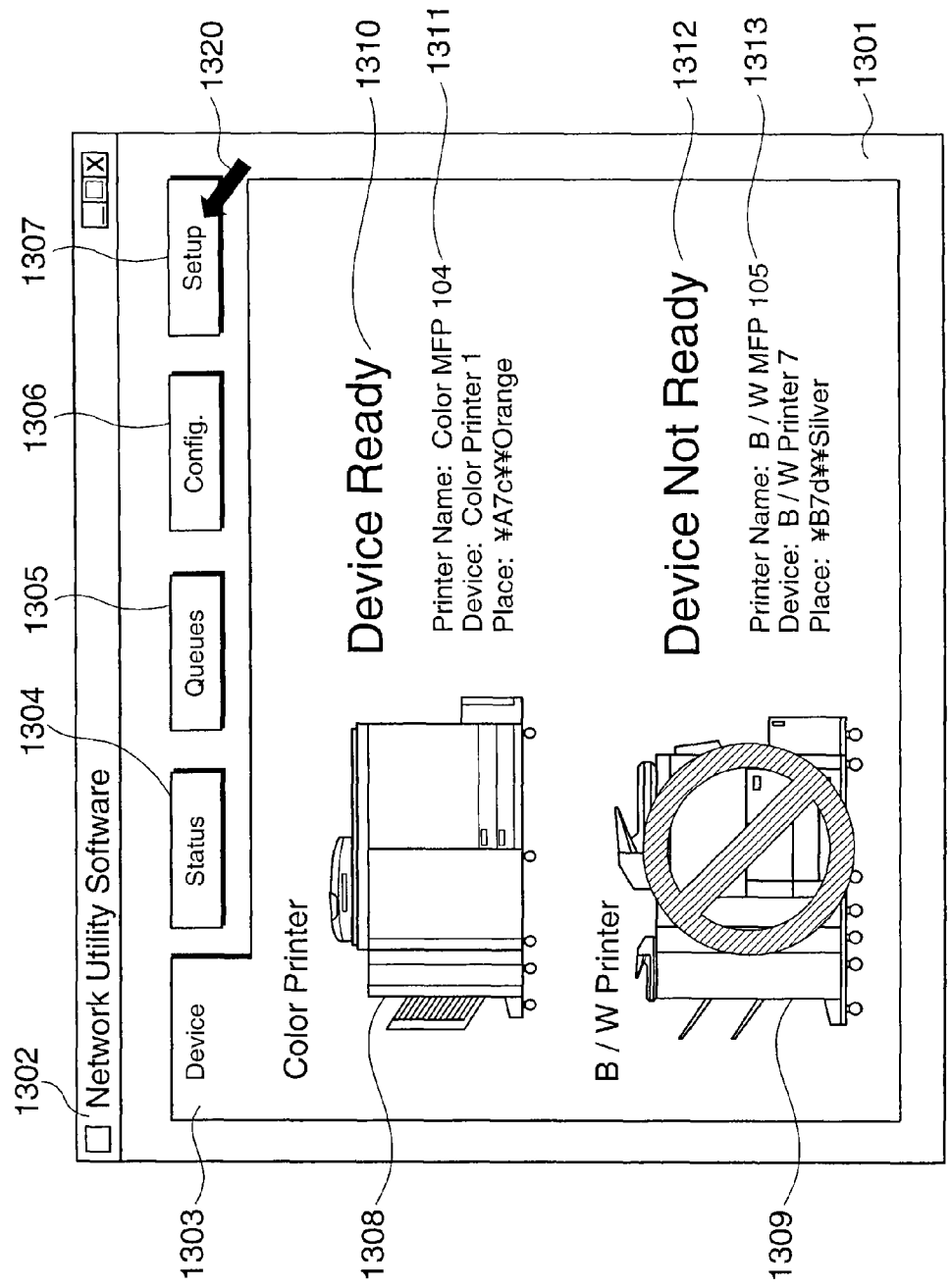
FIG. 13 is a diagram showing an example of a screen according to utility software executed by a server computer 102 or a client computer 103 appearing in FIG. 1.

Next, screens of utility software called a GUI (Graphic User Interface) that runs on the screen of the server computer 102 or the client computer 103 will be described with reference to FIG. 13. When the utility software is launched on the client computer 103 or the server computer 102, a screen shown in FIG. 13 is displayed. Here, reference numeral 1301 denotes a window, and reference numeral 1320 denotes a cursor. When the user clicks on a tab using a mouse, a different window is opened or the display proceeds to the next status. Reference numeral 1302 denotes a title bar which is used to display a position of the present window in a hierarchy and a title. Reference numerals 1303 to 1307 denote tabs that are allotted to different types of information, to display required information, and to select required information.

Here, reference numeral 1303 denotes a "Device tab" which can inform the user of the presence of devices and summaries of such devices. On the "Device" tab 1303, there are bitmap images, denoted by reference numerals 1308 and 1309, that show the color MFP 104 and the black-and-white MFP 105, and the statuses of these MFPs are displayed by messages denoted by reference numerals 1310, 1311, 1312, and 1313. The details of the apparatus statuses can be understood by looking at a "Status" tab 1304. Next, reference numeral 1305 denotes a "Queues" tab, which makes it possible to know the states of jobs that have been queued in each of the apparatuses and how busy each device is.

Next, a "Config." tab 1306 makes it possible to know equipment information such as what functions are provided in a finisher that has been attached. For example, this tab shows whether an inserter or a finisher has been attached to the black-and-white MFP 105, whether a letter-sized paper deck with a capacity of up to 5,000 sheets has been attached, around how many sheets are remaining, or whether a unit for performing two-sided processing has been attached (FIG. 13 shows an example where a finisher has been attached). A "Setup" tab 1307 makes it possible to know network setting information of the apparatuses.

Figure 12:
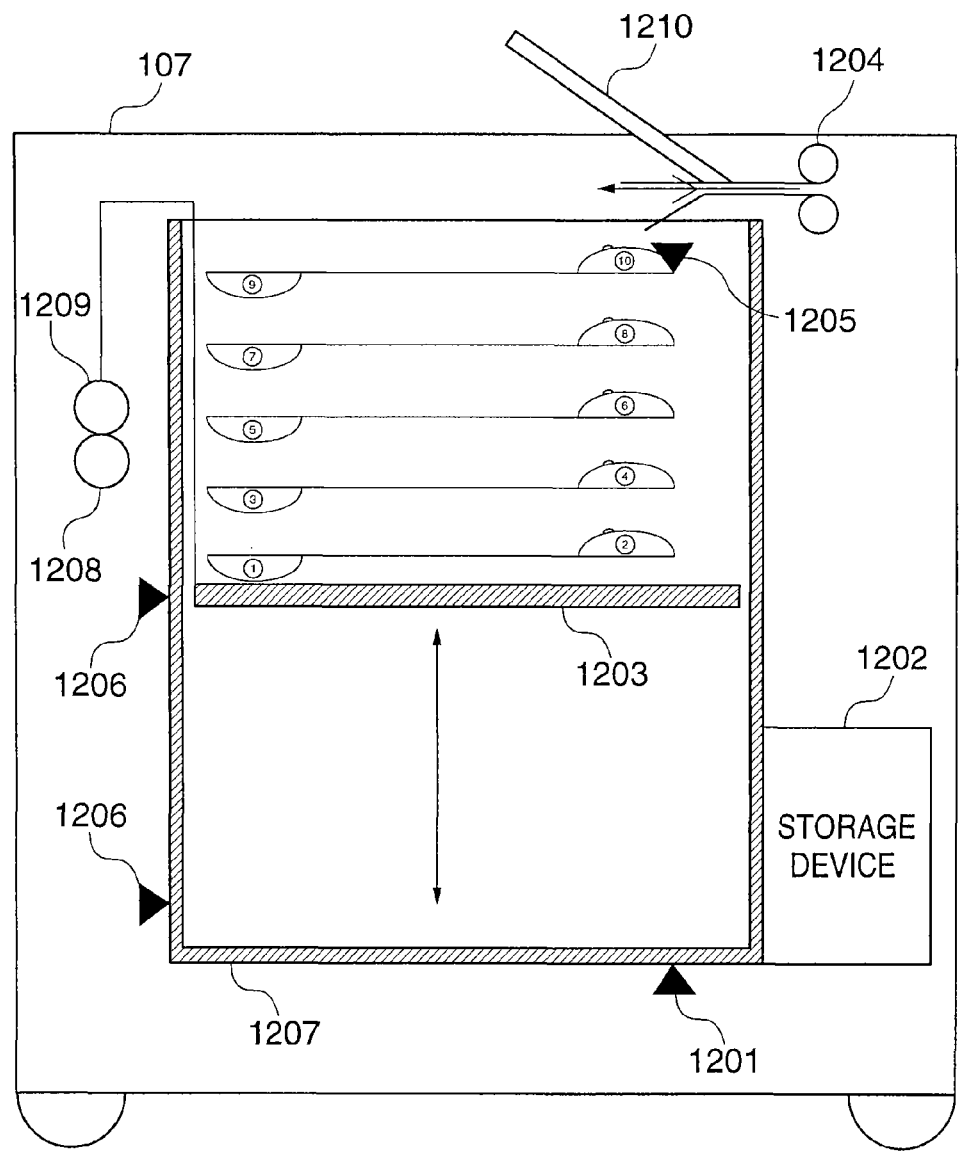
FIG. 12 is a diagram showing a flow of stacking and storage of output sheets by a stacker 107 appearing in FIG. 2.

Next, how the stacker 107 is used to stack and store output sheets of mainly the color MFP 104 will be briefly described with reference to FIG. 12. The stacker tray 1207 is detachably attached to the stacker 107, and in actuality sheets are stacked in this stacker tray 1207. Sheets that have been printed upon by the printer section 208 of the color MFP 104 are fed into the stacker 107, "S-placing mode" or "F-placing mode" is selected as the stacking mode in accordance with the type of job, and the sheets are stacked and stored. Here, assuming, for example, that there are three color image pages to be mixed, a method in which sheets for the same page for each of the set number of copies are stacked is called "S-placing mode", while a method in which sheets for a set of three pages are stacked in order of page is called "F-placing mode". FIG. 12 shows an example where sheets are placed in the stacker tray 1207 in F-placing mode. A tray 1210 into which sheets can be discharged is disposed in the stacker 107 such that an upper part of the tray 1210 projects out of the stacker 107 and a lower part of the tray 1210 is connected to a sheet conveying path inside the stacker 107. A discharge path to the tray 1210 can be switched between different paths, using a solenoid (not shown in FIG. 12).

A lifter device is comprised of a lifter section 1203, a stacker tray presence detecting sensor 1201, a sheet surface position detecting sensor 1205, a lifter position detecting sensor 1206, and gears 1208 and 1209, that drive the lifter section 1203, and so forth. The lifter section 1203 is controlled so as to keep the height from a discharge port 1204 to the sheet surface constant, based on an output from the sheet surface position detecting sensor 1205 that detects the position of the sheet surface, to thereby improve the stackability of sheets on which image formation has been performed. Also, as one example of a method of driving the lifter section 1203 up and down, a motor (not shown in FIG. 12) that is provided in the stacker 107 can drive the lifter section 1203 up and down by transmitting the driving force via the gear 1208 to the gear 1209 that can wind a wire that is connected to the lifter section 1203.

Figure 18:
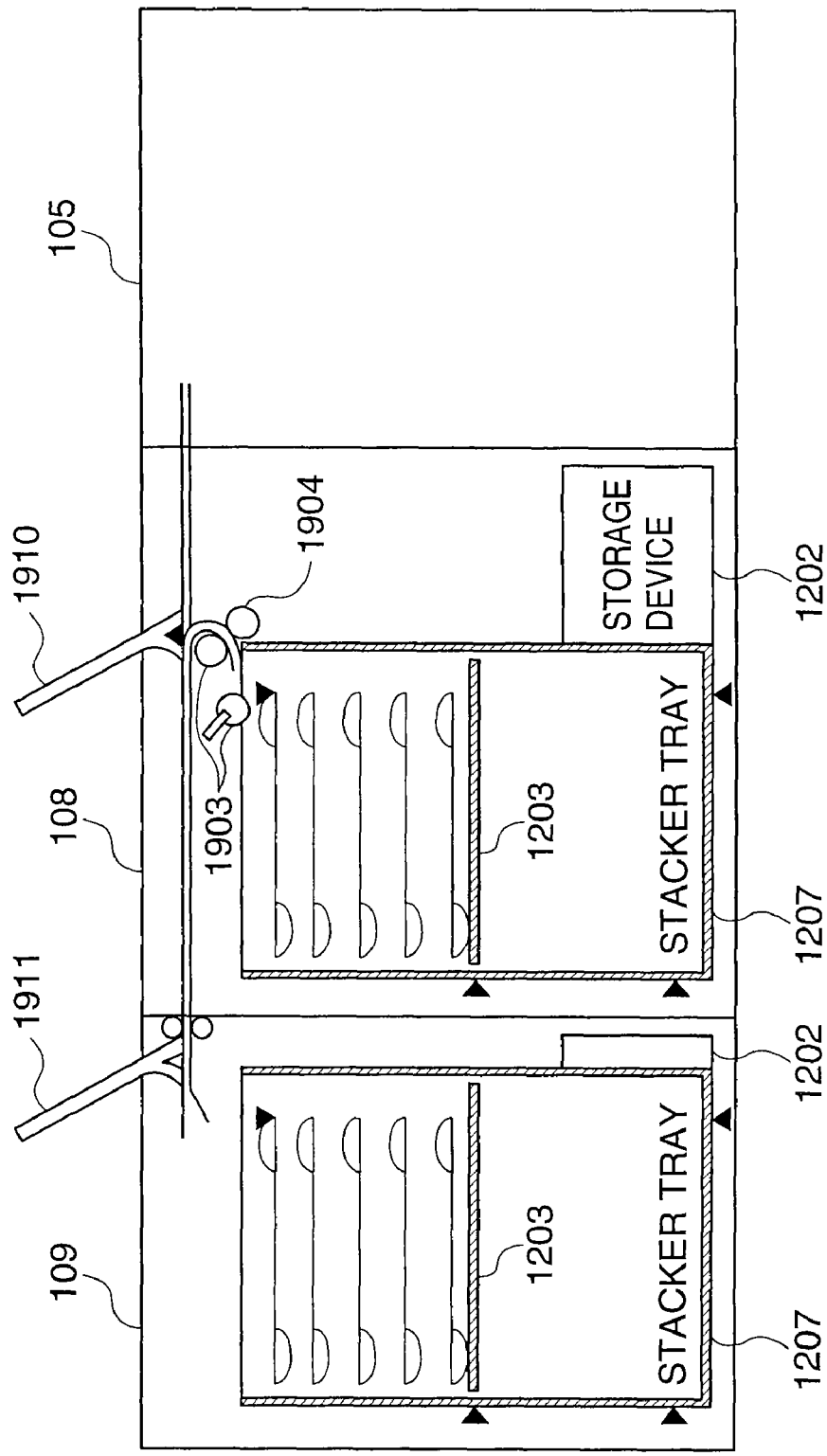
FIG. 18 is a schematic diagram showing an outline of the inserter 108 and a large-capacity stacker 109 attached to the black-and-white MFP 105.

The lifter position detecting sensor 1206 detects the amount of sheets stacked in the stacker tray 1207 by detecting the position of the lifter section 1203, and by providing such sensors 1206 at a plurality of positions, the detection accuracy can be improved. Any type of construction, such as a flag-type sensor, optical sensor, image sensor may be used for the sheet surface position detecting sensor 1205 and the lifter position detecting sensor 1206, with each sensor being provided on the stacker 107 side. As shown in FIG. 18, when the stacker tray 1207 is attached to the inserter 108 and sheets are refed, the lifter device also functions to keep the height of the sheet surface constant relative to a paper feeding roller 1903.

A storage device 1202 is provided on the stacker tray 1207, for writing storage information for performing color/black-and-white mixing where color output sheets on which images have been formed by the color MFP 104 are inserted into black-and-white output sheets on which images have been formed by the black-and-white MFP 105. Here, the storage device 1202 may be used to write insertion information for inserting black-and-white output images into color output images. The insertion information that is written in the storage device 1202 is for example a paper size, a job ID, a print number, the number of output sheets, the number of copies (the number of times sheets for the same page are to be outputted), a paper stacking method, and material (a paper type such as plain paper or thick paper), and these information is used for matching color data and black-and-white data with each other and page alignment so as to enable a mixing operation to be performed. When sheets are stacked in the stacker 107, the control of stacking using the lifter device may be omitted, and instead, the output sheets from the color MFP 104 may be stacked naturally as they are.

Next, the construction of the inserter 108 will be schematically described with reference to FIG. 18. The inserter 108 performs color/black-and-white mixing by feeding and conveying color output sheets, which have been outputted from the color MFP 104 and stacked and stored in the stacker tray 1207, in accordance with the storage information in the storage device 1202 mentioned above so as to insert the color output sheets between black-and-white output sheets that are outputted from the black-and-white MFP 105. The inserter 108 is characterized by using the stacker tray 1207 as a means for stacking and storing color output sheets in advance so that the color output sheets to be inserted can be mixed with black-and-white output sheets.

Control is provided so as to raise the color output sheets stored in the stacker tray 1207 in the inserter 108 using the lifter section 1203 of the stacker tray 1207, as is the case with a stacker tray 1207 in the stacker 107 described above, so as to keep the height of the sheet surface constant with respect to the paper feeding roller 1903. In addition, a mechanism including a multiple feeding prevention roller 1904 is used that prevents a plurality of sheets from being simultaneously fed by rotating the roller 1904 in a reverse direction to the paper feeding roller 1903. As is the case with the tray 1210 of the stacker 107 described above, a tray 1910 into which sheets can be discharged is disposed in the stacker 108 such that an upper part of the tray 1910 projects out of the inserter 108 and a lower part of the tray 1910 is connected to a sheet conveying path inside the inserter 108, and a discharge path to the tray 1910 can be switched between different paths using a solenoid (not shown in FIG. 18). It is also possible to feed sheets (such as colored paper) from the tray 1910, as described later with reference to FIG. 26.

Next, the construction of the large-capacity stacker 109 will be schematically described with reference to FIG. 18. A bundle of sheets for a job (job bundle) that are stacked in the stacker tray 1207 in the inserter 108 and a bundle of sheets for the job (job bundle) that have been outputted from the black-and-white MFP 105 are mixed together as appropriate by the control described above and the mixed job bundles are successively stored in the large-capacity stacker 109 that is attached to a downstream side of the inserter 108. A group of job bundles that have thus been stacked in the large-capacity stacker 109 are thereafter subjected to processing such as binding and finishing in an offline manner.

The mechanism for performing the finishing processing includes a stapler for binding, a Z-shaped folding device for folding sheets in a Z-shape, a puncher for punching two (or three) holes for filing, etc. and the mechanism carries out such processing according to the type of a job to be performed. Other binding methods may include glue binding for booking, and trimming, such as cutting side edges of the sheets after binding opposite to the bound side edges to align the opposite side edges. A construction is more effective that the stacker tray 1207 described above also serves as a sheet storage means of the large-capacity stacker 109. Also, as is the case with the tray 1210 of the stacker 107 described above, a tray 1911 into which sheets can be discharged is disposed in the large-capacity stacker 109 such that an upper part of the tray 1911 projects out of the large-capacity stacker 109 and a lower part of the tray 1911 is connected to a sheet conveying path inside the large-capacity stacker, and a discharge path to the tray 1911 can be switched between different paths using a solenoid (not shown in FIG. 18).

Next, the separation of a job into color image printing and black-and-white image printing will be described with reference to FIG. 14. When the color MFP 104 is used from the server computer 102 or the client computer 103 to perform printing based on a job in which color image pages and black-and-white image pages are mixed, first a driver, which is software running on the server computer 102 or the client computer 103, is used to transfer the job to the color MFP 104.

Figure 14:
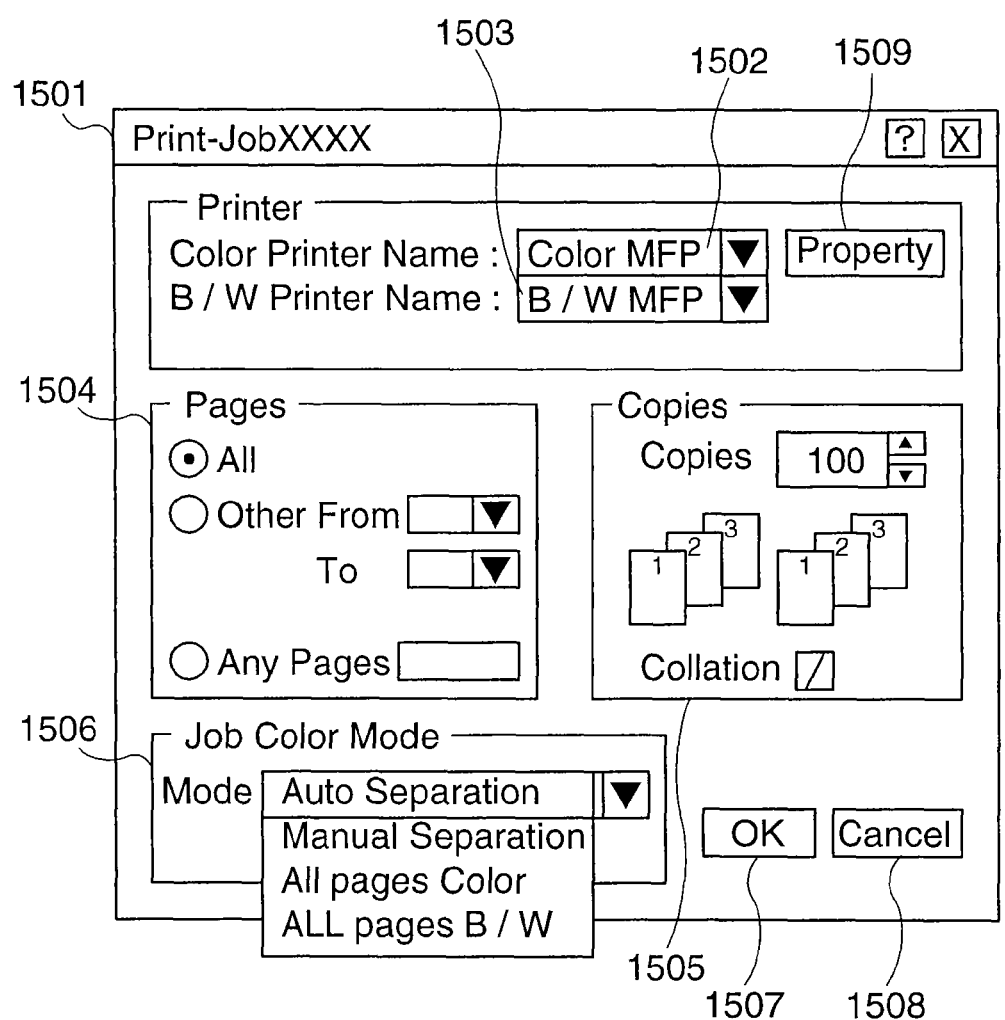
FIG. 14 is a diagram showing another example of the screen according to utility software executed by the server computer 102 or the client computer 103.

In FIG. 14, reference numeral 1501 denotes a driver window that is displayed on a screen of the server computer 102 or the client computer 103, with setting items in this driver being as follows. Reference numeral 1502 denotes a color printer selection column for selecting a color printer (the color MFP 104). Reference numeral 1503 denotes a black-and-white printer selection column for selecting a black-and-white printer (the black-and-white MFP 105). Reference numeral 1504 denotes a page setting column for selecting output pages in the job. Reference numeral 1505 denotes a number-of-copies setting column for setting the number of copies. Reference numeral 1506 denotes a job color mode column for instructing the separation of a color/black-and-white mixed job into printing of color image pages and printing of black-and-white image pages. Reference numeral 1507 denotes an "OK" key for starting printing. Reference numeral 1508 denotes a "Cancel" key for canceling printing. Reference numeral 1509 denotes a property key for performing more detailed settings.

Here, the job color mode column 1506 can be used to select one mode from "Auto Separation", "Manual Separation", "All Pages Color", and "All Pages B/W", and when manual separation is selected, the user selects which of the color MFP 104 and the black-and-white MFP 105 is to output each of the pages. That is, a manual setting is made in advance in a detailed setting window as to whether each page is color or black-and-white.

Figure 15:
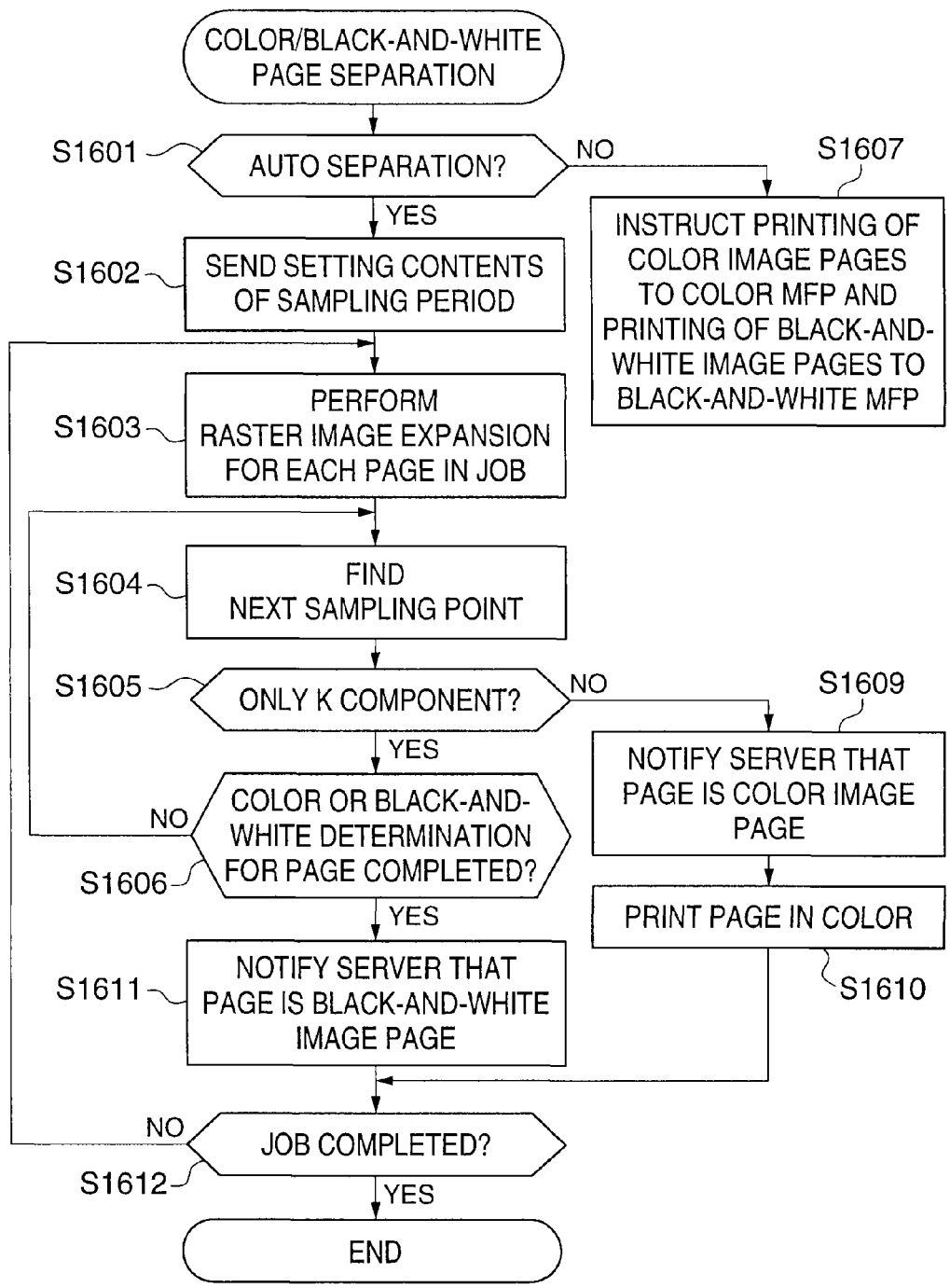
FIG. 15 is a flowchart showing a color/black-and-white image page separation process.

Next, the color/black-and-white image page separation process by auto separation of a job will be described with reference to the flowchart in FIG. 15. In the driver window 1501 in FIG. 14 described above, when the "OK" key 1507 is pressed, the driver running on the client computer 103 sends a print job and information indicating that the job is a job in which color image pages and black-and-white image pages are mixed, via the server computer 102 to the color MFP 104 and the black-and-white MFP 105. In the case of auto separation, it has not been determined at this time point which pages are black-and-white image pages, so that the contents of all the pages in the job are sent to both the color MFP 104 and the black-and-white MFP 105. Here, the order of sending the color image pages and black-and-white image pages may be such that the pages are sent to the color MFP 104 first and then to the black-and-white MFP 105 a certain time period later, or the pages may be sent to the color MFP 104 and the black-and-white MFP 105 simultaneously.

The black-and-white MFP 105 that has received information indicating that color image pages and black-and-white image pages are mixed in the job does not start the printing immediately and instead waits for a notification of the black-and-white image page numbers from the color MFP 104. If auto separation is set for the job, ("YES" in step S1601), the setting contents of a sampling period is sent to the color MFP 104 (step S1602). The setting of the sampling period is performed in advance in the window for detailed settings that is displayed by the "Property" key 1509.

With regard to the sampling period, if sampling is performed at a rate of one point per an area of 100 pixels by 100 lines, the sampling time can be reduced to 1/10,000. In the case of a 400 dpi image, if sampling is performed in units of a lattice with intervals of 0.25 inches (=6.35 mm), depending upon whether the number of the sampled lattice points is less than a predetermined value (e.g. 1,500) or not on a sheet of a letter size (11" by 8.5"), it is possible to determine to a certain extent whether the image is black-and-white or color. Alternatively, for images where the determination is difficult, the sampling period can be set finer, or "Manual Separation" may be set in the job color mode column 1506 so that each page can be manually set as color or as black-and-white in advance in the detail setting window.

Next, the PDL section 205 of the color MFP 104 that has received the job and the setting contents of the sampling period performs successive raster image expansion processing (RIP) for each page in order starting from the last page in the job and stores the images after the RIP in the semiconductor memory 605 for each page and each color component (CMYK) (step S1603). The CPU 603 determines whether the stored images are color or black-and-white. This determination of color or black-and-white is made according to whether there are any components (CMY components) other from black (K) at the sampling points in the semiconductor memory 605 (steps S1604, S1605).

At this time, to increase the processing speed, if one color (CMY) component is found at any of the sampling points in a page ("NO" in step S1605), this means that the page has a color image so that the color/black-and-white determination for the page is stopped as soon as a color component is found and this page is processed as a color image page inside the color MFP 104. Also, in view of the possibility that the present job is reprinted, the server computer 102 is notified via the network 101 of page number information for this page and information indicating that this page is a color image page (step S1609). Next, the page is printed in color by the color MFP 104 (step S1610). Also, the page numbers of the color image pages in the job are stored in a memory of the color MFP 104 for writing into a memory, described later.

When there is not even a single color (CMY) component among the sampling points in the page ("YES" in step S1605, "YES" in step S1606), the page is to be processed a black-and-white image page, and hence the server computer 102 is notified via the network 101 of the page number information for the page and information indicating that the page is a black-and-white image page so that the page can be subjected to black-and-white processing as a black-and-white image page (step S1611). At the same time, the page number information is written into the memory of the color MFP 104 as page information. The server computer 102 may automatically inform the black-and-white MFP 105 of the black-and-white image page number information or may inform the black-and-white MFP 105 of the black-and-white image page number information in response to a request signal from the black-and-white MFP 105.

When the stacker tray 1207, in which sheets that have been recorded in color, has been correctly set in the inserter 108 that is attached to the black-and-white MFP 105, the black-and-white MFP 105 that has received the notification in step S1611 described above starts a mixing operation for the sheets that have been printed by the black-and-white MFP 105 and the sheets that are stacked in the stacker tray 1207. After this, based on the information read from the storage device 1202 provided on the stacker tray 1207, RIP is performed to print only a corresponding black-and-white image page. So long as a job cancel interrupt does not occur during execution of steps S1603 to S1606 and during execution of steps S1609 to S1612, this operation is repeated until the last page, and the job is completed in the color MFP 104.

When auto separation has not been set for the job, that is, when manual separation has been set ("NO" in step S1601), the server computer 102 receives information on whether each individual page is black-and-white or color from the driver, and in accordance with this information instructs the color MFP 104 to print only the color image pages and the black-and-white MFP 105 to print only the black-and-white image pages (step S1607). The color MFP 104 then prints the color image pages and the black-and-white MFP 105 prints the black-and-white image pages in predetermined timing.

In the above described manner, jobs in which color image pages and black-and-white image pages are mixed can be processed by having the color image pages printed by the color MFP 104 and the black-and-white image pages printed by the black-and-white MFP 105.

Although in the above explanation, the RIP is sequentially performed one page at a time in order, the RIP may be performed for an entire job in the large-capacity memory (HDD) 604 and then one or a plurality of pages may be read out onto the semiconductor memory and the determination process then performed. Although in the above explanation, auto separation of a job separates the pages into color image pages and black-and-white image pages, such separation may be performed in units of a predetermined number of copies or may separate the pages into photograph pages and text pages. Although in the above explanation, print information from the driver is sent to the color MFP 104, the determination of color or black-and-white is performed for each page by the color MFP 104, and the output of the color image pages is started first, this is not limitative to the present invention and the determination of color or black-and-white may be performed by the black-and-white MFP 105 and the output of the black-and-white image pages may be performed first.

Next, read and write operations for the storage device 1202 will be described with reference to FIGS. 16 and 17. When the color MFP 104 prints and outputs a color job for color/black-and-white mixing to the stacker tray 1207, as shown in FIG. 17, a CPU 1805 of the color MFP 104 performs a write operation for the storage device 1202 provided on the stacker tray 1207 in the stacker 107. The CPU 1805 of the color MFP 104 performs a write operation into the storage device 1202. Specifically, the CPU 1805 of the color MFP 104 performs a write operation into the storage device 1202 via an interface section 1803 of the color MFP 104 and an interface section 1804 of the stacker tray 1207 for all of the information that is required for a color/black-and-white mixing operation, such as the sheet size, number of pages, number of copies, printer number, job number, page numbers resulting from a color/black-and-white determination, page order information ("S-placing mode" or "F-placing mode", etc.), material, and information on the finishing process. The stacker tray 1207 is also provided with a display section 1210 and a battery 1211.

Figure 16:
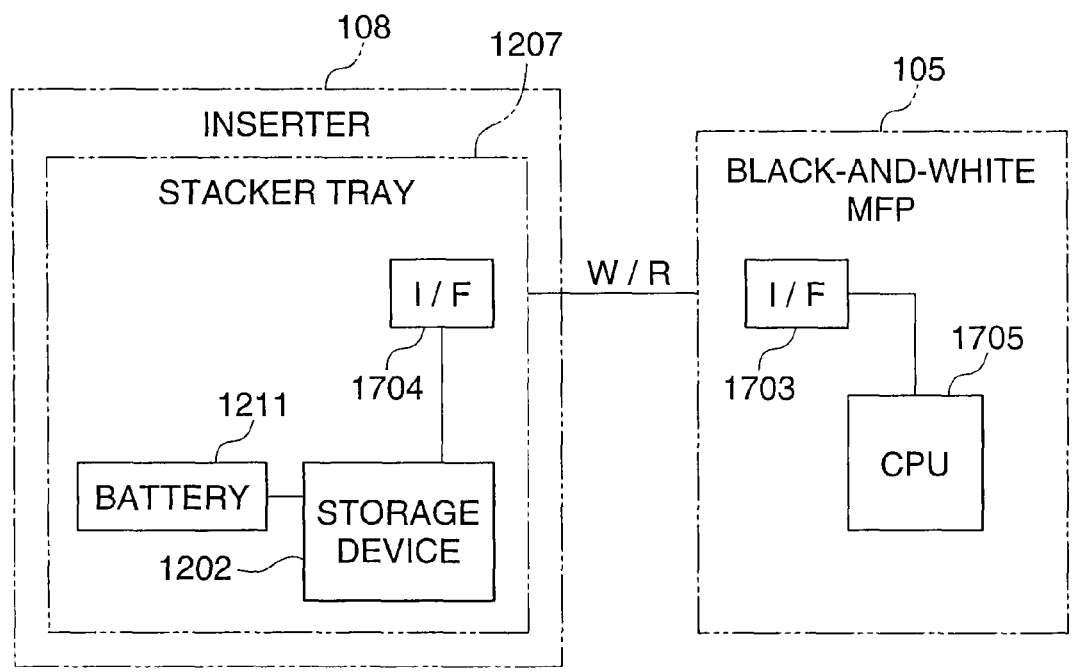
FIG. 16 is a diagram useful in explaining a read operation for a storage device 1202 of an inserter 108 of the black-and-white MFP 105 shown in FIG. 1.
Figure 17:
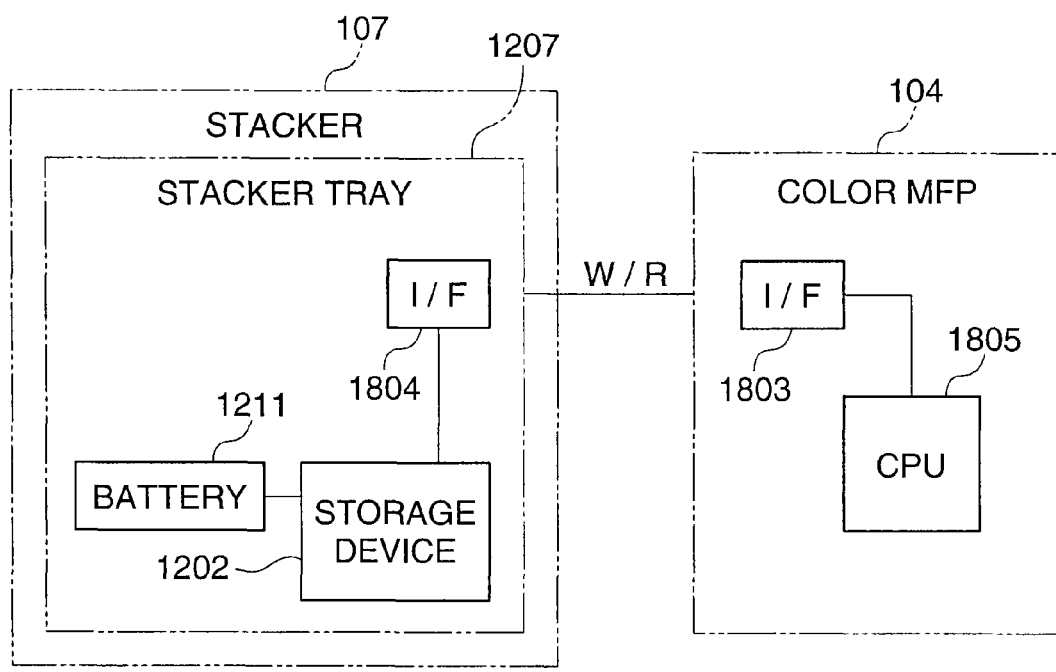
FIG. 17 is a diagram useful in explaining a write operation for the storage device 1202 of a stacker 107 of the color MFP 104 shown in FIG. 1.

As shown in FIG. 16, when a CPU 1705 of the black-and-white MFP 105 subsequently detects the attachment of the stacker tray 1207 to the inserter 108 of the black-and-white MFP 105 via a stacker tray presence sensor, not shown, a read operation for information in the storage device 1202 is performed via an interface section 1703 of the color MFP 104 and an interface section 1704 of the stacker tray 1207. Then, based on this read information, the black-and-white MFP 105 and the inserter 108 are controlled to start the color/black-and-white mixing operation.

The interface section of each of the color MFP 104, the black-and-white MFP 105, and the stacker tray 1207 may be controlled in parallel via a bus having a bus width of multiple bits, and by providing a serial control section in each interface section, the control may be performed by serial communication, such as infra red communication. Further, when the black-and-white MFP 105 prints and outputs sheets to the stacker tray 1207, the CPU 1705 of the black-and-white MFP 105 performs a write operation for the same kinds of information as above into the storage device 1202 of the stacker tray 1207. A similar read operation to that described above may be performed in the color MFP 104.

The storage device 1202 can also have a map of data for a plurality of jobs, so that mixing operations for a plurality of jobs can be handled by a single stacker tray. Further, the information written in the storage device 1202 is protected from data loss by using a nonvolatile memory such as EEPROM as the storage medium or alternatively, in the case where a SRAM is used as the storage medium, by controlling the supply of power by the battery 1211 the information written in the storage device 1202 is protected from data loss even when the stacker tray 1207 is detached from the stacker 107 or the inserter 108 so that power is not supplied from the color MFP 104 or the black-and-white MFP 105.

Figure 19:
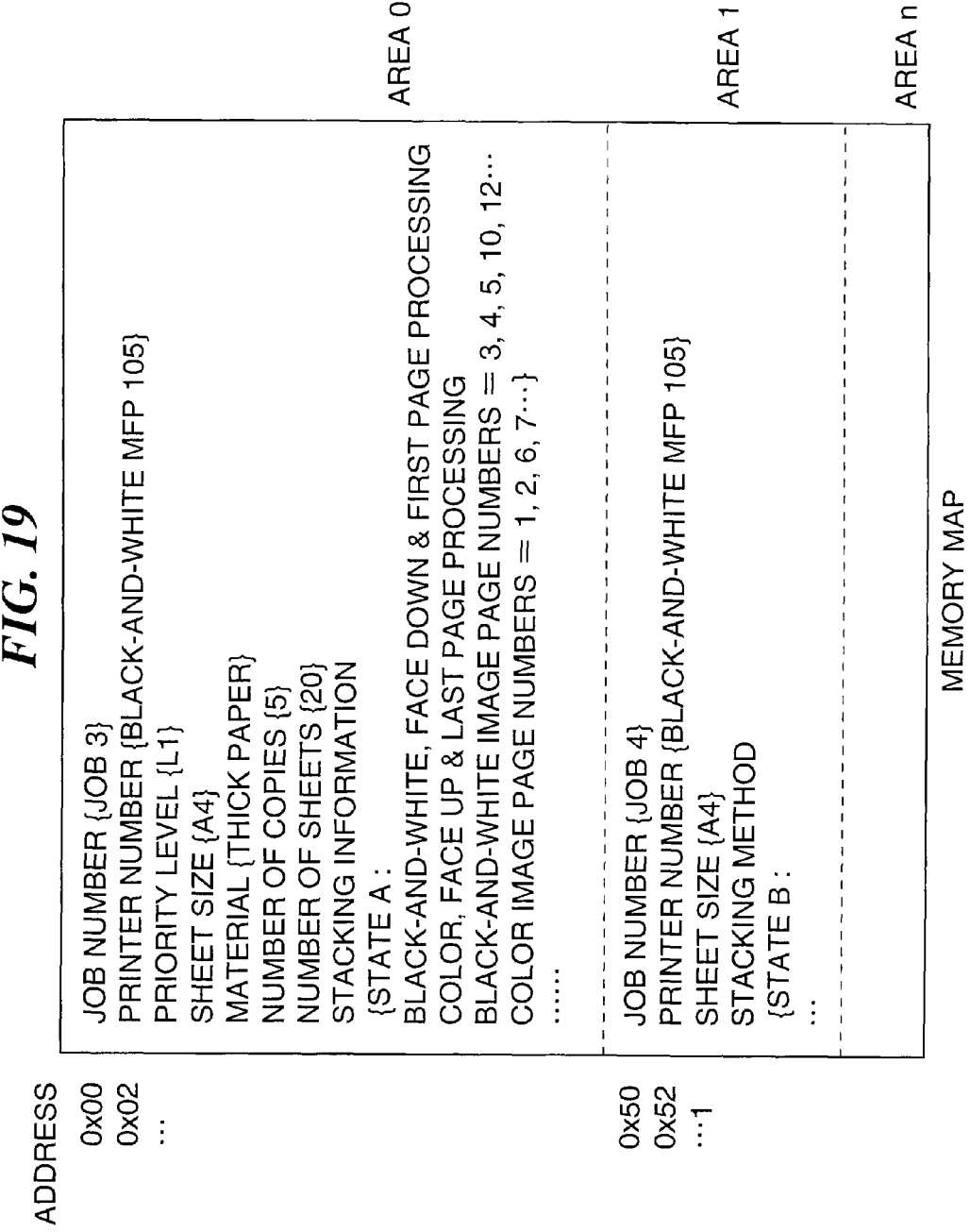
FIG. 19 shows a memory map of the storage device 1202.

Next, the construction of the memory map of the storage device 1202 will be described with reference to FIG. 19. In the memory map shown in FIG. 19, job numbers, printer numbers, etc. are assigned to addresses as illustrated. When a plurality of jobs are written, they are assigned to areas 0 to "n". Using the illustrated map as an example, there are a plurality of jobs that have been stacked in the stacker tray 1207 and the number of a job that is to be processed first is a job number "JOB3". The inserter 108 in which the stacker tray 1207 is to be set is connected to the black-and-white MFP 105, a determination is made as to whether the combination of the printer number of this black-and-white MFP 105 and the above-mentioned job number is a desired combination, and only when it is the desired combination, and hence the job corresponding to the job number should be printed, a mixing operation is performed. When the above combination is not the desired combination, the client computer 103 is notified by the server computer 102 of information indicating this situation, or notification is performed via the display section or the like of the black-and-white MFP 105. When the printer number is not specified, this shows that any black-and-white MFP to which the inserter 108 has been attached can be used.

The illustrated map shows that the priority level of the job related to the sheets stacked in the stacker tray 1207 is "L1". Further, the map shows that the sheet size is "A4" and the material of the stacked sheets is "thick paper", so that processing unique to thick paper should be performed, such as control that variably controls the sheet feeding speed. Stacking information shows "state A" meaning that the stacking state inside the stacker tray 1207 is that a job bundle has been outputted by a black-and-white MFP face down from the first page onwards (the sheets have been outputted with the image formation surface facing downwards) and that face up output (output in a state where the image formation surface faces upwards) is required by a color MFP, so that print control is performed in accordance with this state "A". Also, the page numbers that need to be printed in black and white are indicated as "3.4.5.10.12 . . . ", so that a print operation is performed for these pages only.

Next, an outline of the mixing of a job will be described with reference to FIG. 1. When a sheet bundle has been printed by the color MFP 104 and discharged to the stacker 107, the user sets the entire stacker tray 1207 with the stacked sheet bundle in the inserter 108 that is connected to the black-and-white MFP 105. When the black-and-white MFP 105 detects that the stacker tray 1207 has been set, it reads out the storage information of the storage device 1202 inside the stacker tray 1207 and determines from information such as the job number, etc. in the read information, whether the job is to be mixed, and when it is determined that the job is to be mixed, the controller of the black-and-white MFP 105 activates the server computer 102 or the client computer 103 to receive the job information from the server computer 102.

The black-and-white MFP 105 mixes the color output sheets into the black-and-white output sheets in accordance with the job information and identifies in what page position the color output sheets and black-and-white output sheets should be disposed and what kind of finishing process should be performed. Alternatively, without activating the server computer 102 or the client computer 103, mixing may be performed in accordance with print information that has been downloaded in advance into the main body of the black-and-white MFP 105. By recognizing the material (type of sheets) of the color output sheets to be mixed, control may be performed so as to vary sheet feeding speed and/or conveying speed.

In the case where, due to a cause called jamming or "multiple feeding" in the color MFP 104, improper sheets are stored in the stacker tray 1207, such sheets may be forcibly discharged into an escape tray (the tray 1210 in FIG. 12) by reading information on a job number for which it is determined that mixing should not be performed and sheet numbers that cannot be used from the storage device 1202 of the stacker tray 1207. It is also effective to inform the user of such information using a communication means such as a display section.

Next, a description will be given of how the output method for black-and-white output sheets of the black-and-white MFP 105 is controlled according to the stacking method for the color output sheets that are stored in the stacker tray 1207, with reference to FIG. 20. When the sheets outputted from the color MFP 104 have been outputted face up and processed starting with the last page, the output bundle that is stacked inside the stacker tray 1207 is disposed as shown by "A-1" in FIG. 20. In this case, after the color/black-and-white mixing, the face down output of sheets as shown by "A-2" in FIG. 20 is required, so that processing for face down output starting with the first page is selected for the output from the black-and-white MFP 105.

Figure 20:
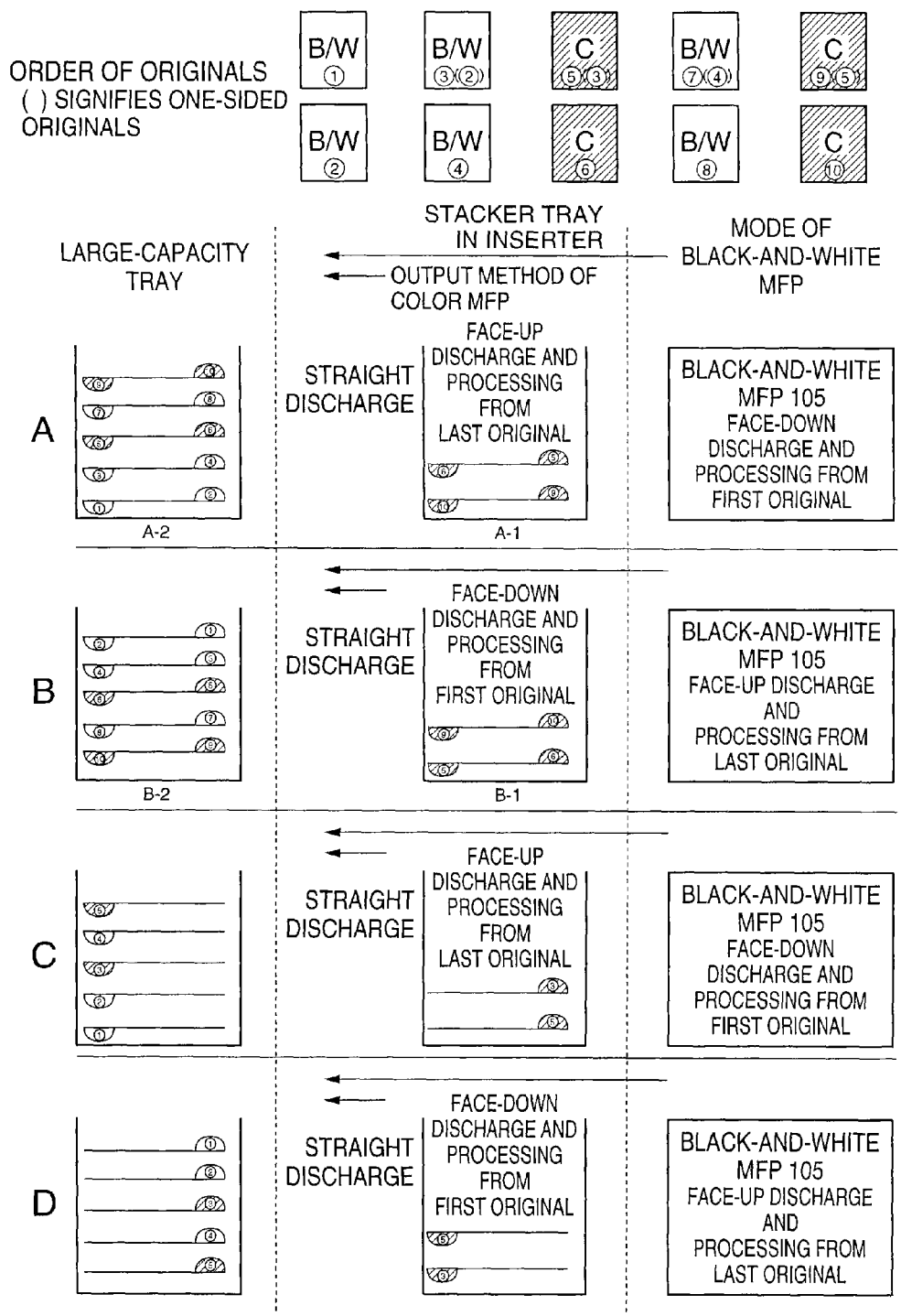
FIG. 20 is a diagram showing how an output method of outputting black-and-white output images from the black-and-white MFP 105 is controlled according to a stacking method of stacking color output sheets stored in an stacker tray 1207.

In the same way, when the output from the color MFP 104 has been face down output and processed starting from the first page, the output bundle stacked in the stacker tray 1207 is disposed as shown by "B-1" in FIG. 20. In this case, after the color/black-and-white mixing, a face up output of sheets as shown by "B-2" in FIG. 20 is required, so that processing for face up output starting with the last page is selected for the output from the black-and-white MFP 105.

Therefore, it is necessary to control the image formation processing of the black-and-white MFP 105 in accordance with the stacking method of the color output sheets of the color MFP 104, and information related to such control is stored in the storage device 1202 of the stacker tray 1207. The color MFP 104 performs the color/black-and-white mixing operation based on this information.

Figure 21:
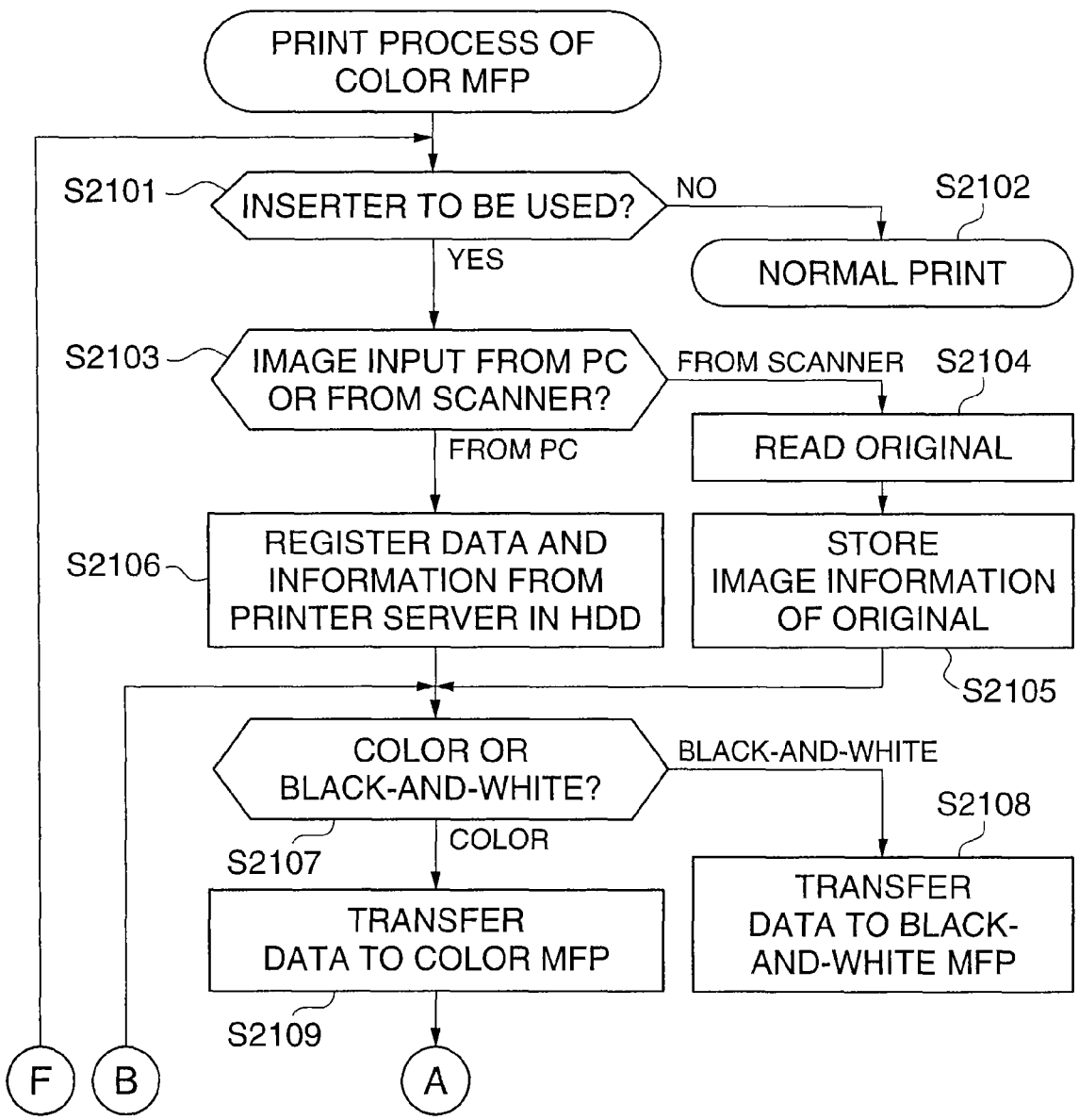
FIG. 21 is a flowchart showing a print process carried out by the color MFP 104.
Figure 22:
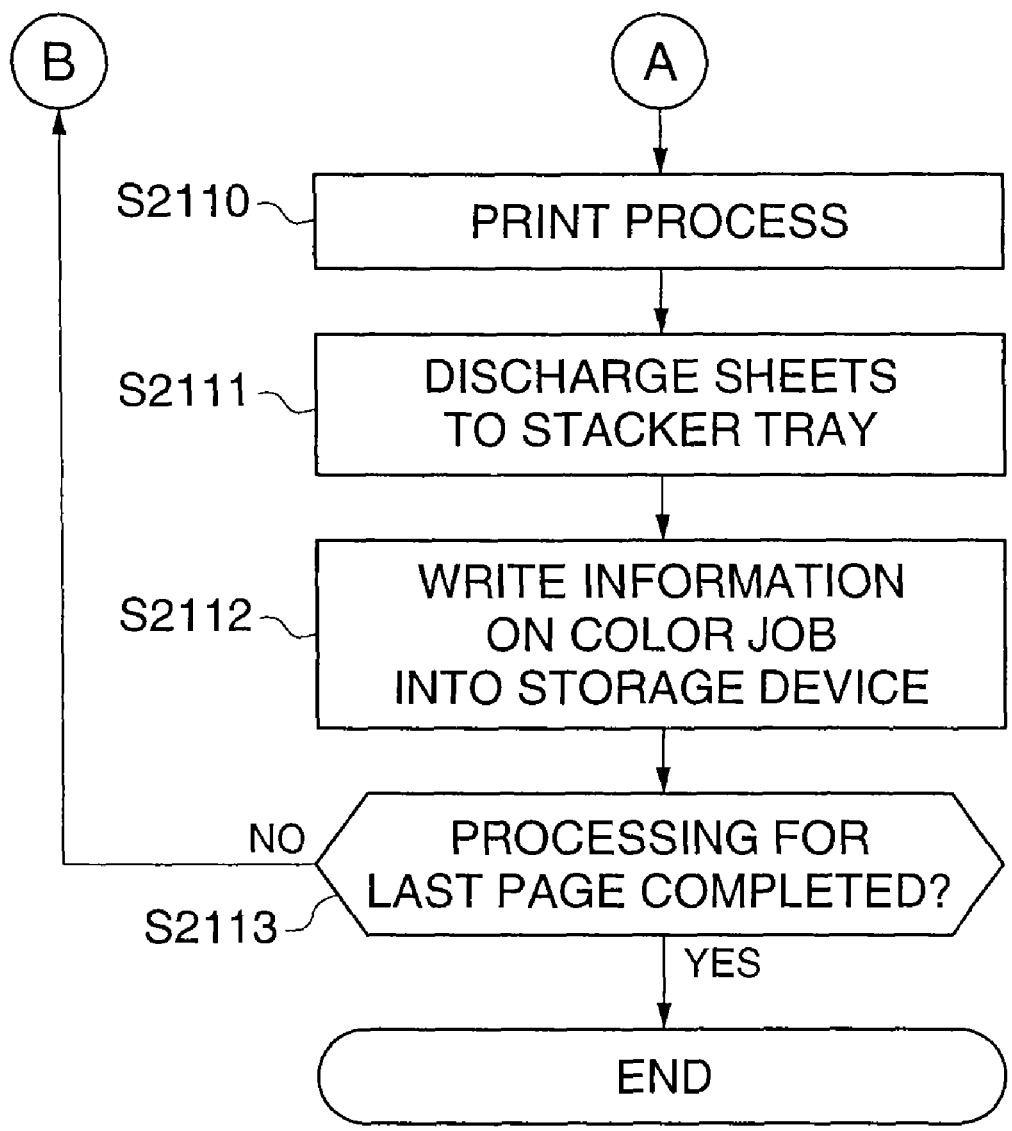
FIG. 22 is a flowchart showing a continued part of the print process of FIG. 21.

Next, the print process of the color MFP 104 will be described with reference to flowcharts in FIGS. 21 and 22. The print process of FIGS. 21 and 22 is executed by the CPU 1805 inside the color MFP 104 according to a program stored on a storage medium that is connected to the CPU 1805.

In this case, it is assumed that the inserter 108 is attached to the color MFP 104. By setting a job in a setting screen of a PC (the server computer 102) or on the operating part of the color MFP 104, the CPU 1805 of the color MFP 104 determines whether to use the inserter 108 to mix color sheets and black-and-white sheets (step S2101). When the CPU 1805 of the color MFP 104 determines not to use the inserter 108, processing is performed in accordance with the control described above as normal printing (step S2102). When the CPU 1805 of the color MFP 104 determines to use the inserter 108, it is determined whether the image data input method is a method that inputs image data by reading an original using the scanner section 201 or a method that inputs electronic file data from a PC (the server computer 102) (step S2103).

When the CPU 1805 of the color MFP 104 determines that the image data input method is the method that inputs image data by reading an original using the scanner section 201, it causes the scanner section 201 to read an original that has been placed on the platen and is pressed by a pressing plate or an original that has been fed by an automatic original feeding apparatus (step S2104), converts the resulting data into digital image information, and stores in an image storage device, such as a hard disk drive, inside the color MFP 104 (step S2105). When the CPU 1805 of the color MFP 104 determines that the image data input method is the method that inputs electronic file data from the PC (the server computer 102), downloads image information and various kinds of setting information into the color MFP 104 from the server computer 102 and registers the image information and various kinds of setting information (setting information of a job, etc.) as they are in an image storage device such as a hard disk drive (step S2106).

Then, the CPU 1805 of the color MFP 104 determines whether the image of a page to be formed that has been stored in the image storage device inside the color MFP 104 is a color image or a black-and-white image (step S2107). When the CPU 1805 of the color MFP 104 determines that the page is a black-and-white image page ("black-and-white" in step S2107), it writes order information (page information) etc. thereof onto the memory map in the storage device 1202 of the stacker tray 1207. The CPU 1805 of the color MFP 104 transfers black-and-white data out of the data stored in the image storage device inside the color MFP 104 either to an image storage device of the server computer 102 or via the server computer 102 to an image storage device of the black-and-white MFP 105 (step S2108). Since it is sufficient to send data showing which pages out of the job data are black-and-white image data as the transferred data, the image data itself does not need to be sent.

When the CPU 1805 of the color MFP 104 determines that the page is a color image page ("color" in step S2107), it transfers the color data to the image storage device in the color MFP 104 (step S2109). Then, the CPU 1805 of the color MFP 104 selects whether processing is to be performed from the first page or from the last page according to a stacking method that has been set or a stacking method that is automatically determined, and thereafter causes the printer section 208 to perform a print process (step S2110). Color output sheets are then stacked into the stacker tray 1207 inside the inserter 108 (step S2111). At this time, the CPU 1805 of the color MFP 104 writes information for mixing the color sheets, such as the information shown in the memory map of FIG. 19 described above, into the storage device 1202 inside the stacker tray 1207 (step S2112). Then, if the processing for the last page has not been completed ("NO" in step S2113), the process returns to step S2107 to continue the process, while if the processing for the last page has been completed ("YES" in step S2113), the present process is terminated.

Although information is written into the storage device 1202 of the stacker tray 1207 once for each sheet in the present embodiment, this is not limitative to the present invention and the write timing may be anytime, such as before execution of a job, once for each job, once for each page, or after execution of each job.

Figure 23:
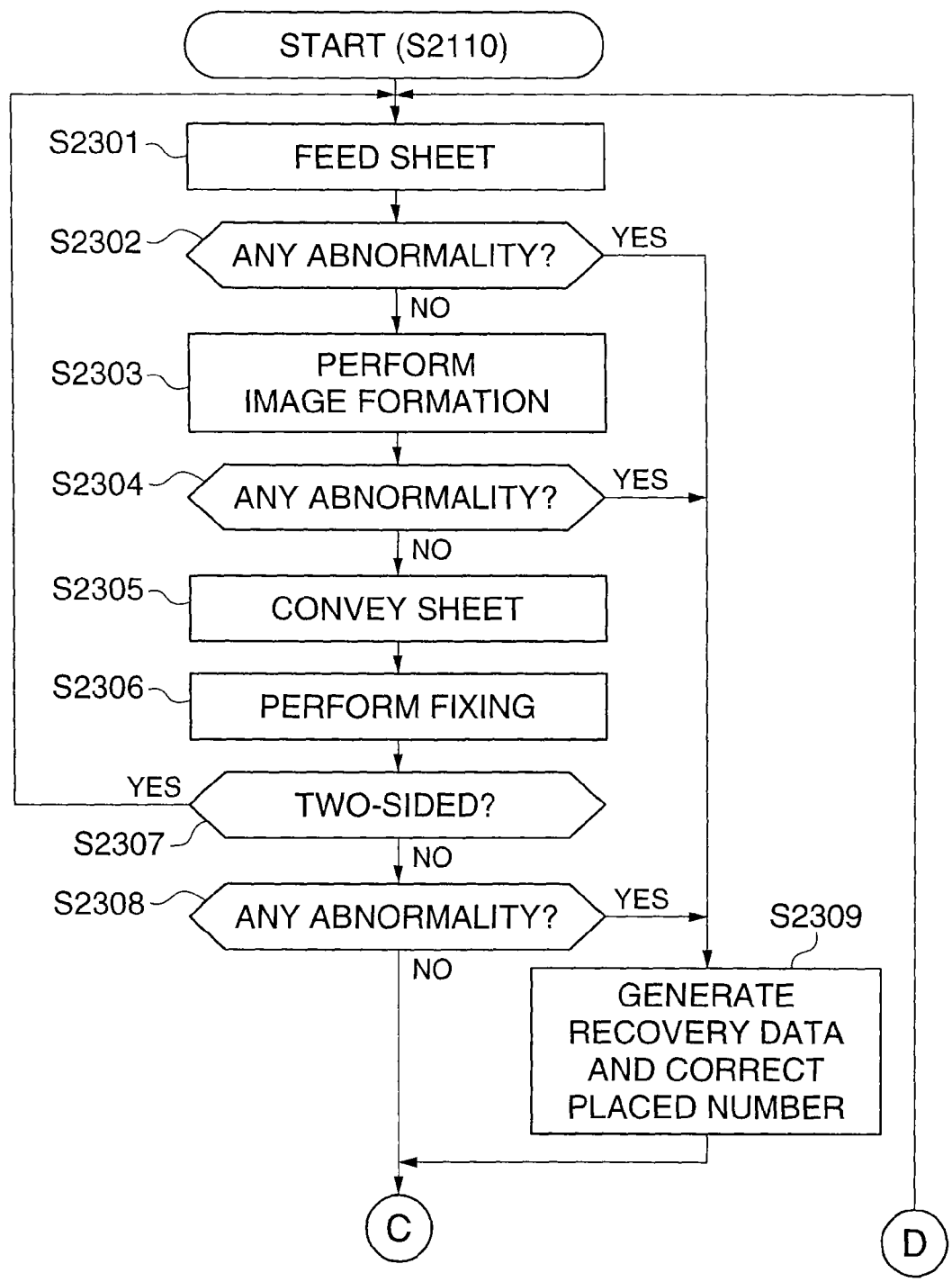
FIG. 23 is a flowchart showing the details of steps S2110 to S2113 in FIG. 22.
Figure 24:
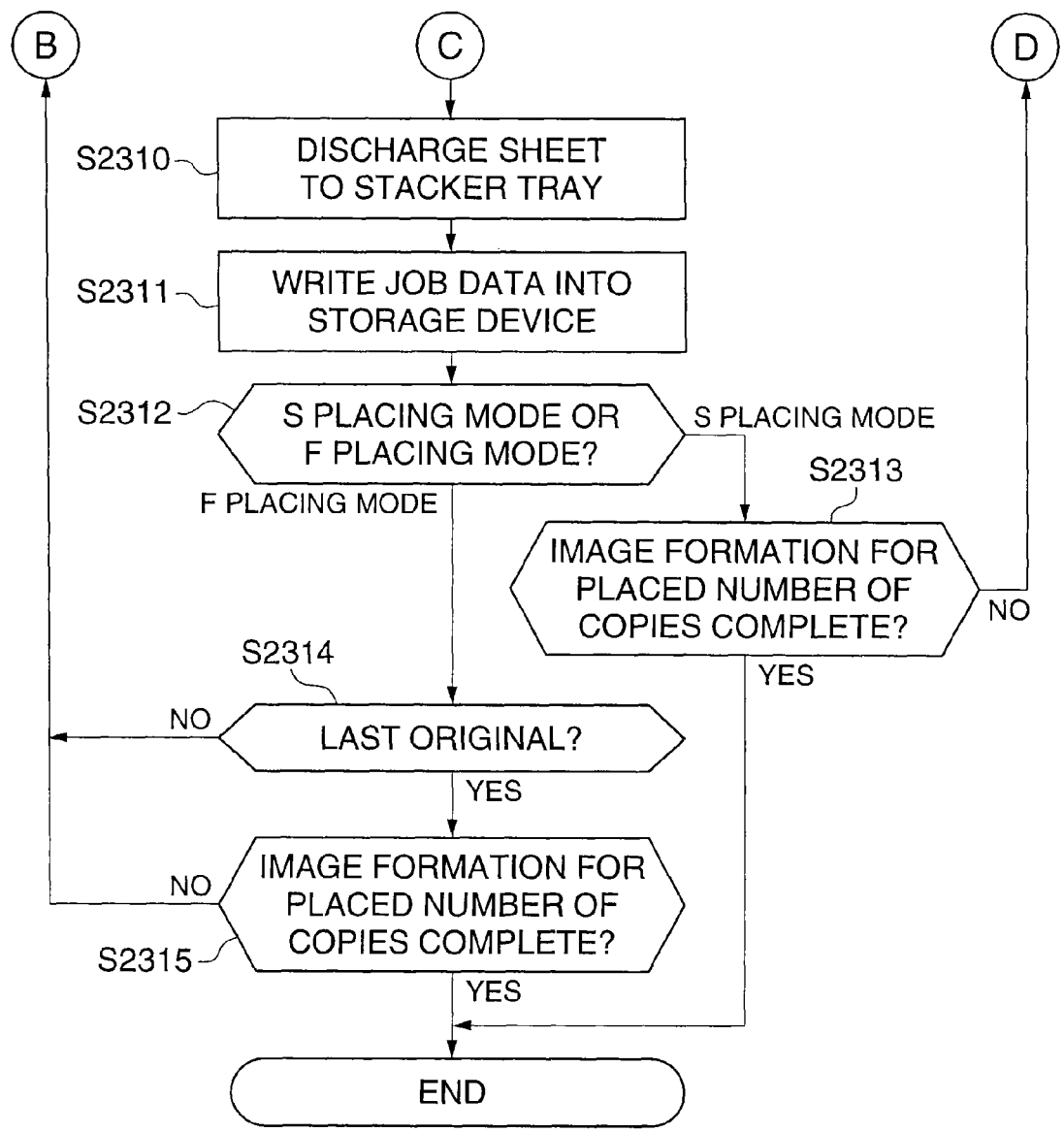
FIG. 24 is also a flowchart showing the details of steps S2110 to S2113 in FIG. 22.

Next, steps S2110 to S2113 will be described in detail with reference to flowcharts in FIGS. 23 and 24. A sheet is fed by a conveying mechanism from one of the sheet cassette 934, the sheet cassette 935, the manual feeding tray 936, and a two-sided stacker tray 970 that are disposed on the printer section 208 (step S2301) and the CPU 1805 of the color MFP 104 detects whether there is any abnormality, not shown, in the sheet (step S2302). Such abnormality can include "multiple feeding" that a plurality of sheets are conveyed overlapping one another, "skewing" that the conveying posture of the sheet is not correct, and "resist misalignment" that a fed sheet is displaced when the sheet is conveyed by the resist roller 937 from a sheet cassette or the manual feeding tray. When the CPU 1805 of the color MFP 104 determines that there is an abnormality in the sheet, the process proceeds to step S2309 while when the CPU 1805 determines that there is no abnormality, it causes the printer section 208 to perform image formation (step S2303).

Then, the CPU 1805 of the color MFP 104 detects, using a sensor, not shown, whether there is any abnormality in the sheet on which image formation has been performed (step S2304). When the CPU 1805 determines that there is an abnormality in the sheet, the process proceeds to step S2309, while when the CPU 1805 determines that there is no abnormality in the sheet on which image formation has been performed, control is performed to convey the sheet to the fixer 940 (step S2305) and the fixing of the formed image on the sheet is performed by the fixer 940 (step S2306). Next, the CPU 1805 of the color MFP 104 determines whether the present job is a two-sided image formation job for performing image formation on both sides of the sheets (step S2307), and when it is determined that the job is a two-sided image formation job, the sheet is conveyed as it is to the two-sided stacker tray 970, while when it is determined that the job is not a two-sided image formation job, the reproduction characteristics for color and density in the image are confirmed by a line sensor or the like, not shown, to detect whether there is any abnormality in them (step S2308).

When the CPU 1805 of the color MFP 104 determines that there is an abnormality in the sheet, the process proceeds to step S2309 as is the case with steps S2302 and S2304 described above, while when the CPU 1805 determines that there is no abnormality, the sheet is discharged to the stacker tray 1207 (step S2310). Then, after data relating to the present job has been written into the storage device 1202 of the stacker tray 1207 (step S2311), the CPU 1805 of the color MFP 104 determines whether the stacking method for sheets related to the present job is "S-placing mode" (a method in which sheets for the same pages are stacked in groups of the set number of copies) or "F-placing mode" (a method in which sheets for a plurality of pages (three pages) are successively stacked) (step S2312). When the stacking method is determined to be "S-placing mode", the process proceeds to step S2313, while when the stacking method is determined to be "F-placing mode", the process proceeds to step S2314.

When the stacking method is determined to be "S-placing mode", the CPU 1805 of the color MFP 104 determines whether image formation on the sheets for the set number of copies has been completed (step S2313). When it is determined that the image formation has been completed, the present process is terminated, while when it is determined that the image formation has not been completed, the process returns to step S2031 described above for image formation of sheets of the set number of copies. When the stacking method is determined to be "F-placing mode", the CPU 1805 of the color MFP 104 determines whether the present original being copied is the last original (step S2314). When it is determined that the original is not the last original, the process returns to step S2107 in FIG. 21 described above, while when it is determined that the original is the last original, the CPU 1805 of the color MFP 104 determines whether image formation has been completed for a number of sheets equal to the set number of copies (step S2315). When it is determined that the image formation has been completed for this number of sheets, the present process is terminated, while when it is determined that the image formation has not been completed, the process returns to step S2107 in FIG. 21 described above.

On the other hand, when an abnormality in the sheet is detected by a sensor, not shown, in any of steps S2302, S2304, and S2308 above, the CPU 1805 of the color MFP 104 generates recovery data (which includes information for identifying the abnormal sheet, information for specifying the sheet set including the abnormal sheet, and information for distinguishing the abnormal sheet and the normal sheets) for recovering the sheet for which the abnormality was detected and performs a correction to the placed number of sheets (step S2309). That is, the CPU 1805 of the color MFP 104 executes a calculation of the data that needs to be recovered due to the sheet abnormality being detected.

In "S-placing mode", the recovery is performed by adding one to the number of placed sheets so as to again output only the abnormal sheet, and information indicating what numbered sheet in what numbered job is an abnormal sheet is stored in the storage device 1202 of the stacker tray 1207. In "F-placing mode", in a plurality of jobs, the presence of even a single abnormal sheet in one job is enough to upset the order, so that data for recovering so as to perform image formation on sheets for one job is generated and information indicating from what numbered sheet to what numbered sheet in what numbered job include an abnormal sheet, is stored in the appropriate region of the storage device 1202 related to the same job that has already been discharged to the stacker tray 1207.

Specifically, the storage device stores information indicating not only the order in which normal sheets are stacked among the sheets stored in the stacker tray 1207 but also the order in which abnormal sheets are stacked between the normal sheets, so that when sheets in the stacker tray 1207 are inserted into another image forming apparatus, it is possible to easily distinguish between the abnormal sheets and the normal sheets during processing.

Further, a different recovery method is used depending on the placing method ("S-placing mode" or "F-placing mode") that was used for the sheets on which images have been formed and which have been stacked in the stacker tray 1207.

Figure 25:
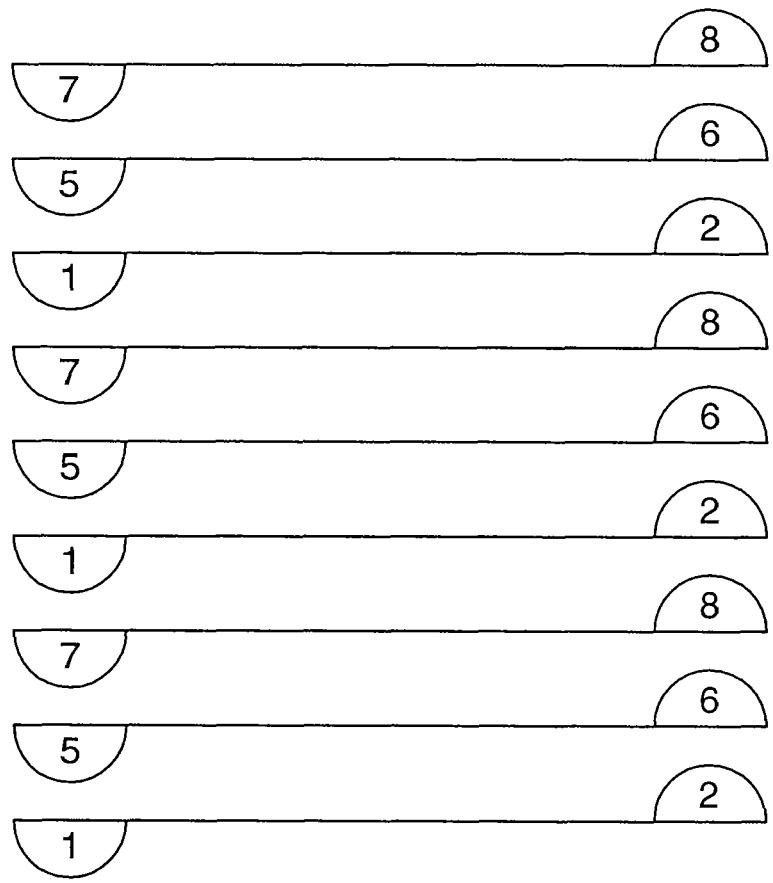
FIG. 25 is a diagram showing a normal sheet discharge state in the stacker tray 1207 shown in FIG. 17 when a "F-placing mode" is set.

Next, for reference, examples of various cases where sheets on which color images have been formed by the color MFP 104 have been discharged to the stacker tray 1207 will be described with reference to FIGS. 25 to 29. FIG. 25 shows an example of sheet discharge when "F-placing mode" is set for the stacker tray 1207. When all the sheets are normal, the sheets are discharged into the stacker tray 1207 as shown in the figure. The numerals in FIG. 25 indicate page numbers (1, 2, 5, 6, 7, and 8) of the color output sheets on which images have been formed on both sides. Page numbers 3 and 4, not shown, correspond to a black-and-white output sheet and for which image formation is performed by the color MFP 104, as described later.

Figure 26:
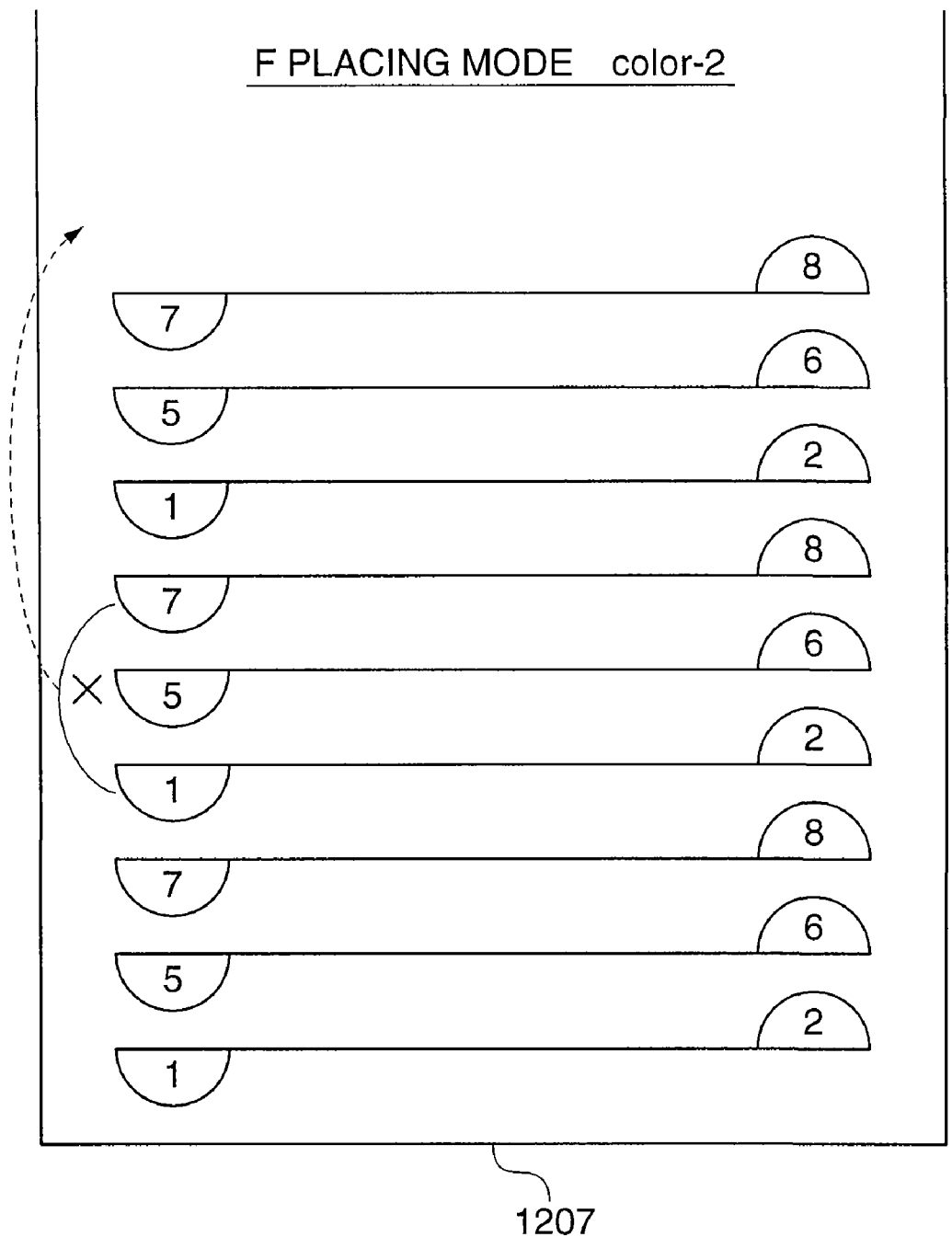
FIG. 26 is a diagram showing a sheet discharge state in the stacker tray 1207 when the "F-placing mode" is set and it is determined that a second sheet in a second job is an abnormal sheet.
Figure 27:
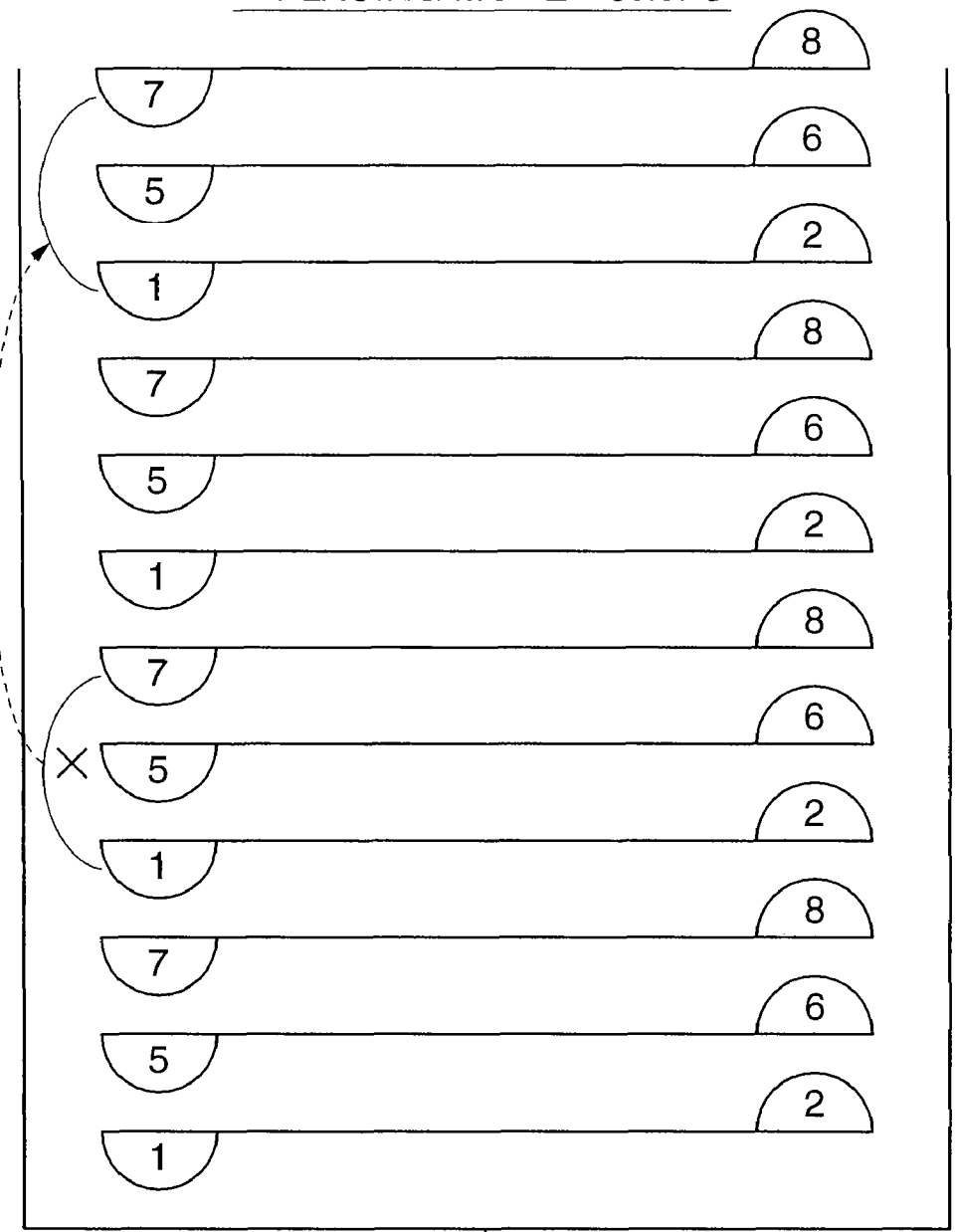
FIG. 27 is a diagram showing a sheet discharge state when one job in FIG. 26 that includes an abnormal sheet has been recovered.

FIG. 26 shows a sheet discharge state in the case where "F-placing mode" is set and the second sheet (pages 5 and 6) of the second job is determined to be an abnormal sheet (such sheet is marked with a cross in FIG. 26). The broken line in FIG. 26 shows that a recovery (stacking) is planned for the job (sheet set) that includes the abnormal sheet mentioned above, as will be described with reference to FIG. 27. FIG. 27 shows a sheet discharge state in the case where the job (sheet set) that includes the abnormal sheet in FIG. 26 has been recovered. A sheet set that corresponds to the sheet set of the page numbers 1, 2, 5, 6, 7, and 8 marked with the cross in FIG. 27 is stacked as shown by the broken line in FIG. 27.

Figure 28:
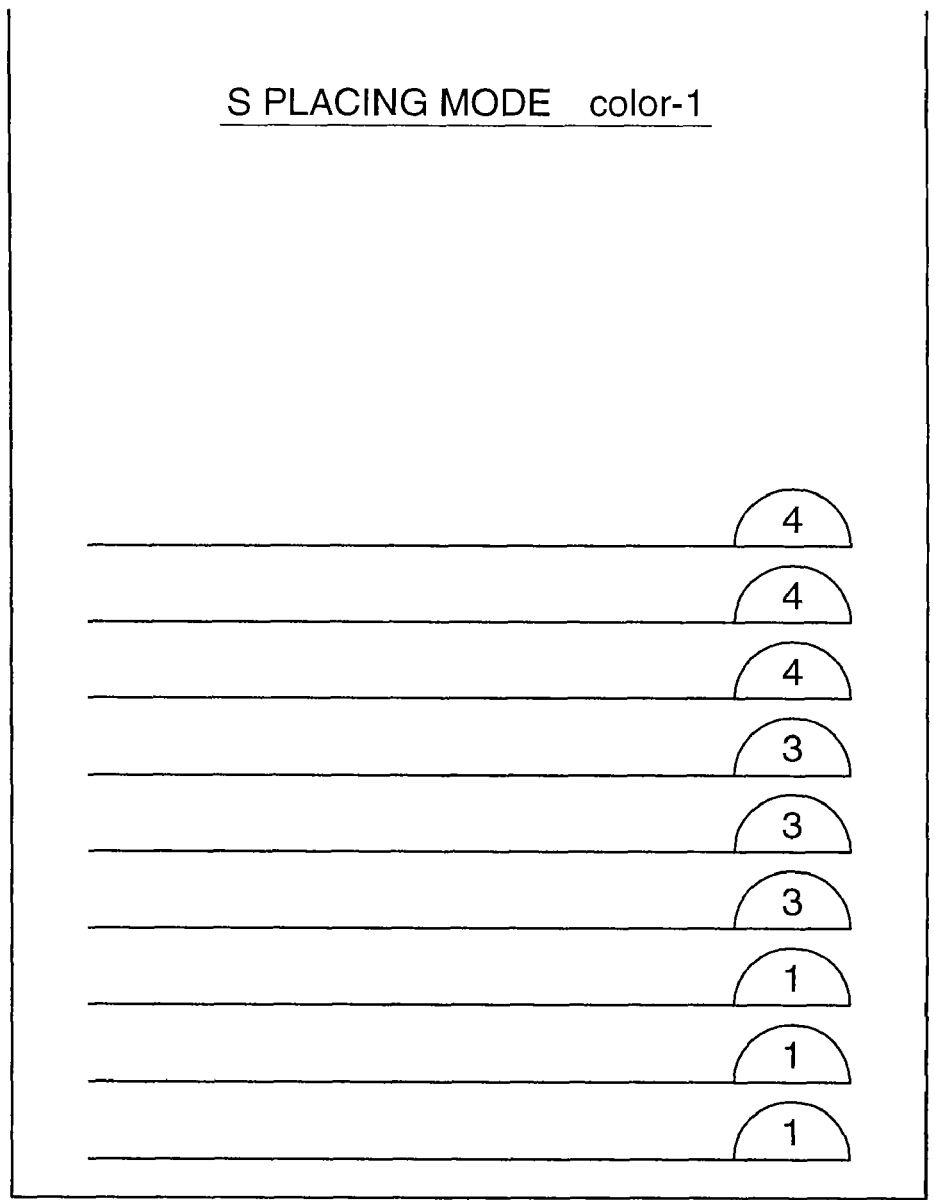
FIG. 28 is a diagram showing a normal sheet discharge state in the stacker tray 1207 when an "S-placing mode" is set.
Figure 29:
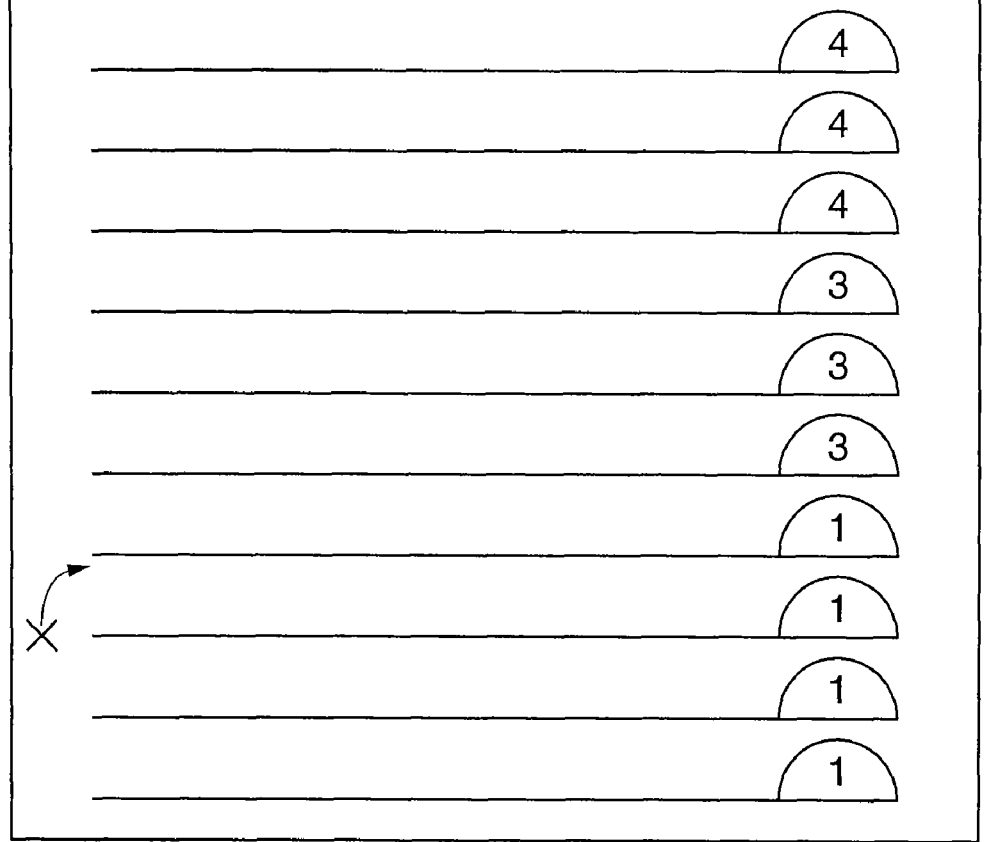
FIG. 29 is a diagram showing a sheet discharge state in the stacker tray 1207 when the "S-placing mode" is set and it is determined that a third sheet in a first job is an abnormal sheet and a recovery sheet has been added to the end of the first job.

In the same way, FIG. 28 shows a normal sheet discharge state when "S-placing mode" is set, with color output sheets with the same page numbers being stacked in groups of three copies (1, 1, 1, 3, 3, 3, 4, 4, 4). FIG. 29 shows a case where the third sheet (marked with a cross in FIG. 29) of the first job has been determined to be an abnormal sheet, and a recovery sheet (the sheet directly above the sheet marked with the cross in FIG. 29) has been added at the end of the first job.

Figure 30:
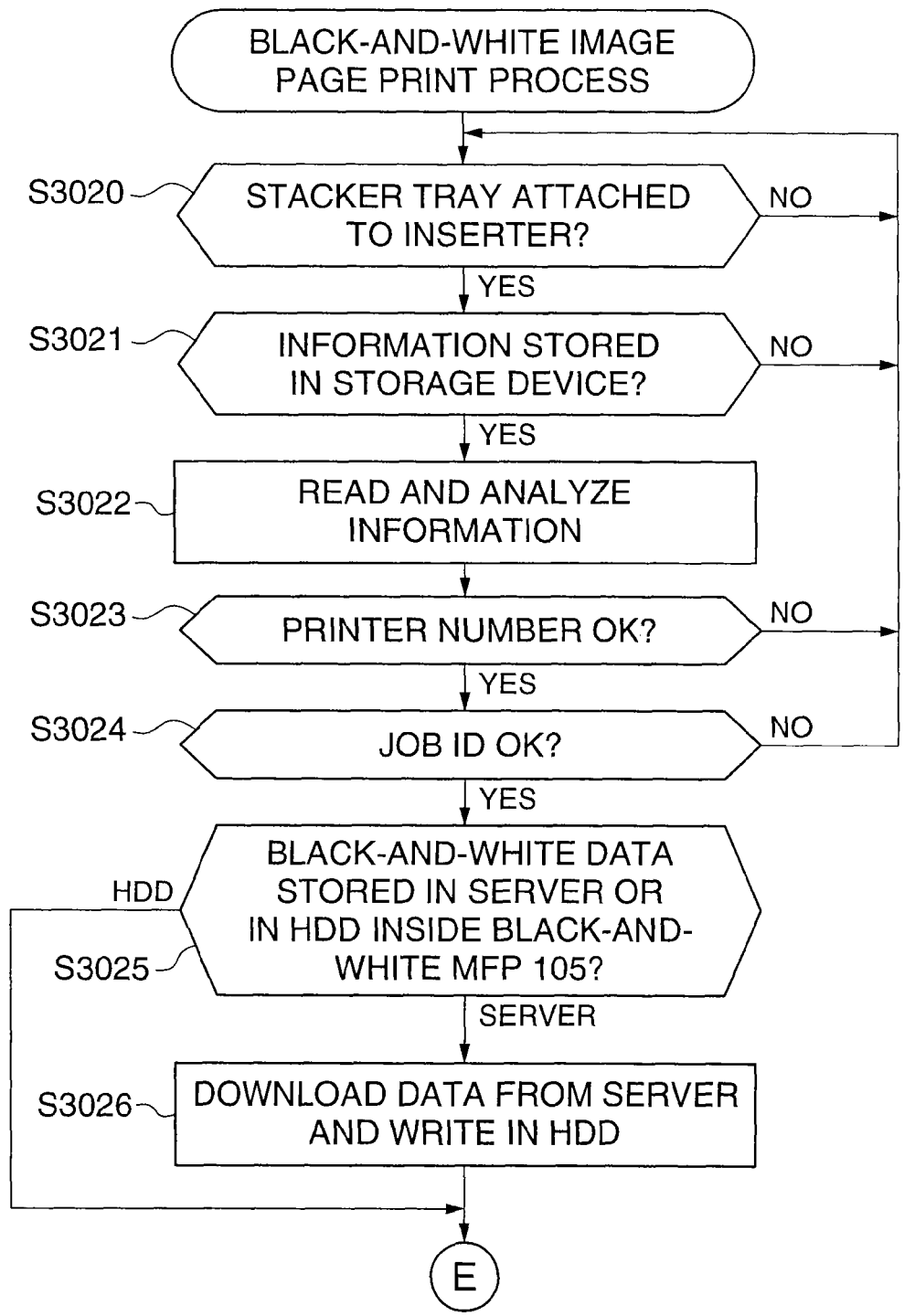
FIG. 30 is a flowchart showing a black-and-white image page print process carried out by the black-and-white MFP 105.
Figure 31:
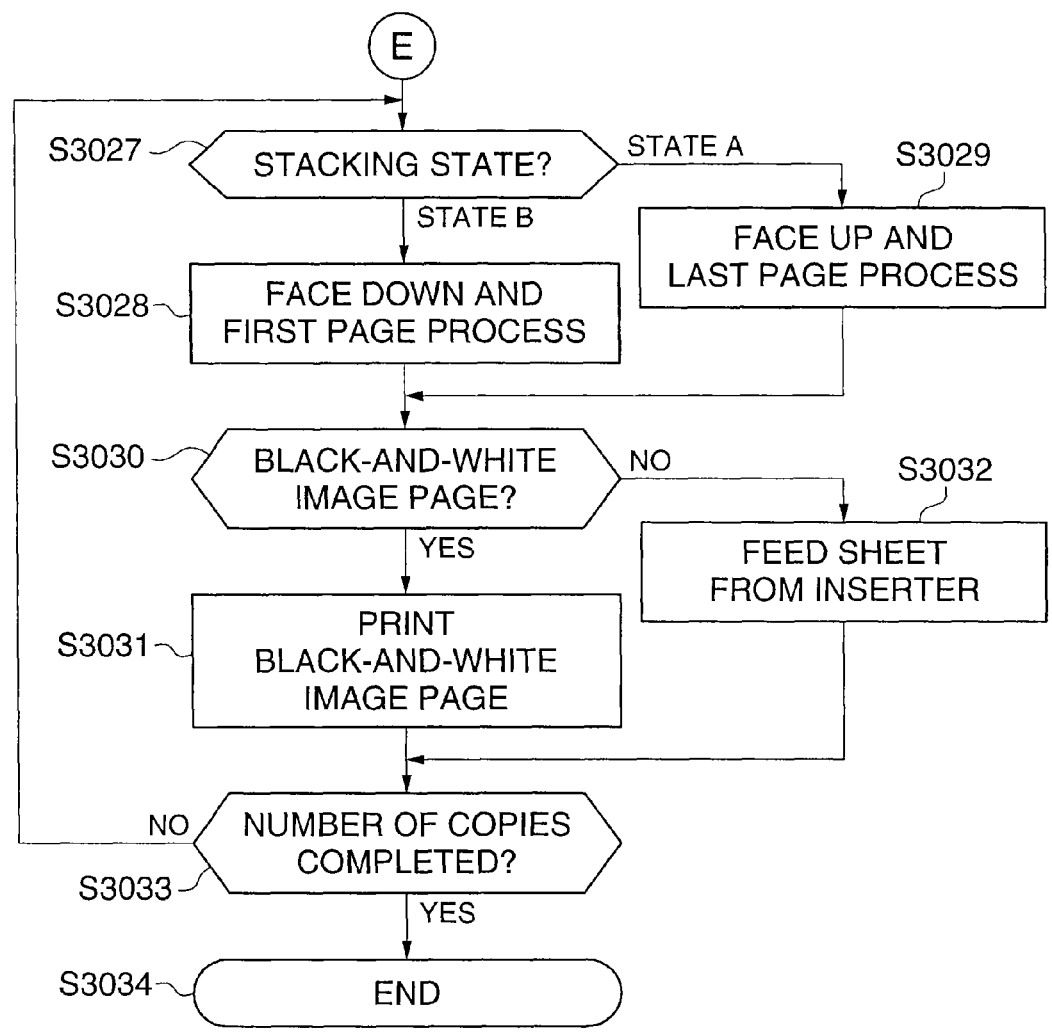
FIG. 31 is a flowchart showing a continued part of the black-and-white image page print process of FIG. 1.

Next, the black-and-white image page print process of the black-and-white MFP 105 will be described with reference to flowcharts in FIGS. 30 and 31. This print process is executed by the CPU 1705 inside the black-and-white MFP 105 according to a program stored in a storage medium that is connected to the CPU 1705.

Upon detecting, via the stacker tray presence detecting sensor 1201 (see FIG. 12), that the stacker tray 1207 has been attached to the inserter 108 that is attached to the black-and-white MFP 105 ("YES" in step S3020), the CPU 1705 of the black-and-white MFP 105 determines whether information for color/black-and-white mixing is stored in the storage device 1202 inside the stacker tray 1207 (step S3021). When it is determined that information for color/black-and-white mixing is stored, the CPU 1705 of the black-and-white MFP 105 reads and analyzes the information in the storage device 1202 (step S3022). Here, the CPU 1705 of the black-and-white MFP 105 performs the analysis based on the internal information in a memory map in the storage device 1202, such as that shown in FIG. 19 described above, and starts a print operation by the printer section 208.

First, the CPU 1705 of the black-and-white MFP 105 reads the "printer number", which shows the MFP (printer) that should mix the job bundles in the stacker tray 1207, from the storage device 1202 that is provided on the stacker tray 1207 and compares the read printer number with the apparatus information that is stored in a memory in the black-and-white MFP 105 (step S3023). When both pieces of information match, the CPU 1705 of the black-and-white MFP 105 reads the job ID to be processed first for the stacker tray 1207 from the storage device 1202 and determines whether a job corresponding to this job ID has been transmitted to the black-and-white MFP 105 (step S3024). When a matching job ID is present, the CPU 1705 of the black-and-white MFP 105 executes black-and-white printing by the printer section 208.

At this time, if the black-and-white data is in the server computer 102 ("SERVER" in step S3025), the CPU 1705 of the black-and-white MFP 105 downloads, from the server computer 102, the image data for the present job with the job ID and printer number written on the memory map in the storage device 1202 and stores the image data in the storage device 1202, which is an HDD or the like (step S3026). When the job ID and printer number do not match, the CPU 1705 of the black-and-white MFP 105 informs the user by displaying an indication showing that the information does not match via a display means of the operating part or the like. By determining whether the job ID and the printer number match, it is possible to prevent print data other than the job specified by the user from being mixed in, and it becomes possible to perform mixing operations using MFPs (printers) based on user requests.

When the image data has been stored in the hard disk drive inside the black-and-white MFP 105 in advance, the CPU 1705 of the black-and-white MFP 105 determines whether the job number and printer number match the image data in the hard disk drive, and when the job number and printer number do not match, informs the user via the display means of the operating part or the like. When the job number and printer number match, the CPU 1705 starts a print operation according to the mixing control described above.

Then, the CPU 1705 of the black-and-white MFP 105 determines which of the patterns for the "stacking method" described above matches the stacked state, based on information on the stacking method that is stored in the storage device 1202 of the stacker tray 1207 (step S3027). When the stacked state is determined to be "state B", the CPU 1705 of the black-and-white MFP 105 executes face down output control according to a process starting from the first page (step S3028), while when the stacked state is determined to be "state A", the CPU 1705 of the black-and-white MFP 105 executes face up output control according to a process starting from the last page (step S3029).

Then, based on the memory map of the storage device 1202 or the page number information of the server computer 102, the CPU 1705 of the black-and-white MFP 105 determines whether the present page that is being processed by a mixing operation is a black-and-white image page or a color image page (step S3030). When it is determined that the present page being processed as a mixing operation is a black-and-white image page, the CPU 1705 of the black-and-white MFP 105 causes the printer section 208 to form a suitable image for the present page to output the black-and-white output sheet to the stacker tray 1207 of the large-capacity stacker 109 (step S3031).

When it is determined that the present page being processed as a mixing operation is a color image page, the CPU 1705 of the black-and-white MFP 105 feeds the color output sheet corresponding to the present page from the stacker tray 1207 that is set in the inserter 108 to output the color output sheet to the stacker tray 1207 of the large-capacity stacker 109 (step S3032). By repeating the above operation for the set number of copies ("YES" in step S3033), the mixing operation for color output sheets and black-and-white output sheets is completed (step S3034).

When sheets for a plurality of jobs are stored in the stacker tray 1207, the process from step S3020 to step S3033 is repeated for each of the stored jobs.

Next, the processing in step S3031 of FIG. 31 described above will be described with reference to a flowchart in FIG. 32. The CPU 1705 of the black-and-white MFP 105 causes the conveying mechanism to feed a sheet from the sheet cassette 1034, the sheet cassette 1035, or the manual feeding tray 1036 that are disposed on the printer section 208 (step S3201) and detects, using a sensor, not shown, whether there is any abnormality in the sheet (such as "multiple feeding" that a plurality of sheets are conveyed on top of one another) (step S3202). When it is determined that there is an abnormality in the sheet, the CPU 1705 of the black-and-white MFP 105 proceeds to processing in step S3209, described later, while when it is determined that there is no abnormality, the CPU 1705 causes the printer section 208 to perform image formation on the sheet (step S3203), and detects, using a sensor, not shown, whether there is any abnormality (such as "skewing" that the conveying posture of the sheet is not correct) for the sheet on which an image has been formed (step S3204).

When it is determined that there is an abnormality in the sheet on which an image has been formed, the process proceeds to processing in step S3209, described later, while when it is determined that there is no abnormality, the CPU 1705 performs control to convey the sheet as far as the fixer 1040 (step S3205), and as is the case with steps S3202 and S3204, detects, using a sensor, not shown, whether there is any abnormality in the conveyed sheet ("multiple feeding", "skewing" or the like) (step S3206). When it is determined that there is an abnormality in the sheet, the process proceeds to the processing in step S3209 (described later), while when it is determined that there is no abnormality, the CPU 1705 of the black-and-white MFP 105 causes the fixer 1040 to perform the fixing of the image formed on the sheet (step S3207). Then, the CPU 1705 of the black-and-white MFP 105 detects, using a sensor, not shown, whether there is any abnormality ("multiple feeding", "skewing" or the like) in the sheet with the fixed image (step S3208).

When it is determined that there is an abnormality in the sheet on which an image has been formed, as is the case with steps S3204 and 3206, the process proceeds to the processing in step S3209 (described later), while when it is determined that there is no abnormality, the CPU 1705 obtains data on the discharge destination and the sheet discharged to the discharge destination that corresponds to such data (step S3210). In short, control is provided such that sheets for which an abnormality has been determined are not discharged to the stacker tray 1207 of the large-capacity stacker 109 and are discharged to the tray (escape tray) 1911 of the large-capacity stacker 109, while only sheets for which no abnormality has been determined are discharged to the stacker tray 1207 of the large-capacity stacker 109.

When it is determined that the print operation has been completed successfully ("YES" in step S3211), the CPU 1705 of the black-and-white MFP 105 completes the present process, while when it is determined that the print operation has not been completed successfully ("NO" in step S3211), a recovery process (a process that discharges a sheet determined to be abnormal, re-reads the image data for forming the same image on another sheet from an image storage device, such as an HDD, inside the black-and-white MFP 105, and reprints the image on another sheet that corresponds to the missing sheet) is executed for the image data so that the same image as the sheet determined to be abnormal can be formed on another sheet (step S3212), and then the process returns to step S3201.

On the other hand, when an abnormality has been detected in a sheet by a sensor, not shown, in one of steps S3202, S3204, S3206, and S3208 described above, the CPU 1705 of the black-and-white MFP 105 recognizes that the sheet is an abnormal sheet, stores data showing that the sheet is abnormal in the storage device 1202 of the stacker tray 1207, and changes the discharge destination so as to discharge the inserted sheet with the abnormality to the tray (escape tray) 1911 of the large-capacity stacker 109 (step S3209).

Next, the processing in step S3032 of FIG. 31 described above, that is, the contents of control for feeding sheets by the inserter, will be described with reference to a flowchart in FIG. 33. The CPU 1705 of the black-and-white MFP 105 causes the paper feeding roller 1903 to feed an inserted sheet (a color output sheet that is to be inserted into the black-and-white output sheets on which images are formed by the black-and-white MFP 105) from the stacker tray 1207 of the inserter 108 that is attached to the black-and-white MFP 105 as is the case with step S3201 of FIG. 32 described above (step S3301), and it is detected, based on the recovery information that was generated by the above-described CPU 1805 of the color MFP 104 and stored in the storage device 1202 of the stacker tray 1207, whether the inserted sheet that has been fed has any abnormality (step S3302).

Figure 32:
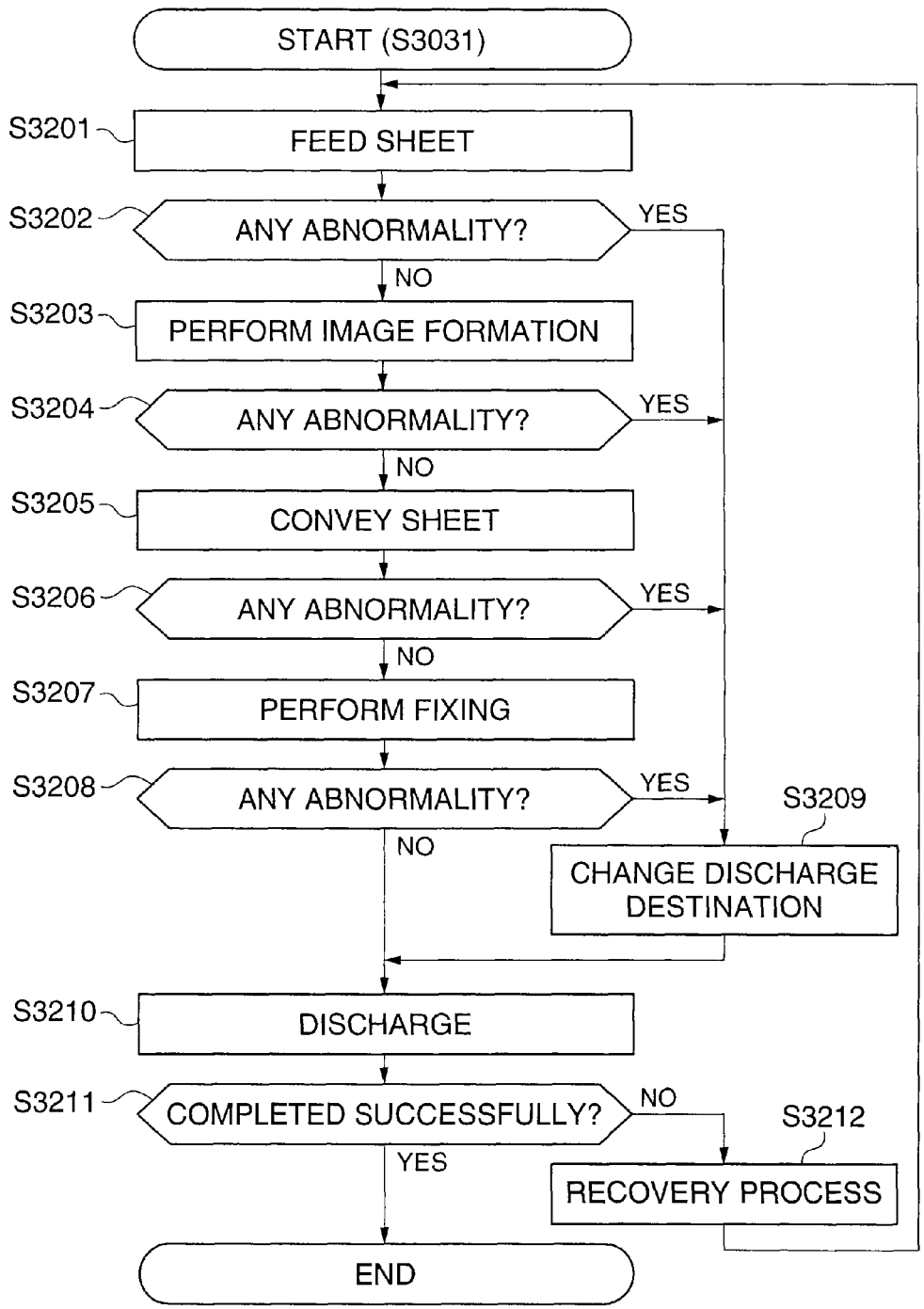
FIG. 32 is a flowchart showing the details step S3031 in FIG. 32.
Figure 33:
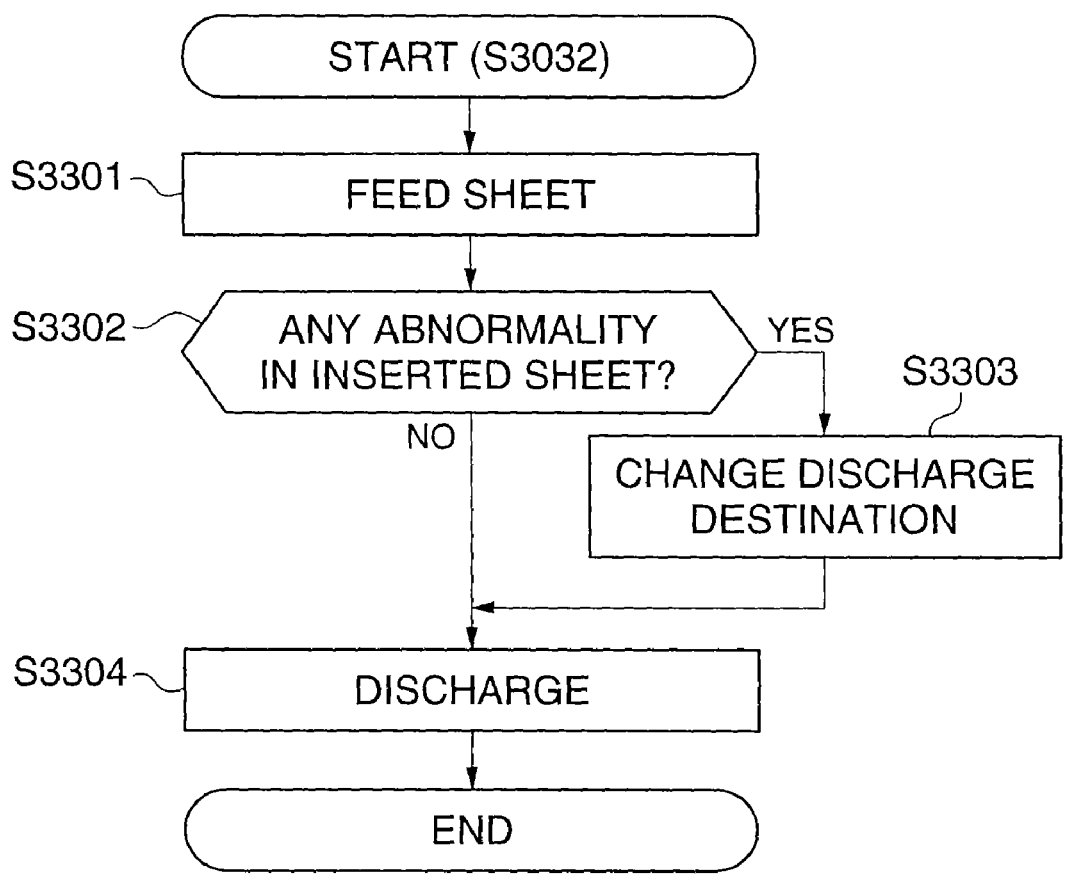
FIG. 33 is a flowchart showing the details of an inserter sheet feeding process in step S3032 in FIG. 32.

When it is determined that there is no abnormality in the sheet to be inserted, the process proceeds to processing in step S3304, while when it is determined that there is an abnormality in the inserted sheet, the CPU 1705 of the black-and-white MFP 105 changes the discharge destination so as to discharge the inserted sheet with the abnormality to the escape tray 1911 as is the case with the processing in step S3209 in FIG. 32 (step S3303), before the process proceeds to the processing in step S2604. Then, the CPU 1705 of the black-and-white MFP 105 switches the discharge destination based on the discharge destination data that shows the discharge destination of the sheet and is stored in a memory of the black-and-white MFP 105, thereby discharging the sheet to the intended discharge destination (step S3304), and terminates the present process.

Figure 34:
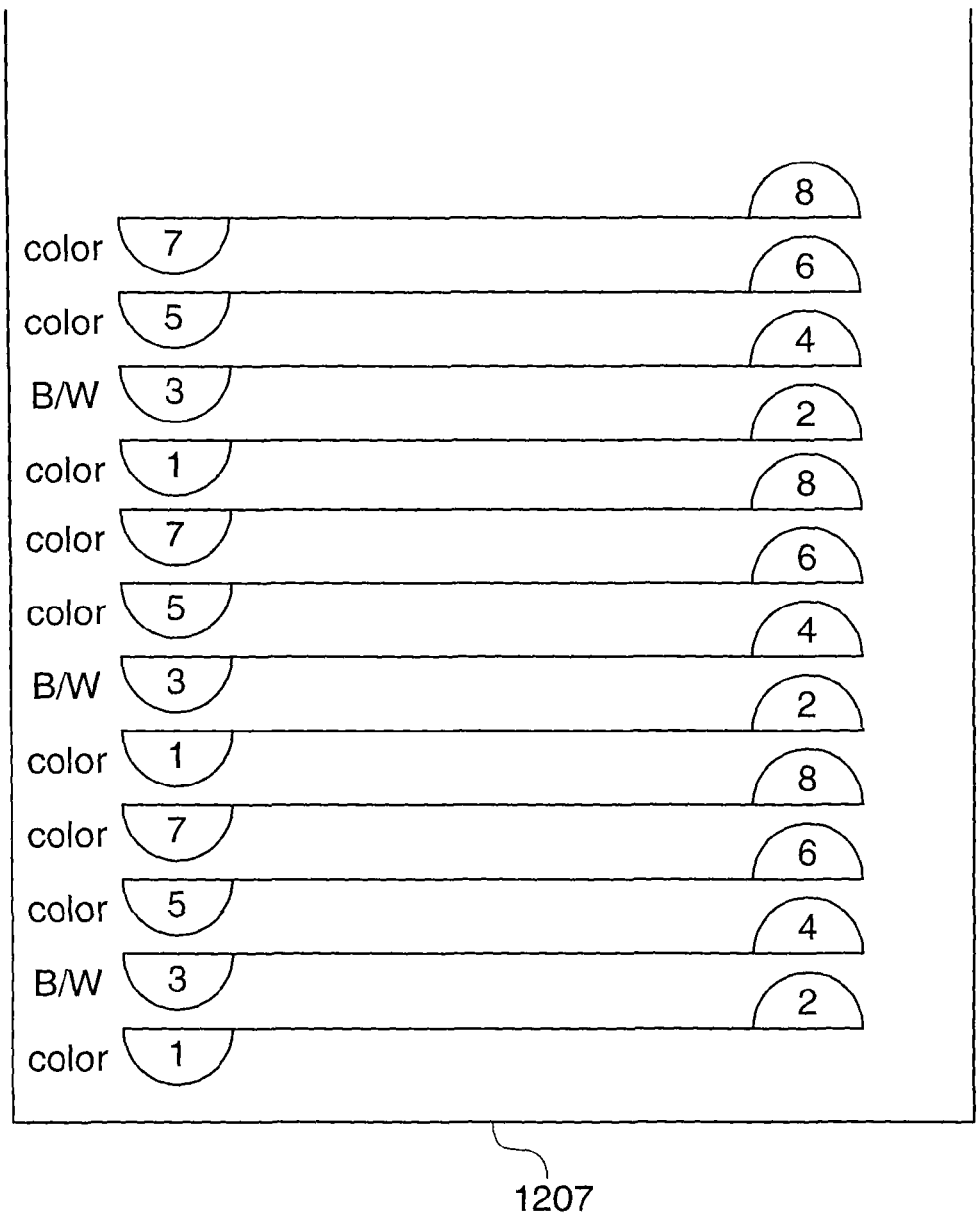
FIG. 34 is a diagram showing a normal sheet discharge state for the stacker tray 1207.

FIG. 34 shows a normal discharge state for color output sheets and black-and-white output sheets into the stacker tray 1207 in the large-capacity stacker 109 that is attached the black-and-white MFP 105. Specifically, sheets with page numbers 1, 2, 5, 6, 7, and 8 (the sheets marked "color" in FIG. 34) are color output sheets that have images formed by the color MFP 104 described above, are stored in the stacker tray 1207 that is attached to the stacker 107 attached to the color MFP 104, and are then discharged from the stacker tray 1207 that has been attached to the inserter 108 attached to the black-and-white MFP 105 into the stacker tray 1207 attached to the large-capacity stacker 109 optionally attached to the color MFP 104.

Also, sheets with page numbers 3 and 4 (the sheets marked "B/W" in FIG. 4) are black-and-white output sheets that have images formed by the black-and-white MFP 105 and are discharged from the black-and-white MFP 105 via the paper conveying path of the inserter 108 attached to the color MFP 104 into the stacker tray 1207 that is attached to the large-capacity stacker 109 attached to the color MFP 104. In the illustrated example, three sets (three jobs) of mixed color and black-and-white sheets for the page numbers 1, 2, 3, 4, 5, 6, 7, and 8 are correctly stacked in the stacker tray 1207 in the large-capacity stacker 109.

Aside from the above, when there is information that is helpful or necessary for the color/black-and-white mixing, mixing control is performed based on such information. Also, while in the above described embodiment, color output sheets of the color MFP 104 are stacked in the stacker tray 1207 and mixing is carried out at the inserter 108 that has been attached to the black-and-white MFP 105, conversely, black-and-white output sheets from the black-and-white MFP 105 may be stacked in the stacker tray 1207 and mixing is carried out at the inserter 108 that has been attached to the color MFP 104.

As described above, according to the first embodiment of the present invention, the CPU 1805 of the color MFP 104 provides control to detect whether there is abnormality in sheets, generate recovery information for recovering sheets for which abnormality has been detected, and store such recovery information in the storage device 1202 of the stacker tray 1207. When the stacker tray 1207 that stores sheets on which images have been formed by the color MFP 104 is attached to the inserter 108, the CPU 1705 of the black-and-white MFP 105 provides control to discharge, based on the recovery information and storage information in the storage device 1202 of the stacker tray 1207, the sheets stored in the stacker tray 1207 of the inserter 108 and the sheets on which images have been formed by the black-and-white MFP 105 to the stacker tray 1207 of the large-capacity stacker 109 to thereby mix them, while discharging any abnormal sheets to the tray 1911.

By virtue of this control, it is possible to avoid input errors and complicated input operations when making settings for a color/black-and-white mixing operation by image forming apparatuses (the color MFP 104 and black-and-white MFP 105), so that the burden placed on the user can be reduced. Further, when sheets that have been determined to be abnormal are mixed in the sheets in the stacker tray 1207, it is possible to easily distinguish between the normal sheets and the abnormal sheets and a mixing operation can be performed for the normal sheets with the abnormal sheets removed, which can reduce the burden on the user for removing abnormal sheets and makes it possible for a proper recovery to be achieved.

Next, a second embodiment of the present invention will be described. The construction of the first embodiment described above with reference ruction to FIGS. 1 to 25 is substantially the same as that according to the present embodiment, and therefore description thereof is omitted. It is also possible to combine the first embodiment and the second embodiment.

Figure 35:
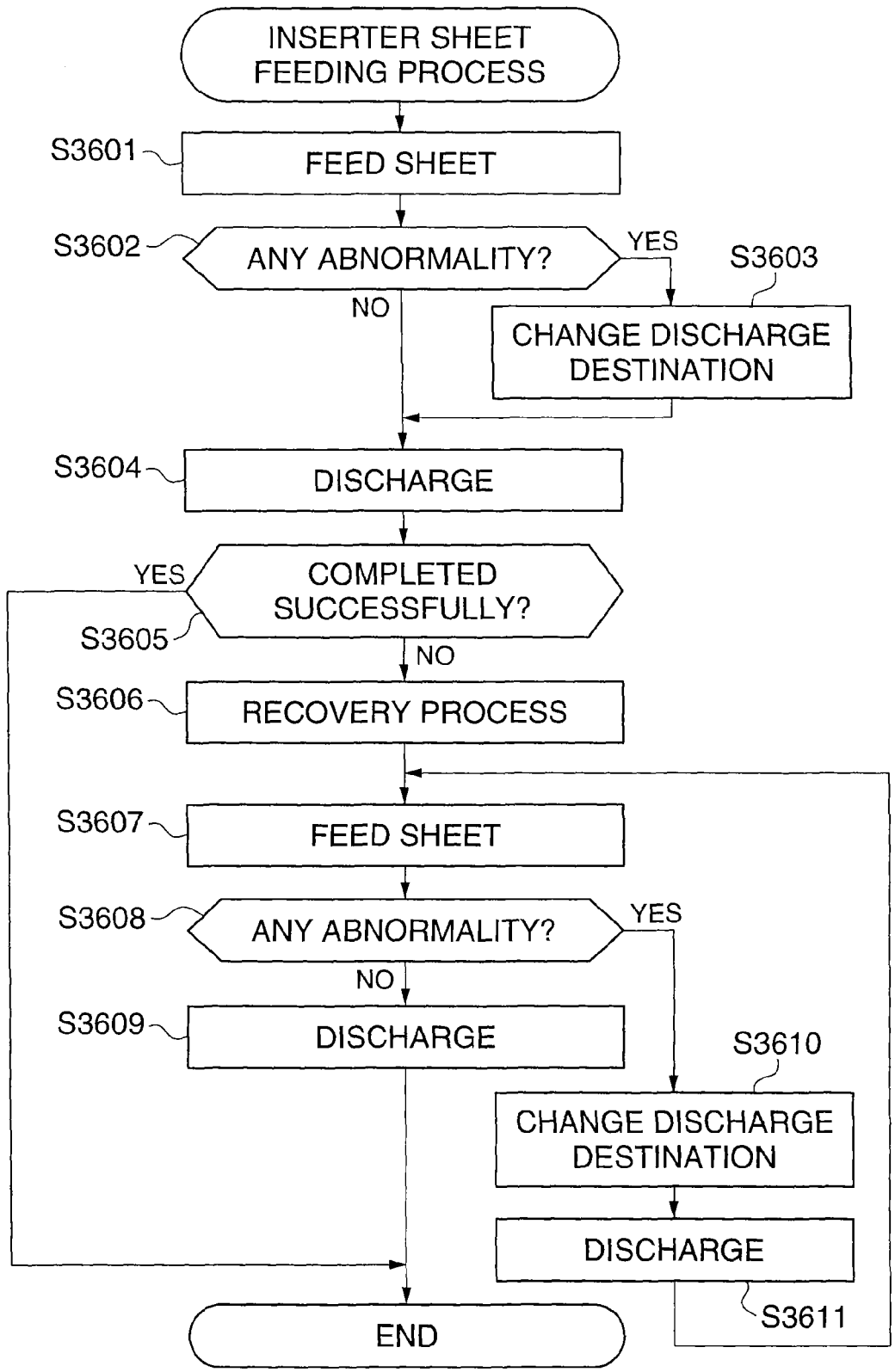
FIG. 35 is a flowchart showing the details of an inserter paper feeding process according to a second embodiment of the present invention.

Next, the contents of control in the present embodiment for feeding sheets to an inserter in step S3032 of FIG. 32 described above will be described the with reference to a flowchart in FIG. 35. As is the case with step S3201 of FIG. 32 described above, the CPU 1705 of the black-and-white MFP 105 causes a sheet to be inserted (a color output sheet to be inserted in black-and-white output sheets on which images have been formed by the black-and-white MFP 105) to be fed by the sheet feeding roller 1904 from the stacker tray 1207 of the inserter 108 attached to the black-and-white MFP 105 (step S3601), and detects, using a sensor, not shown, whether there is any abnormality in the inserted sheet that has been fed (step S3602).

When it is determined that there are no abnormality in the inserted sheet, the process proceeds to processing in step S3604, while when it is determined that there is an abnormality in the inserted sheet, the CPU 1705 of the black-and-white MFP 105 changes the discharge destination so as to discharge the inserted sheet with the abnormality to the escape tray 1911 as is the case with the processing in step S3209 in FIG. 32 (step S3603), before the process proceeds to processing in step S3604. Then, the CPU 1705 of the black-and-white MFP 105 switches or selects the discharge destination based on discharge destination data that shows the discharge destination of the sheet and is stored in a memory of the black-and-white MFP 105, thereby discharging the sheet to the intended discharge destination (step S3604).

Then, when it is determined, based on the result of the detection by the sensor, not shown, in step S3602 described above, that the operation has been completed successfully ("YES" in step S3605), the CPU 1705 of the black-and-white MFP 105, and the process is terminated. When the operation has not been completed successfully ("NO" in step S3605), since there are insufficient insertion sheets (an insertion sheet is missing since a sheet was discharged as described above upon being determined to be abnormal), the CPU 1705 stores data (such as an address, file number, and job number) for recovery (reprinting) in the storage device 1202 of the stacker tray 1207 and generates data for causing a different sheet (a sheet such as colored paper for identification purposes) to be fed from the tray 1910 of the inserter 108 so that the user can specify the position at which a recovery needs to be performed (i.e., the position showing where the inserted sheet that was determined to be abnormal was to be inserted) (step S3606).

Then, the CPU 1705 of the black-and-white MFP 105 causes a sheet to be fed from the tray 1910 of the inserter 108 (step S3607) and detects, using a sensor, not shown, whether there is any abnormality in the fed sheet (step S3608). When it is determined that there is an abnormality in the fed sheet, the CPU 1705 of the black-and-white MFP 105 changes the discharge destination so as to discharge the sheet determined to have the abnormality to the escape tray 1911 as is the case with the processing in step S3209 in FIG. 32 (step S3610), discharges the sheet determined to have the abnormality to the tray 1911 of the large-capacity stacker 109 (step S3611), and then the process returns once again to step S3607 described above. When it is determined that the fed sheet has no abnormality, the CPU 1705 of the black-and-white MFP 105 discharges the fed sheet to the stacker tray 1207 of the large-capacity stacker 109 (step S3609), and the present process is terminated. Note that the processing in steps S3608, S3610, and S3611 may be omitted.

Figure 36:
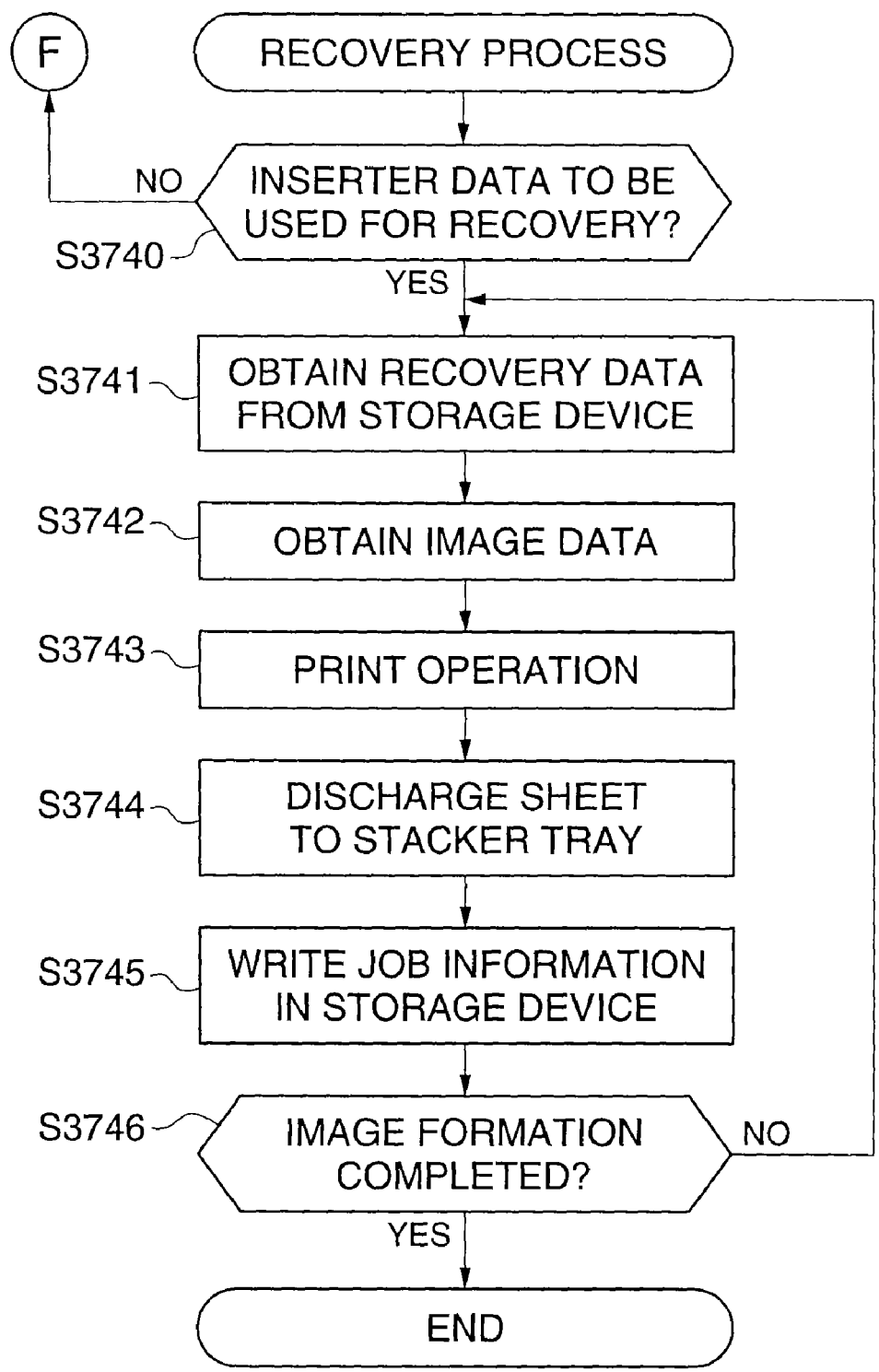
FIG. 36 is a flowchart showing the details of a recovery process) in step S3606 in FIG. 35.

Next, the recovery process that recovers color data based on recovery data stored in the storage device 1202 of the stacker tray 1207 in step S3606 of FIG. 35 described above will be described with reference to a flowchart in FIG. 36. In the recovery process, the stacker tray 1207 is again attached to the stacker 107 that is attached to the color MFP 104, as shown in FIG. 17, referred to before, so that the CPU 1805 of the color MFP 104 acquires the information (recovery data) in the storage device 1202 of the stacker tray 1207.

The CPU 1805 of the color MFP 104 checks, based on the recovery data in the storage device 1202 of the stacker tray 1207, whether the inserter data (data relating to the inserted sheet) is to be used for recovery (step S3740), and the process proceeds to the processing in step S2101 of FIG. 21 described above when it is determined that the inserter data is not to be used for recovery. When it is determined that the inserter data is to be used for recovery, the CPU 1805 executes processing in step S3741 onwards. The following description refers only to the case when the data is to be used for recovery.

Since it is determined that the inserter data is to be recovered, the CPU 1805 of the color MFP 104 obtains the recovery data from the storage device 1202 of the stacker tray 1207 (step S3741), and obtains image data from a memory in the color MFP 104 based on the obtained recovery data (data such as an address showing the storage position of the image data) (step S3742). Then, the CPU 1805 of the color MFP 104 executes a print operation using the printer section 208 based on the image data described above (step S3743), and causes the printed sheet to be discharged to the stacker tray 1207 inside the stacker 107 that is attached to the color MFP 104 (step S3744).

Then, the CPU 1805 of the color MFP 104 writes information on the recovered sheet (step S3745) and determines whether the image formation has been completed for the number of printed sheets to be recovered (step S3746). When it is determined that the above image formation has not been completed, the CPU 1805 of the color MFP 104 repeatedly executes the processing in steps S3741 to S3745 described above and when it is determined that the above image formation has been completed, the present process is terminated. Then, the stacker tray 1207 shown in FIG. 18 described above is attached once again to the inserter 108 or the large-capacity stacker 109 that is attached to the black-and-white MFP 105, the last print that forms black-and-white images on the sheets is executed by the black-and-white MFP 105, and the mixed color/black-and-white sheet bundle in which black-and-white sheets and color sheets are mixed is completed.

In addition to the above, when there is information that is helpful or necessary for the color/black-and-white mixing, mixing control is performed based on such information. Also, while in the above described embodiment, color output sheets of the color MFP 104 are stacked in the stacker tray 1207 and mixing is carried out at the inserter 108 attached to the black-and-white MFP 105, conversely, black-and-white output sheets from the black-and-white MFP 105 may be stacked in the stacker tray 1207 and mixing is carried out at the inserter 108 that is attached to the color MFP 104.

As described above, according to the second embodiment of the present invention, when a stacker tray 1207 that stores output sheets of the color MFP 104 is attached to the inserter 108 that is attached to the black-and-white MFP 105, the inserter 108 is made to insert sheets based on storage information in the storage device 1202 in the stacker tray 1207, abnormal sheets are discharged when an abnormality such as "multiple feeding" or "skewing" is detected by a sensor, data is generated for feeding identification sheets that specify recovery positions, and such data is written on the storage device 1202 of the stacker tray 1207 as the information that is necessary for a recovery. When such information is written in the storage device 1202 and the stacker tray 1207 is attached to the inserter 108 that is attached to the color MFP 104, control is provided to obtain image data for forming images on other sheets to replace the abnormal sheets based on the information necessary for recovery in the storage device 1202 of the stacker tray 1207, and form images on and output other sheets.

By virtue of this control, it is possible to avoid the conventional complicate operations involved when a color/black-and-white mixing of color output sheets and black-and-white output sheets is performed by an image forming apparatus, of setting various kinds of information for color/black-and-white mixing and downloading, based on such settings, information on the color originals from an external apparatus or reading the information from within the image forming apparatus, forming color images, and then performing the color/black-and-white mixing of the color output sheets and the black-and-white output sheets. This means that it is possible to avoid input errors and a complex input operation when making settings for a color/black-and-white mixing operation by an image forming apparatus, providing the effect of reducing the burden placed on the user.

In the first embodiment described above, a recovery process is executed by reading data from the storage device 1202 of the stacker tray 1207 for errors that occur during the mixing process by the color MFP 104.

Figure 37:
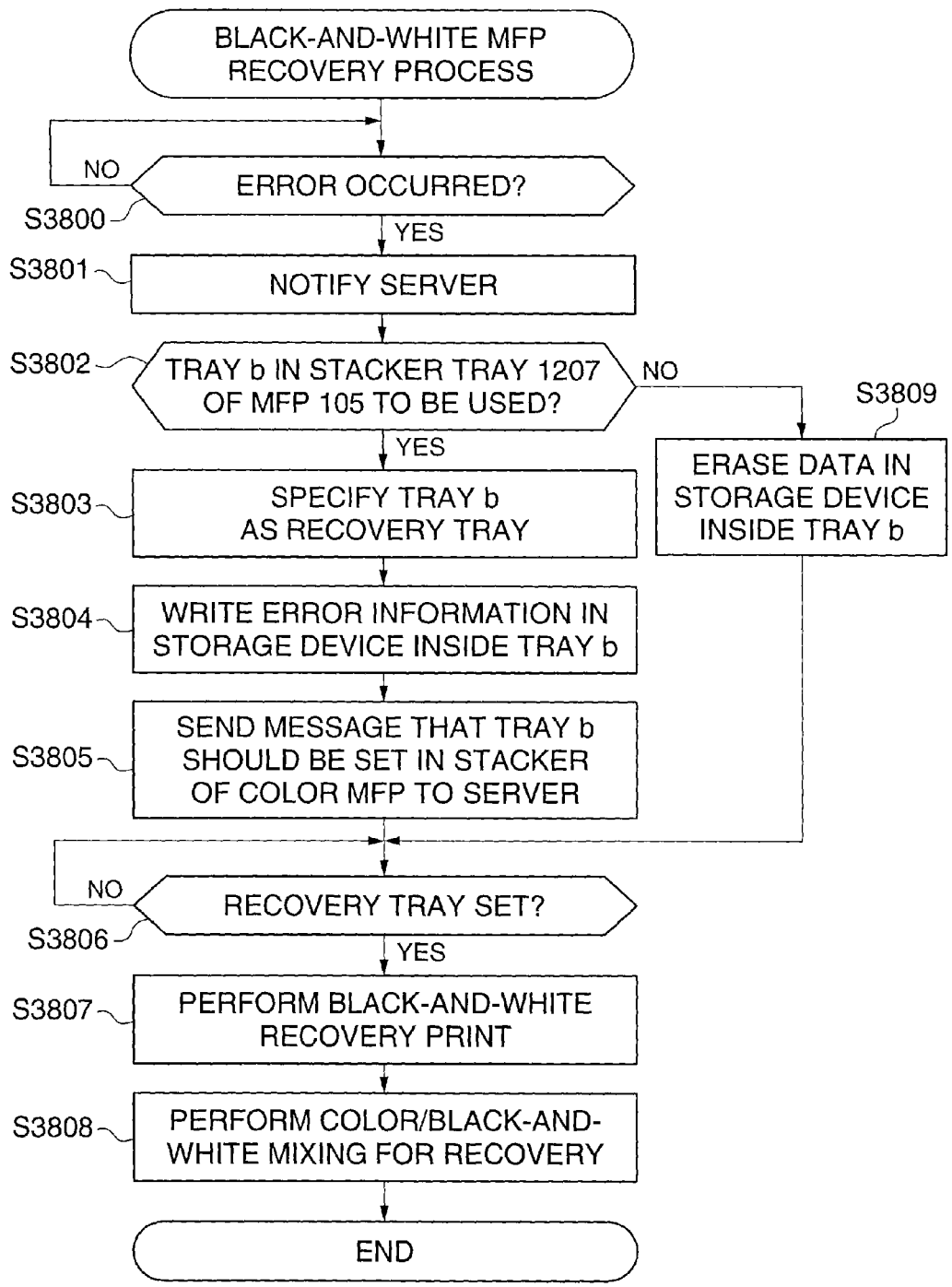
FIG. 37 is a flowchart showing the details of a recovery process carried out by the black-and-white MFP 105 according to a third embodiment of the present invention.
Figure 38:
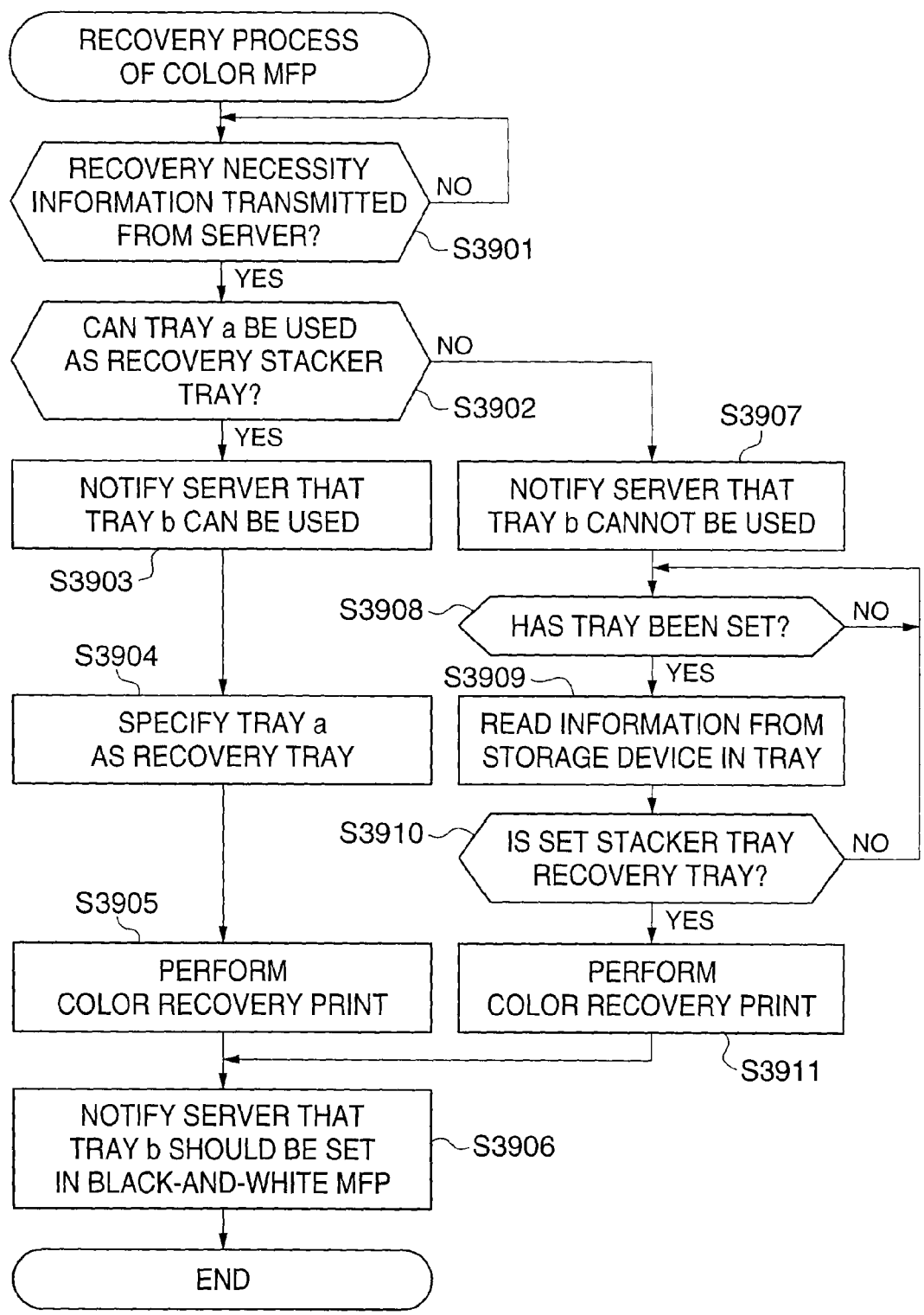
FIG. 38 is a flowchart showing the details of the recovery process of the color MFP 104.
Figure 39:
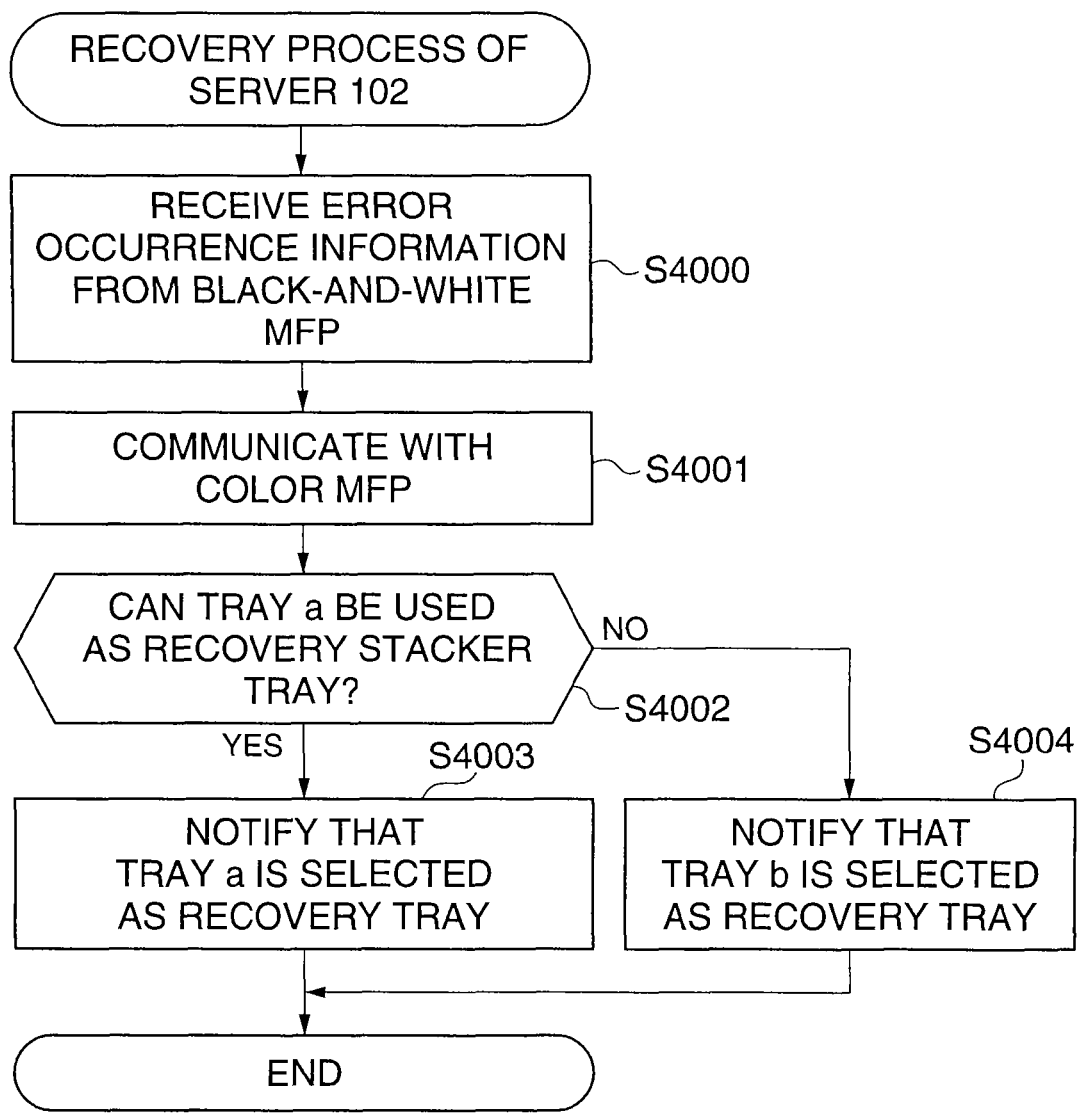
FIG. 39 is a flowchart showing the details of a recovery process carried out by the server computer 102.

Next, a description will be given of a third embodiment of the present invention in which a recovery process is performed via the server computer 102, with reference to FIGS. 37, 38, and 39. FIGS. 37 to 39 show a modification of step S3606 in FIG. 35, referred to before, in which the recovery process according to the third embodiment is performed.

FIG. 37 is a flowchart for the recovery process of the black-and-white MFP 105. The process shown in the flowchart is executed by the CPU 1705 inside the black-and-white MFP 105 according to a program stored in a ROM inside the black-and-white MFP 105.

In the case where, during the color/black-and-white mixing by the black-and-white MFP 105, multiple feeding occurs for in sheets being refed from the insert tray and the recovery process cannot be performed by the black-and-white MFP 105 alone, it is necessary for the color MFP 104 to perform a color print for recovery purposes. For the aforementioned reason, when it is determined that an error has occurred ("YES" in step S3800), in step S3801 the server computer 102 is notified by the black-and-white MFP 105 of print information that should be used for recovery by the color MFP 104 as error information.

In step S3802, based on specifying information on the recovery tray received from the server computer 102, it is determined whether to use the stacker tray 1207 that is presently connected to the server computer 102 as a recovery tray. If the stacker tray 1207 that is connected to the black-and-white MFP 105 (hereinafter referred to as "the tray b") has been specified as the recovery tray according to an instruction from the server computer 102 (step S3803), error information for recovering a color print is written into the storage device 1202 inside the tray b (step S3804). The content of the error information is the same as in the embodiments that have been described earlier, and therefore description thereof is omitted.

Thereafter, in order for the tray b to be set in the color MFP 104 and for sheets for the recovery print to be stacked in the tray b, a warning message showing that the tray b should be set in the stacker 107 of the color MFP 104 is displayed on the operating part of the black-and-white MFP 105. Then, in order for the same kind of display to be performed by the server computer 102, the message is sent from the black-and-white MFP 105 to the server computer 102 (step S3805).

When it is determined that the tray b that is connected to the black-and-white MFP 105 is not to be used as the recovery tray, all of the data in the storage device 1202 inside the tray b is erased so that the tray b can be used for another job (step S3809).

Then, when the recovery tray, in which the recovery sheets have been stacked and in whose storage device 1202 the recovery information has been written, is set in the black-and-white MFP 105 (step S3806), a recovery print is executed by the black-and-white MFP 105 based on the information in the storage device 1202 of the recovery tray (step S3807) and a color/black-and-white mixing for recovery purposes is performed (step S3808).

FIG. 38 is a flowchart showing the recovery process of the color MFP 104. The process in the flowchart is executed by the CPU 1805 inside the color MFP 104 according to a program stored in a ROM inside the color MFP 104.

When an error, such as a multiple feeding of color inserted sheets has occurred in the black-and-white MFP 105 and information indicating that the recovery process is necessary has been transmitted from the server computer 102 to the black-and-white MFP 105 ("YES" in step S3901), it is determined whether the stacker tray 1207 (hereinafter referred to as "the tray a") that is presently set in the color MFP 104 can be used as a recovery stacker tray (step S3902).

If it is determined that the tray a can be used, the server computer 102 is notified of information indicating to that effect (step S3903) and tray a set in the color MFP 104 is specified as the recovery tray (step S3904). Thereafter, based on the information in the storage device 1202 or print information that is to be used for recovery by the color MFP 104 and is managed by the server computer 102, the print job to be recovered is properly selected, and the image data of the appropriate job is read from an image memory inside the color MFP 104 or from an image memory in the server computer 102. Then, a recovery print is executed by the color MFP 104 (step S3905). When the recovery print is complete, information for mixing the recovery sheets is recorded in the server computer 102 inside the tray a.

In step S3902, when it is determined that the tray a cannot be used, such as in the case where no tray is attached to the color MFP 104, the case where the attached tray is full, or the case where a job is presently in progress and it is preferable not to perform stacking according to another job superposed on the present job, the server computer 102 is informed of information showing that the tray a cannot be used (step S3907).

Thereafter, when it is determined that a new stacker tray has been set (step S3908), the information in the storage device 1202 inside the stacker tray is read (step S3909). Then, it is determined from the read information whether the stacker tray that has been set is a recovery tray (step S3910). When a recovery tray (tray b) has been identified, a color recovery print is executed based on the information in the storage device 1202 (step S3911).

Thereafter, once the recovery print is completed, a warning message showing that the tray b should be set in the inserter 108 of the black-and-white MFP 105 is displayed by the operating part of the color MFP 104 so that the tray b can be set in the inserter 108 of the color MFP 104 and the recovery mixed print can be outputted. A message is also sent from the color MFP 104 to the server computer 102 so that the same kind of display can be made on the server computer 102 (step S3906), and the present process is terminated.

FIG. 39 is a flowchart showing the recovery process of the server computer 102. The process in the flowchart is executed by a CPU inside the server computer 102 according to a program stored in the server computer 102.

When error occurrence information has been received from the black-and-white MFP 105 (step S4000), the server computer 102 communicates with the color MFP 104 (step S4001). Then, information on whether a usable stacker tray is attached to the color MFP 104 is received and it is determined whether the stacker tray (tray a) that is presently attached to the color MFP 104 can be used as a recovery tray (step S4002).

When the tray a can be used, the tray a that is attached to the color MFP 104 is selected with priority as the recovery tray, and the color MFP 104 and the black-and-white MFP 105 are notified of information indicating this (step S4003). When it is determined that the tray attached to the color MFP 104 cannot be used, the tray b in which the job for which the error occurred in the black-and-white MFP 105 was stacked is specified as the recovery tray and the color MFP 104 and the black-and-white MFP 105 are notified of information indicating this (step S4004).

Although the tray a that is attached to the color MFP 104 is set with high priority for use, the tray b that is attached to the black-and-white MFP 105 may be set with high priority for use.

In this way, a plurality of stacker trays such as the tray a and the tray b can be used efficiently via the server computer 102, so that it is possible to increase the convenience with which stacker trays are used as recovery trays.

As described above, according to the third embodiment of the present invention, when the stacker tray 1207 that stores output sheets from the color MFP 104 is attached to the inserter 108 that is attached to the black-and-white MFP 105, the insertion of sheets by the inserter 108 is performed based on the storage information in the storage device 1202 in the stacker tray 1207, a first recovery process is performed when a sensor detects an abnormality in sheets such as multiple feeding or skewing, and the information that is necessary for the recovery is written into the storage device 1202 of the stacker tray 1207. Further, when the stacker tray 1207 in whose storage device 1202 the information necessary for the recovery has been written is attached to the inserter 108 attached to the color MFP 104, a second recovery process is performed based on the information necessary for the recovery in the storage device 1202.

By virtue of this control, it is possible to avoid the conventional complicate operations involved when a color/black-and-white mixing of color output sheets and black-and-white output sheets is performed by an image forming apparatus, of setting various kinds of information for color/black-and-white mixing and downloading, based on such settings, information on the color originals from an external apparatus or reading the information from within the image forming apparatus, forming color images, and then performing the color/black-and-white mixing of the color output sheets and the black-and-white output sheets. This means that it is possible to avoid input errors and a complex input operation when making settings for a color/black-and-white mixing operation by an image forming apparatus, providing the effect of reducing the burden placed on the user.

Although in the first to third embodiments described above, an image forming system constructed as shown in FIG. 1 is given as an example, the present invention is not limited to this construction, and the numbers of image forming apparatuses (MFP), computers, other apparatuses (scanners, printers, facsimiles, etc.) may be freely chosen, and also the manner in which the stackers, inserters and large-capacity stackers are attached to the image forming apparatuses may be freely chosen.

Although in the first to third embodiments described above, color/black-and-white mixing control is performed with an arrangement that stackers, inserters and large-capacity stackers are attached to image forming apparatuses (MFP), the present invention is not limited to this and color/black-and-white mixing control may be performed with an arrangement that stackers, inserters and large-capacity stackers are attached to other image forming apparatuses (printers, copiers, etc.).

Although in the first to third embodiments described above, an electrophotographic method is used as the image forming method of the image forming apparatuses, the present invention is not limited to this and may be applied to other image forming methods, such as ink jet methods may be used.

The present invention may either be applied to a system composed of a plurality of apparatuses or to a single apparatus.

It is to be understood that the present invention may also be accomplished by supplying a system or an apparatus with a medium, such as a storage medium in which a program code of software which realizes the functions of any of the above described embodiments is stored, and causing a computer (or CPU or MPU) of the system or apparatus to read out and execute the program code stored in the storage medium.

In this case, the program code itself read out from the storage medium realizes the functions of any of the above described embodiments, and hence the storage medium on which the program code is stored constitutes the present invention.

Examples of the storage medium for supplying the program code include a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Downloading via a network may be used as the storage medium for supplying the program code.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the medium, such as a storage medium, into a memory provided in an expansion board inserted into a computer or in an expansion unit connected to the computer and then causing a CPU or the like provided in the expansion board or the expansion section to perform a part or all of the actual operations based on instructions of the program code.

What is claimed is:

1. An image forming method for controlling a first image forming apparatus to print one of a color page including a color image and a black-and-white page without including a color image, both of which are mixed in a print job, and controlling a second image forming apparatus to print the other one of the color page and the black-and-white page, the image forming method comprising:
    a stacking step of stacking a sheet having the one printed by the first image forming apparatus to a first discharge tray of the first image forming apparatus;
    a storage step of storing identification information in a memory, the identification information identifying an abnormal sheet among the sheet stacked in the first discharge tray in said stacking step;
    a feeding controlling step of, after the sheet stacked in the first discharge tray is set to the second image forming apparatus as an insert sheet, controlling to feed the insert sheet so that a sheet having the other one printed by the second image forming apparatus and the insert sheet are discharged to a second discharge tray of the second image forming apparatus in a predetermined page order;
    a reading step of causing the second image forming apparatus to read the identification information stored in the memory; and
    a discharge control step of controlling, when the insert sheet is determined to be the abnormal sheet based on the identification information, the insert sheet to be discharged to a third discharge tray different from the second discharge tray.

* * * * *